United States Patent
Bolton et al.

(10) Patent No.: US 10,882,608 B2
(45) Date of Patent: Jan. 5, 2021

(54) HYDRAULIC SYSTEM FOR A VEHICLE AND METHOD OF USING THE SAME

(71) Applicant: The Boeing Company, Chicago, IL (US)

(72) Inventors: Joseph A. Bolton, Newalla, OK (US); Keith D. Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 481 days.

(21) Appl. No.: 15/933,334

(22) Filed: Mar. 22, 2018

(65) Prior Publication Data

US 2019/0291853 A1 Sep. 26, 2019

(51) Int. Cl.

| | |
|---|---|
| *B64C 25/44* | (2006.01) |
| *B60T 8/17* | (2006.01) |
| *B60K 7/00* | (2006.01) |
| *B60T 1/087* | (2006.01) |
| *B64C 25/34* | (2006.01) |

(Continued)

(52) U.S. Cl.
CPC ............ *B64C 25/44* (2013.01); *B60K 7/0015* (2013.01); *B60T 1/087* (2013.01); *B60T 8/1703* (2013.01); *B60T 8/325* (2013.01); *B64C 25/34* (2013.01); *B64C 25/405* (2013.01); *F16D 57/06* (2013.01); *F16H 61/4148* (2013.01); *F16H 61/4157* (2013.01)

(58) Field of Classification Search
CPC ......... B64C 25/42; B64C 25/44; B60T 8/325; B60T 8/1703

See application file for complete search history.

(56) References Cited

U.S. PATENT DOCUMENTS

| | | |
|---|---|---|
| 2,480,651 A | 8/1949 | Hawkins et al. |
| 2,483,362 A | 9/1949 | Du Bois et al. |

(Continued)

FOREIGN PATENT DOCUMENTS

| | | |
|---|---|---|
| DE | 3002948 A1 | 7/1981 |
| EP | 2687503 A1 | 1/2014 |
| WO | WO 99/20417 A1 | 4/1999 |

OTHER PUBLICATIONS

European Patent Office Extended European Search Report, dated Aug. 8, 2019, for counterpart foreign application No. EP 19156642. 1, Applicant The Boeing Company, 7 pages.

*Primary Examiner* — Nicholas McFall

(57) ABSTRACT

There is provided a hydraulic system for a vehicle. The hydraulic system has a hydraulic rotary actuator assembly rotationally coupled to a road wheel of the vehicle. The hydraulic rotary actuator assembly has a first operating mode, wherein a rotation of the road wheel causes the hydraulic rotary actuator assembly to pump a fluid from a fluid supply system. The hydraulic system further has a variable restrictor assembly coupled to the hydraulic rotary actuator assembly in the vehicle. The variable restrictor assembly controls a flow of the fluid flowing from the hydraulic rotary actuator assembly, to brake the rotation of the road wheel on a ground surface. The hydraulic system further has a variable restrictor controller coupled to the variable restrictor assembly. The variable restrictor controller controls the variable restrictor assembly, so as to enable a variation of a rate of braking of the road wheel on the ground surface.

22 Claims, 11 Drawing Sheets

(51) Int. Cl.
*B64C 25/40* (2006.01)
*F16D 57/06* (2006.01)
*F16H 61/4148* (2010.01)
*F16H 61/4157* (2010.01)
*B60T 8/32* (2006.01)

(56) References Cited

U.S. PATENT DOCUMENTS

| | | | |
|---|---|---|---|
| 2,487,600 A | | 11/1949 | Schneiderwirth |
| 3,056,567 A | * | 10/1962 | Smith .................. B64C 25/405 |
| | | | 244/103 S |
| 3,273,830 A | | 9/1966 | Scholl |
| 3,396,536 A | * | 8/1968 | Miller .................. F04B 1/2064 |
| | | | 60/464 |
| 3,442,501 A | | 5/1969 | Soderberg |
| 3,870,130 A | | 3/1975 | Miller |
| 4,333,607 A | | 6/1982 | Mueller et al. |
| 4,990,268 A | * | 2/1991 | Burba, III .............. C09K 8/845 |
| | | | 507/108 |
| 6,112,521 A | | 9/2000 | Hayashi et al. |
| 2017/0057624 A1 | * | 3/2017 | Lo ........................... B64C 25/42 |
| 2017/0121013 A1 | * | 5/2017 | Christensen .......... B64C 25/405 |

* cited by examiner

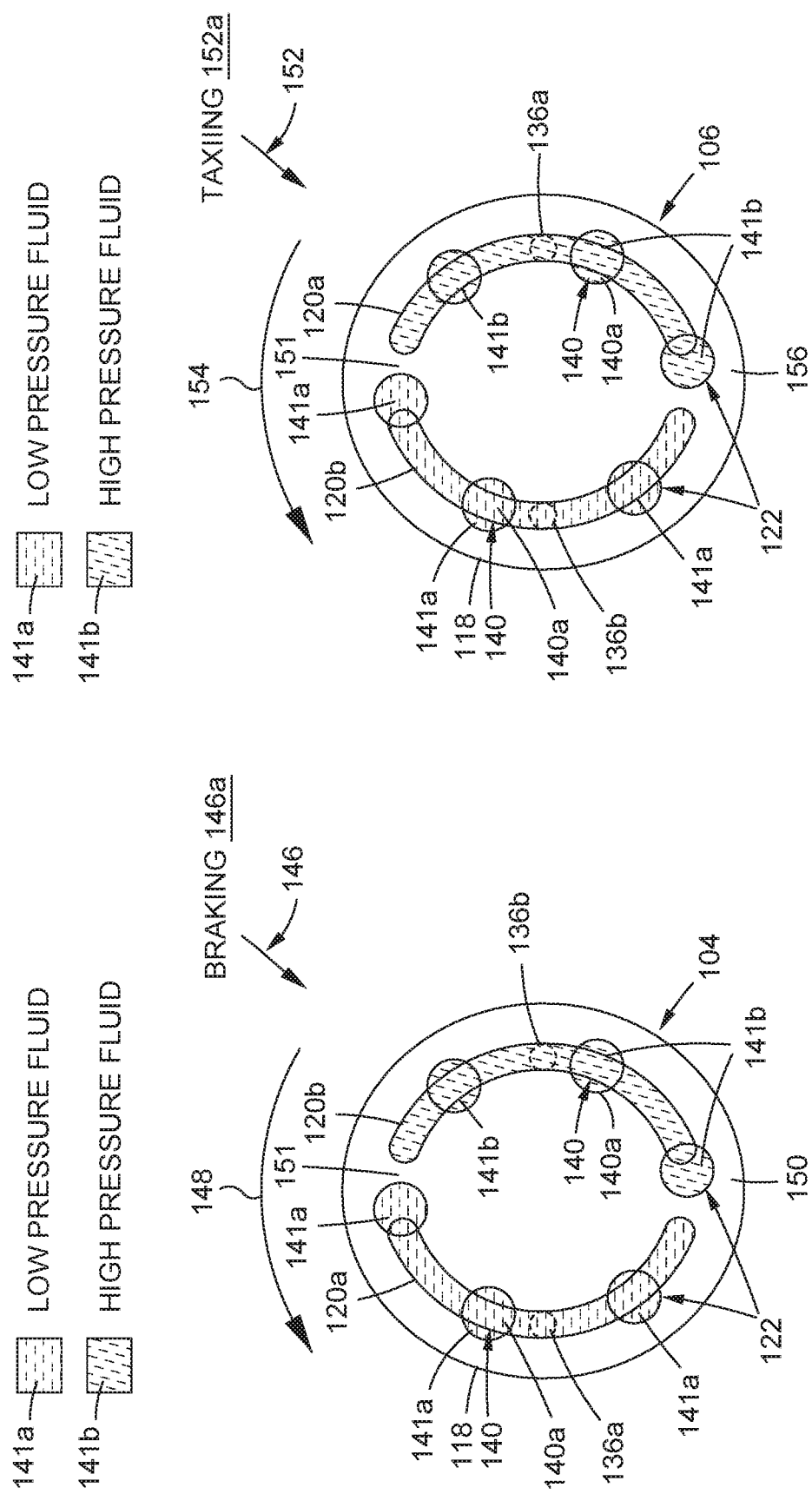

HYDRAULIC SYSTEM FOR A VEHICLE AND METHOD OF USING THE SAME

FIELD

The disclosure relates generally to hydraulic systems and methods, and more particularly, to hydraulic systems and methods for vehicles, such as aircraft.

BACKGROUND

Air vehicles, such as commercial and military jet aircraft, include braking systems such as hydraulic braking systems, used upon landing of the aircraft and during taxiing of the aircraft. The size, weight, and landing speed of the aircraft influence the design and complexity of the braking system. An aircraft hydraulic braking system may include rotors, stationary brake pads or stators, brake calipers, and other components. The rotors are rotated with the rotating aircraft wheels, and the brake calipers and the stationary brake pads are stationary and may be attached to the landing gear strut or axle. In the aircraft hydraulic braking system, pressurized hydraulic fluid may be forced toward one or more brake calipers that clamp the rotors and the stationary brake pads. The brake caliper resists rotation by causing friction against the clamped rotors and stationary brake pads when the brakes are applied. The clamped rotors and stationary brake pads convert kinetic energy from the rotating wheels of the aircraft into a material temperature delta through the friction. The greater the amount of kinetic energy the brakes absorb, the higher the temperature delta is produced in the rotors and stationary brake pads.

The brake heat produced by friction braking of aircraft brakes may reach very high temperatures, for example, 1500 degrees Fahrenheit and greater, and such high brake heat may accelerate wear on various components of the braking system and the landing gear. Such accelerated wear may lead to frequent replacement of parts of the aircraft braking system and the landing gear, and the costs of such replacement parts and the labor to replace such parts may be very high. In addition, such friction braking may generate brake dust due to wear on the stationary brake pads, and such brake dust may be costly to contain and minimize or prevent. Moreover, once a certain total absorbed brake energy is exceeded, the brake system's ability to generate stopping force may be diminished.

In addition, it would be desirable to have a hydraulic braking system that does not need to keep the main aircraft turbofan engines running while the aircraft is taxiing on the runway. For example, the main aircraft turbofan engines may need to keep running while an aircraft is taxiing on the runway. However, the running of such large engines at idle power while taxiing the aircraft may be fuel intensive, and may result in the use of much fuel while the aircraft is on the ground. This may increase overall fuel costs.

Accordingly, what is needed is an aircraft hydraulic braking system and method that contains or minimizes brake heat and brake dust when the aircraft brakes, that reduces the frequent need for costly replacement parts of the aircraft braking system and landing gear, that has the ability to direct taxi power to the landing gear and avoid running the main aircraft turbofan engines during taxiing, and that is reliable and easy to use.

SUMMARY

This need for an improved aircraft hydraulic braking system and method is satisfied. As discussed in the below detailed description, versions or embodiments of the improved aircraft hydraulic braking system and method may provide significant advantages over existing aircraft braking systems and methods.

In a version of the disclosure, there is provided a hydraulic system for a vehicle. The hydraulic system comprises a hydraulic rotary actuator assembly rotationally coupled to a road wheel of the vehicle. The hydraulic rotary actuator assembly has a first operating mode comprising a braking operation. A rotation of the road wheel causes the hydraulic rotary actuator assembly to pump a fluid from a fluid supply system.

The hydraulic system further comprises a variable restrictor assembly coupled to the hydraulic rotary actuator assembly in the vehicle. The variable restrictor assembly controls a flow of the fluid flowing from the hydraulic rotary actuator assembly, to brake the rotation of the road wheel on a ground surface.

The hydraulic system further comprises a variable restrictor controller coupled to the variable restrictor assembly. The variable restrictor controller controls the variable restrictor assembly, so as to enable a variation of a rate of braking of the road wheel on the ground surface.

In another version of the disclosure, there is provided an aircraft. The aircraft comprises a fuselage, at least one wing attached to the fuselage, and one or more landing gear assemblies attached to the fuselage. The one or more landing gear assemblies each comprises a strut, an axle, and at least one aircraft wheel.

The aircraft further comprises a hydraulic system. The hydraulic system comprises at least one hydraulic rotary actuator assembly rotationally coupled to the aircraft wheel. The at least one hydraulic rotary actuator assembly has a first operating mode comprising a braking operation. A rotation of the aircraft wheel causes the at least one hydraulic rotary actuator assembly to pump a thixotropic fluid from a fluid reservoir of a fluid supply system.

The hydraulic system further comprises a variable restrictor assembly coupled to the at least one hydraulic rotary actuator assembly. The variable restrictor assembly controls a flow of the thixotropic fluid issuing from the at least one hydraulic rotary actuator assembly, to brake the rotation of the aircraft wheel on a ground surface. The hydraulic system further comprises a variable restrictor controller coupled to the variable restrictor assembly. The variable restrictor controller controls the variable restrictor assembly, so as to enable a variation of a rate of braking of the aircraft wheel on the ground surface.

In another version of the disclosure, there is provided a method of using a hydraulic system for a vehicle. The method comprises the step of installing the hydraulic system in the vehicle. The hydraulic system comprises at least one hydraulic rotary actuator assembly rotationally coupled to a road wheel of the vehicle. The at least one hydraulic rotary actuator assembly has a first operating mode comprising a braking operation. The hydraulic system further comprises a variable restrictor assembly coupled to the at least one hydraulic rotary actuator assembly. The hydraulic system further comprises a variable restrictor controller coupled to the variable restrictor assembly.

The method further comprises the step of rotating the road wheel to cause the at least one hydraulic rotary actuator assembly to pump a fluid from a fluid reservoir of a fluid supply system, and to convert a rotation of the road wheel into a flow of the fluid. The method further comprises the step of using the variable restrictor assembly to control the flow of the fluid flowing to and from the at least one hydraulic rotary actuator assembly, and to brake the rotation of the road wheel on a ground surface, to perform the braking operation. The method further comprises the step of using the variable restrictor controller to control the variable restrictor assembly, so as to enable a variation of a rate of braking of the road wheel on the ground surface.

The features, functions, and advantages that have been discussed can be achieved independently in various embodiments of the disclosure or may be combined in yet other versions or embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions or embodiments, but which are not necessarily drawn to scale, wherein:

FIG. 6B is an illustration of a cross-sectional view of the valve plate and pistons of the hydraulic rotary actuator assembly of FIG. 6A, shown in a braking operation;

FIG. 6C is an illustration of a cross-sectional view of the valve plate and pistons of the hydraulic rotary actuator assembly of FIG. 6A, shown in a taxiing operation;

Each figure shown in this disclosure shows a variation of an aspect of the embodiments presented, and only differences will be discussed in detail.

DETAILED DESCRIPTION

Disclosed versions or embodiments will now be described more fully hereinafter with reference to the accompanying drawings, in which some, but not all of the disclosed versions or embodiments are shown. Indeed, several different versions or embodiments may be provided and should not be construed as limited to the versions or embodiments set forth herein. Rather, these versions or embodiments are provided so that this disclosure will be thorough and fully convey the scope of the disclosure to those skilled in the art.

As used herein, an element or step recited in the singular and preceded with the word "a" or "an" should be understood as not excluding plural elements or steps, unless such exclusion is explicitly recited. Furthermore, references to "a version" or "versions" of the disclosure are not intended to be interpreted as excluding the existence of additional versions that also incorporate the recited features.

Figure 1:
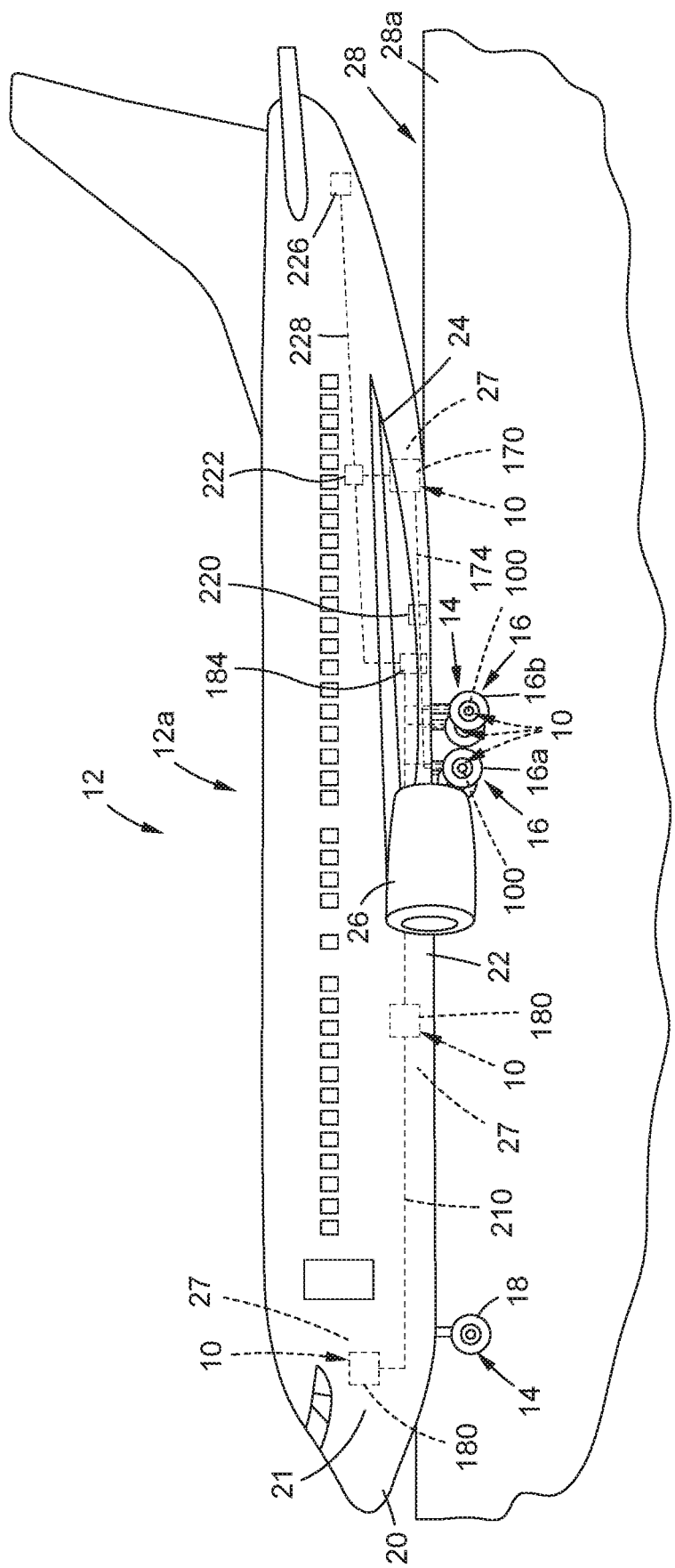
FIG. 1 is an illustration of a perspective view of an aircraft that incorporates a version of a hydraulic system of the disclosure.

Now referring to the Figures, FIG. 1 is an illustration of a perspective view of a vehicle 12, such as an aircraft 12a, that incorporates a version of a hydraulic system 10 of the disclosure. As shown in FIG. 1, the vehicle 12, such as in the form of aircraft 12a, comprises a plurality of landing gear assemblies 14. The plurality of landing gear assemblies 14 (see FIG. 1) enable the aircraft 12a (see FIG. 1) to land, taxi, and take off. As shown in FIG. 1, the plurality of landing gear assemblies 14 include main landing gear assemblies 16, such as a first main landing gear assembly 16a and a second main landing gear assembly 16b, and include a nose landing gear assembly 18. As further shown in FIG. 1, the main landing gear assemblies 16 may be located below a fuselage 22 and below a wing 24 and near an engine 26 of the aircraft 12a. The nose landing gear assembly 18 (see FIG. 1) may be located near a nose 20 (see FIG. 1) of the aircraft 12a. Although FIG. 1 shows several main landing gear assemblies 16 and one nose landing gear assembly 18, the number of landing gear assemblies 14 are merely examples, and other examples may employ other numbers of main landing gear assemblies 16 and/or nose landing gear assembly 18 without departing from the scope of this disclosure.

As further shown in FIG. 1, and discussed in detail below, the hydraulic system 10 comprises one or more hydraulic rotary actuator assemblies 100 coupled to one or more of the landing gear assemblies 14, such as the main landing gear assemblies 16. As further shown in FIG. 1, and discussed in detail below, the hydraulic system 10 comprises a fluid supply system 170, a control system 180, a variable restrictor assembly 184, one or more heat exchangers 220, and optionally, an auxiliary pump 222.

Depending on the type and model of aircraft 12a, the fluid supply system 170 of the hydraulic system 10 may be located in one or more locations in an interior 27 (see FIG. 1) of the aircraft 12a. The fluid supply system 170 (see FIG. 1) may be coupled to the one or more hydraulic rotary actuator assemblies 100 (see FIG. 1), via one or more fluid lines 174 (see FIG. 1) of the fluid supply system 170.

Depending on the type and model of aircraft 12a, the control system 180 (see FIG. 1) of the hydraulic system 10 (see FIG. 1) may be located in or near the cockpit 21 (see FIG. 1) in the interior 27 (see FIG. 1) of the aircraft 12a, and/or may be located near the engine 26 (see FIG. 1) or the wing 24 (see FIG. 1) in the interior 27 of the aircraft 12a, and/or may be located in, or coupled to, one or more of the landing gear assemblies 14 (see FIG. 1), such as the main landing gear assemblies 16 (see FIG. 1). The control system 180 (see FIG. 1) may be coupled to the one or more hydraulic rotary actuator assemblies 100 (see FIG. 1), via one or more connection elements 210 (see FIG. 1), discussed in further detail below.

As further shown in FIG. 1, and discussed in detail below, the hydraulic system 10 may have the ability to taxi the aircraft 12*a*, when it is on a ground surface 28, using an optional auxiliary pump 222 powered by fluid power 224*a* (see FIG. 8) or electric power 224*b* (see FIG. 8) from a power source, such as an auxiliary power unit (APU) 226 coupled via one or more auxiliary power unit (APU) lines 228 to the auxiliary pump 222. The APU 226 (see FIG. 1) is a device on an aircraft 12*a* (see FIG. 1) that provides energy or power for functions other than propulsion of the aircraft 12*a*, which is performed by the engines 26 (see FIG. 1).

As shown in FIG. 1, the vehicle 12, such as aircraft 12*a*, is shown with the main landing gear assemblies 16 and the nose landing gear assembly 18 in contact with the ground surface 28, such as an airport runway 28*a*, in a landed or grounded position. In traveling from one destination, for example, an airport, to another destination, the vehicle 12, such as aircraft 12*a*, may perform numerous braking and taxiing actions, such as, for example, braking upon landing, taxiing from a runway to an arrival gate, taxiing from a departure gate to a runway, and parking.

Figure 2:
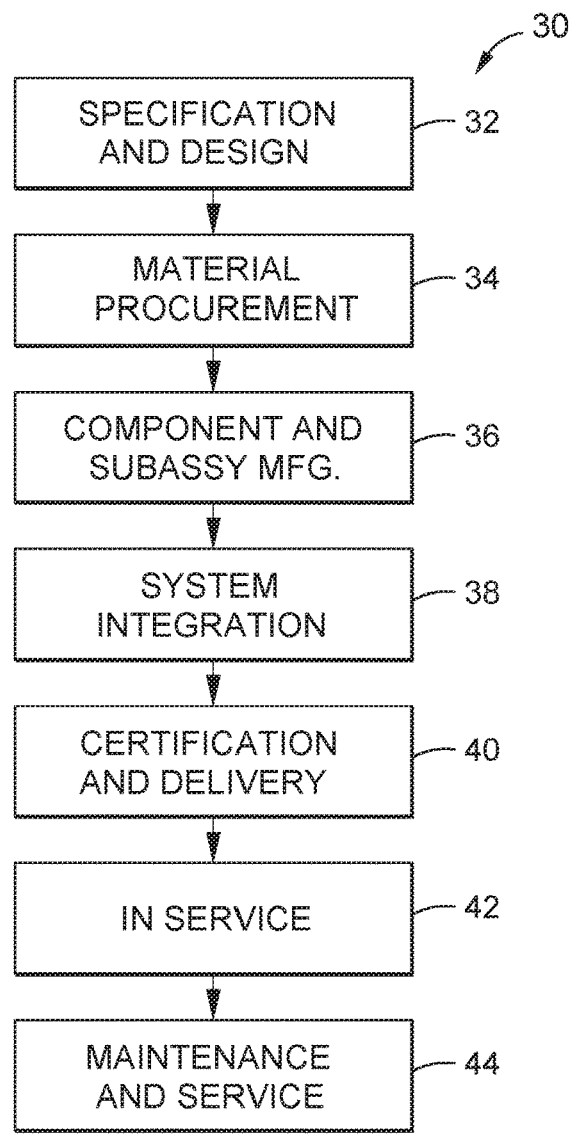
FIG. 2 is an illustration of a flow diagram of an aircraft manufacturing and service method.
Figure 3:
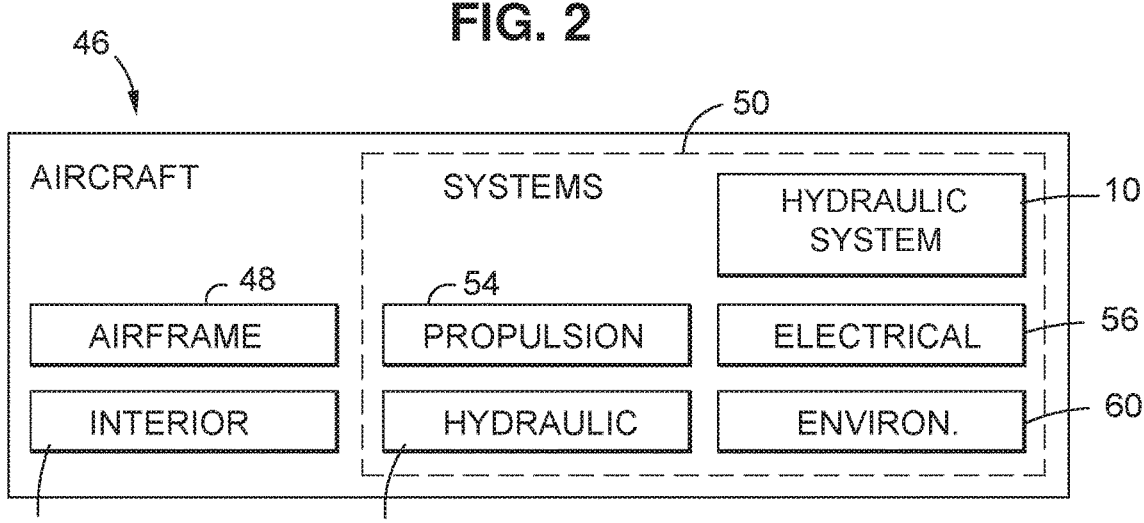
FIG. 3 is an illustration of a functional block diagram of an aircraft.

Referring now to FIGS. 2 and 3, FIG. 2 is an illustration of a flow diagram of an embodiment of an aircraft manufacturing and service method 30. FIG. 3 is an illustration of a functional block diagram of an embodiment of an aircraft 46. Referring to FIGS. 2 and 3, embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 (see FIG. 2) may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. As further shown in FIG. 3, the systems 50 may further include one or more versions of the hydraulic system 10, such as a hydraulic braking system, as disclosed herein. Any number of other systems may be included.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus versions, method versions, or a combination thereof, may be utilized during component and subassembly manufacturing 36 (see FIG. 2) and system integration 38 (see FIG. 2), for example, by substantially expediting assembly of, or reducing the cost of, the aircraft 46 (see FIG. 3). Similarly, one or more of the apparatus versions or embodiments, the method versions or embodiments, or a combination thereof, may be utilized while the aircraft 46 (see FIG. 3) is in service 42 (see FIG. 2), for example, and without limitation to, maintenance and service 44 (see FIG. 2).

Figure 4A:
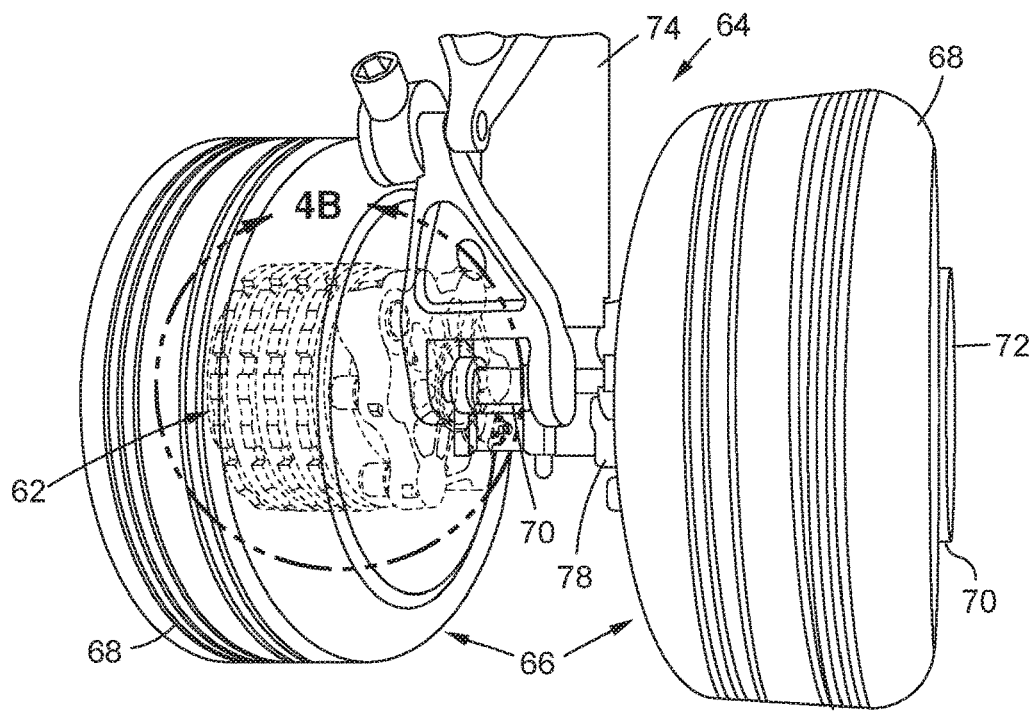
FIG. 4A is an illustration of a front perspective view of a known aircraft hydraulic braking assembly in a known aircraft landing gear assembly.

Now referring to FIG. 4A, FIG. 4A is an illustration of a front perspective view of a known aircraft hydraulic braking assembly 62 coupled to a known aircraft landing gear assembly 64. As shown in FIG. 4A, the aircraft landing gear assembly 64 includes a wheel assembly 66 with tires 68 and wheels 70 each having a wheel rim 72, includes a strut 74, includes an axle 76 connecting the tires 68 and wheels 70, and includes brake calipers 78. Although the known aircraft hydraulic braking assembly 62 is installed in both tires 68 of the wheel assembly 66, only one known aircraft hydraulic braking assembly 62 is shown in FIG. 4A.

Figure 4B:
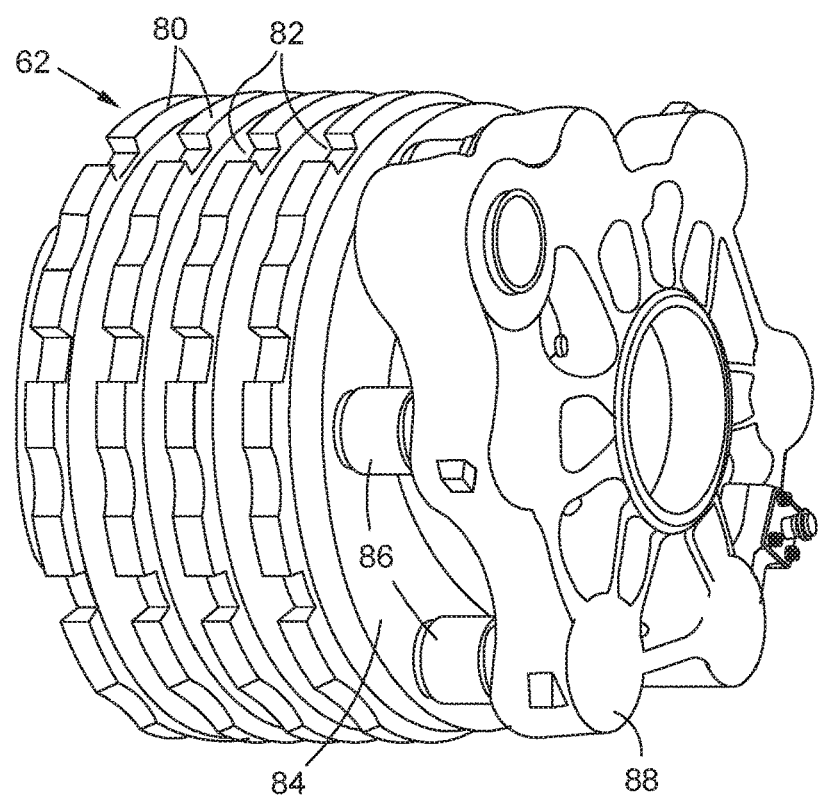
FIG. 4B is an illustration of an enlarged front perspective view of the known aircraft hydraulic braking assembly of FIG. 4A.

Now referring to FIG. 4B, FIG. 4B is an illustration of an enlarged front perspective view of the known aircraft hydraulic braking assembly 62 of FIG. 4A. As shown in FIG. 4B, the known aircraft hydraulic braking assembly 62 includes a plurality of rotors 80 alternating with a plurality of stationary brake pads 82 or stators. As further shown in FIG. 4B, the known aircraft hydraulic braking assembly 62 includes a pressure plate 84 adjacent a plurality of hydraulic actuators 86 installed in a housing 88. In the known aircraft hydraulic braking assembly 62 (see FIGS. 4A-4B), the brake caliper 78 (see FIG. 4A) clamps the rotors 80 (see FIG. 4B) and the stationary brake pads 82 (see FIG. 4A), and when a braking action is performed, the brake caliper 78 resists rotation by causing friction against the clamped rotors 80 and stationary brake pads 82, to result in friction braking.

Figure 9:
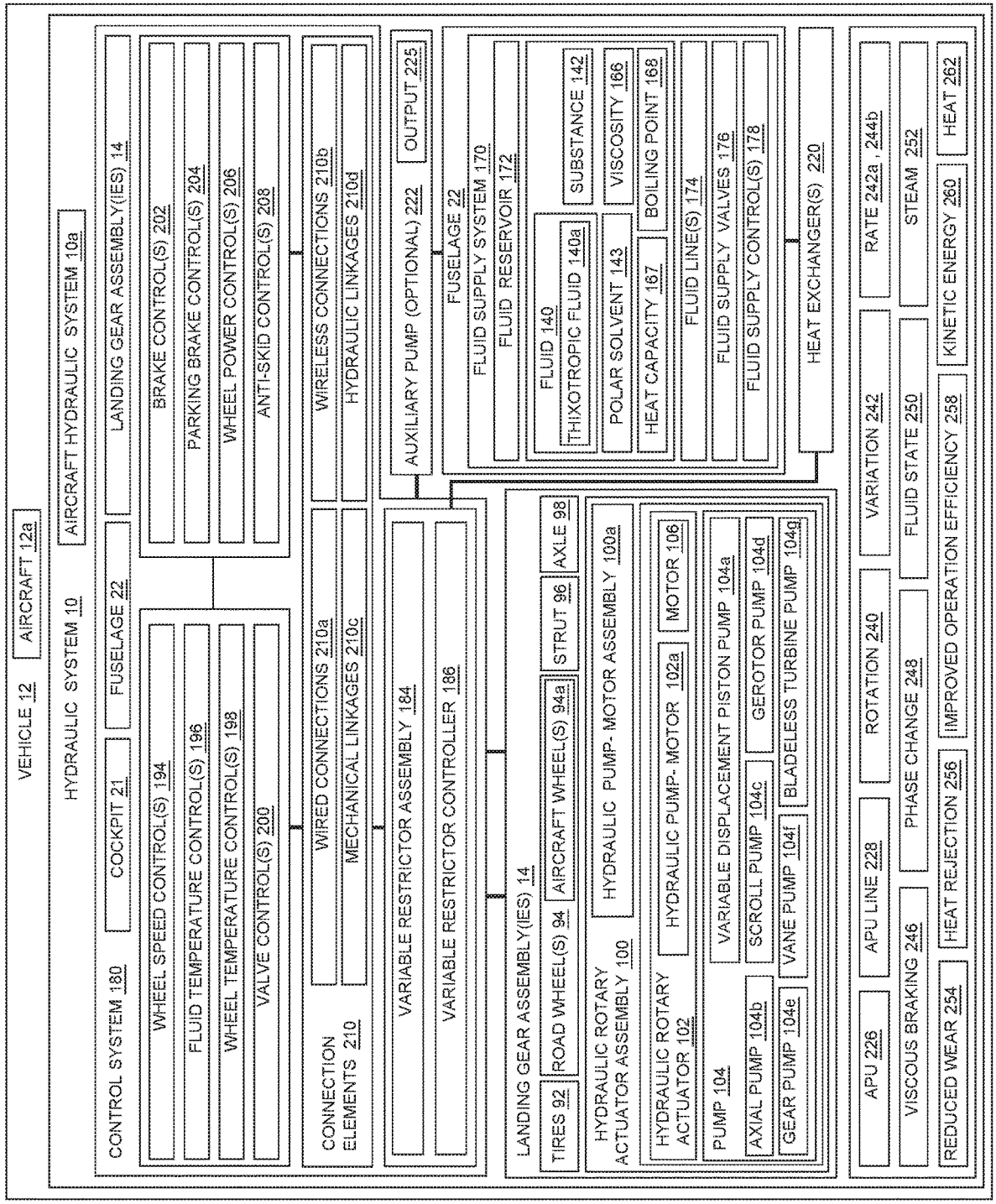
FIG. 9 is an illustration of a functional block diagram showing a vehicle in the form of an aircraft having a hydraulic system of the disclosure with versions of a hydraulic rotary actuator assembly.

In one version of the disclosure, as shown in FIGS. 5, 6A, 7, and 9, there is provided a hydraulic system 10 for a vehicle 12 (see FIGS. 1, 9). The vehicle 12 (see FIGS. 1, 5) may comprise an aircraft 12*a* (see FIGS. 1, 9), an automobile, or another vehicle with one or more road wheels 94 (see FIGS. 5, 9). The hydraulic system 10 (see FIGS. 5, 6A, 7, 9) comprises a hydraulic rotary actuator assembly 100 (see FIGS. 5, 6A, 7, 9), such as in the form of a hydraulic pump-motor assembly 100*a* (see FIGS. 5, 6A, 7, 9), rotationally coupled to a road wheel 94 (see FIGS. 5, 6A, 7, 9) of the vehicle 12 (see FIGS. 1, 9), for example, an aircraft wheel 94*a* (see FIG. 9), or another vehicle wheel. The hydraulic rotary actuator assembly 100 (see FIGS. 5, 6A, 7, 9) has a first operating mode 146 (see FIG. 7) comprising a braking operation 146*a* (see FIG. 7), wherein a rotation 240 (see FIG. 9) of the road wheel 94 (see FIGS. 5, 6A, 7, 9) causes the hydraulic rotary actuator assembly 100 to pump a fluid 140 (see FIGS. 5, 6A, 7, 9), such as a thixotropic fluid 140a (see FIGS. 5, 6A, 9), from a fluid supply system 170 (see FIGS. 5, 6A, 7, 9).

As further shown in FIGS. 5, 6A, 7, and 9, the hydraulic system 10 comprises a variable restrictor assembly 184 coupled to the hydraulic rotary actuator assembly 100 in the vehicle 12. The variable restrictor assembly 184 (see FIGS. 5, 6A, 7, 9) controls, or is configured to control, a flow 238 (see FIG. 8), of the fluid 140 (see FIGS. 5, 6A, 7, 9), such as thixotropic fluid 140a (see FIGS. 5, 6A, 9), flowing from the hydraulic rotary actuator assembly 100, to brake the rotation 240 (see FIG. 9) of the road wheel 94 (see FIGS. 5, 6A, 7, 9) on a ground surface 28 (see FIGS. 1, 5).

As further shown in FIGS. 5, 6A, 7, and 9, the hydraulic system 10 comprises a variable restrictor controller 186 coupled to the variable restrictor assembly 184. The variable restrictor controller 186 (see FIGS. 5, 6A, 7, 9) controls, or is configured to control, the variable restrictor assembly 184 (see FIGS. 5, 6A, 7, 9), so as to enable a variation 242 (see FIG. 9) of a rate 244a (see FIG. 9) of braking of the road wheel 94 (see FIGS. 5, 6A, 7, 9) on the ground surface 28 (see FIGS. 1, 5).

Figure 5:
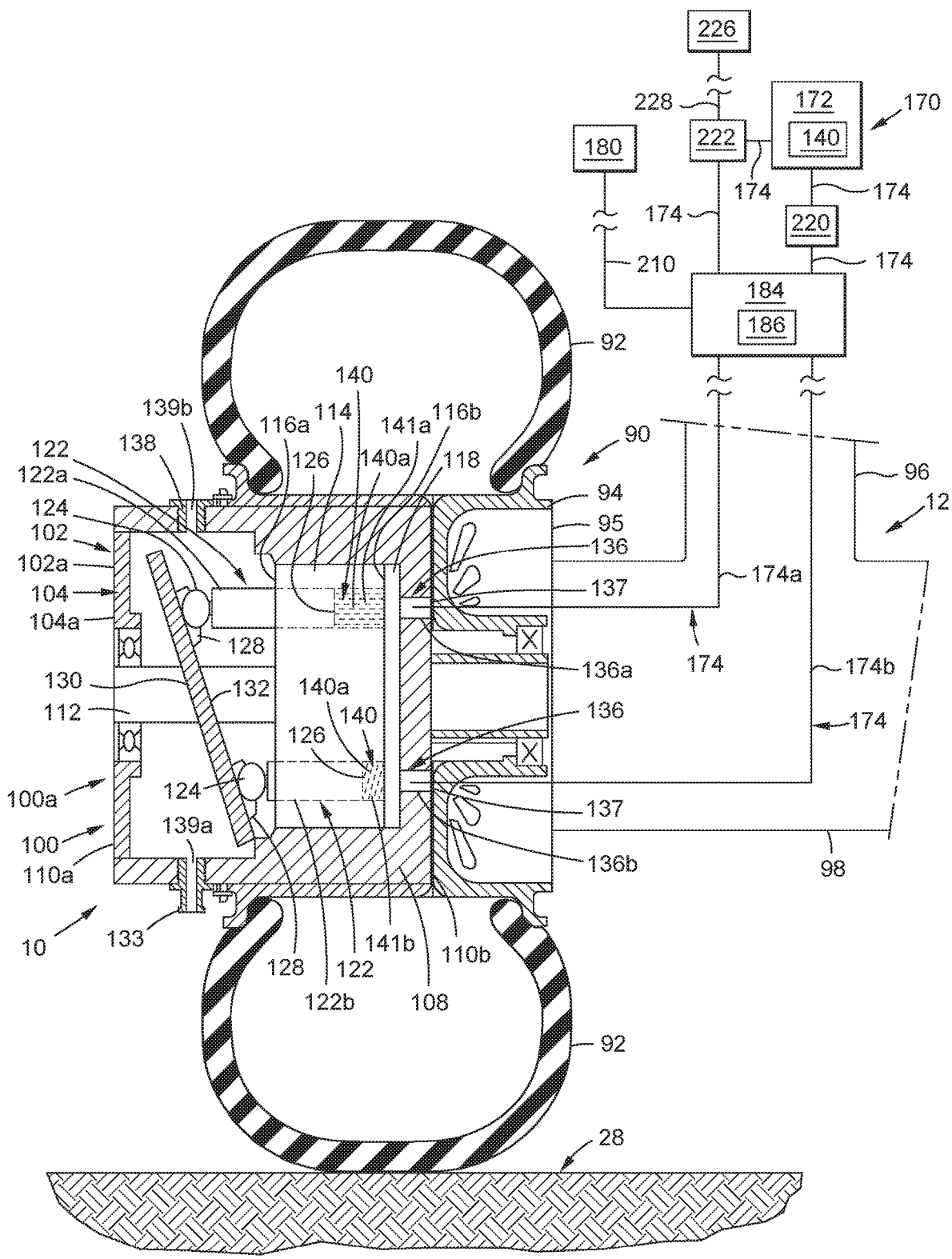
FIG. 5 is an illustration of a front view in partial cross-section of a hydraulic system of the disclosure with a version of a hydraulic rotary actuator assembly, where the hydraulic rotary actuator assembly is shown installed in a vehicle.

FIG. 5 is an illustration of a front view in partial cross-section of the hydraulic system 10 of the disclosure with a version of the hydraulic rotary actuator assembly 100, such as in the form of hydraulic pump-motor assembly 100a, where the hydraulic rotary actuator assembly 100 is shown installed in the road wheel 94 of the vehicle 12. The hydraulic rotary actuator assembly 100, such as in the form of hydraulic pump-motor assembly 100a, may be mounted or installed within the road wheel 94, or mounted or installed between a strut 96 (see FIG. 5) and the road wheel 94, and adjacent an axle 98 (see FIG. 5) coupled to the road wheel 94. If the vehicle 12 (see FIGS. 1, 5) is an aircraft 12a (see FIG. 1), the hydraulic rotary actuator assembly 100 (see FIG. 1) is preferably mounted or installed between the strut 96 (see FIG. 5) and the road wheel 94 (see FIG. 5), and adjacent the axle 98 (see FIG. 5) of a landing gear assembly 14 (see FIG. 1). FIG. 5 shows a wheel assembly 90 comprising a tire 92 coupled to the road wheel 94, where the road wheel 94 has a wheel rim 95. The tire 92 (see FIG. 5) is shown in contact with a ground surface 28 (see FIG. 5).

As shown in FIG. 5, the hydraulic rotary actuator assembly 100, such as in the form of hydraulic pump-motor assembly 100a, comprises a hydraulic rotary actuator 102, such as in the form of hydraulic pump-motor 102a, for example, a pump 104, such as a variable displacement piston pump 104a. The term "hydraulic rotary actuator" is intended to refer to any transducer mechanism that is capable of converting rotation into fluid flow and vice versa. The variable displacement piston pump 104a (see FIG. 5) is a positive or fixed displacement pump, in that it pumps a constant amount of fluid, such as a fluid 140, for example, a thixotropic fluid 140a (see FIGS. 5, 9), for each revolution or rotation 240 (see FIG. 9). The variable displacement piston pump 104a is a device that converts kinetic energy 260 (see FIG. 9), such as mechanical energy, into heat 262 (see FIG. 9) through fluid resistance 239 (see FIG. 8), or fluid energy or flow 238 (see FIG. 8), by pushing the fluid 140 (see FIG. 9), such as thixotropic fluid 140a (see FIGS. 5, 9), with a plurality of pistons 122 (see FIGS. 5, 6A) with a force.

As shown in FIG. 5, the hydraulic rotary actuator assembly 100, such as in the form of hydraulic pump-motor assembly 100a, further comprises a housing 108 that houses the hydraulic rotary actuator 102. As shown in FIG. 5, the housing 108 comprises a first end 110a, and comprises a second end 110b adjacent to the road wheel 94 and near the axle 98. The hydraulic rotary actuator 102 (see FIG. 5) rotates, or is configured to rotate, when the road wheel 94 (see FIG. 5) rotates, to convert a rotation 240 (see FIG. 7) into a flow 238 (see FIG. 8) of the fluid 140, such as the thixotropic fluid 140a (see FIG. 5).

Alternatively, instead of using the hydraulic rotary actuator 102 (see FIG. 5) in the form of the variable displacement piston pump 104a (see FIG. 5), the hydraulic rotary actuator 102 of the hydraulic rotary actuator assembly 100 (see FIG. 5) may comprise another type of pump 104. For example, the pump 104 may comprise one of, the variable displacement piston pump 104a (see FIG. 9), an axial pump 104b (see FIG. 9), a scroll pump 104c (see FIG. 9), a gerotor pump 104d (see FIG. 9), a gear pump 104e (see FIG. 9), a vane pump 104f (see FIG. 9), a bladeless turbine pump 104g (see FIG. 9), or another type of pump 104.

An axial pump 104b (see FIG. 9) comprises a propeller or screw-type impeller that spins inside a tube. The propeller may be driven by a sealed motor in the tube, by an electric motor mounted to the outside of the tube, or by a drive shaft that enters the tube from the side. The fluid 140 (see FIG. 9), such as the thixotropic fluid 140a (see FIG. 9), may be pushed into the axial pump 104b axially in a direction parallel to a shaft of the propeller, and may be discharged axially out of the axial pump 140b. The axial pump 140b is a dynamic pump, in that it may use momentum and velocity of the fluid 140, such as thixotropic fluid 140a, to generate pump pressure.

A scroll pump 104c (see FIG. 9) comprises two interleaved spiral-shaped scrolls that may pump or compress the fluid 140 (see FIG. 9), such as the thixotropic fluid 140a (see FIG. 9). One of the scrolls may be fixed, while the other scroll may orbit eccentrically without rotating, so that pockets of the fluid 140, such as the thixotropic fluid 140a, may be trapped and compressed between the scrolls, until the fluid 140, such as the thixotropic fluid 140a, reaches a minimum volume and a maximum pressure at the scrolls' center, where the pump outlet is located. Alternatively, the scrolls may be co-rotated, in synchronous motion, but with offset centers of rotation, to produce the pumping or compression motion. The scroll pump 104c (see FIG. 9) is a positive or fixed displacement pump, in that it pumps a constant amount of fluid for each revolution.

A gerotor pump 104d (see FIG. 9) comprises a drive shaft with an inner gear rotor and an outer gear rotor. As the inner gear rotor rotates, a volume is created between the inner gear rotor and the outer gear rotor that creates a partial vacuum, and the fluid 140, such as the thixotropic fluid 140a, may be drawn in through a valve plate and an inlet flow valve at an inlet or intake side of the gerotor pump 104d. As the inner gear rotor continues to rotate, the volume is reduced in size, and the fluid 140, such as the thixotropic fluid 140a, may be discharged out through the valve plate and the outlet flow valve at an outlet or discharge side of the gerotor pump 104d.

A gear pump 104e (see FIG. 9) comprises two meshed gears that revolve in a housing. A driving gear is driven by an engine of an aircraft or another power source. A driven gear meshes with, and is driven by, the driving gear. As the meshed gears rotate, they separate on the an inlet or intake side of the gear pump, creating a void and suction which may be filled by the fluid 140, such as the thixotropic fluid 140a. The fluid 140, such as the thixotropic fluid 140a, may be carried by the meshed gears to the outlet or discharge side of the gear pump, where the meshing of the gears may displace the fluid 140, such as the thixotropic fluid 140a. The gear pump 104e (see FIG. 9) may comprise an external gear pump which uses two external gears, or an internal gear pump which uses an external gear and an internal gear. The gear pump 104e (see FIG. 9) is a positive or fixed displacement pump, in that it pumps a constant amount of fluid for each revolution, and preferably, the gear pump 104e is designed to function as either a pump or a motor.

A vane pump 104f (see FIG. 9) comprises a circular rotor rotating inside a larger circular cavity, where the centers of the two circles are offset, causing eccentricity. A plurality of vanes slide into and out of the circular rotor and seal on all edges, creating a plurality of vane chambers that provide the pumping. On the inlet or intake side of the vane pump 104f, the vane chambers increase in volume and may be filled with the fluid 140, such as the thixotropic fluid 140a (see FIG. 9) forced into the vane pump 104f by an inlet pressure. On the outlet or discharge side of the vane pump 104f, the vane chambers decrease in volume and may force the fluid 140, such as the thixotropic fluid 140a, out of the vane pump 104f. The vane pump 104f may comprise various vane configurations, including sliding vane, flexible vane, swinging vane, rolling vane, and external vane. The vane pump 104f is a positive or fixed displacement pump.

A bladeless turbine pump 104g (see FIG. 9) comprises a disk or a series of closely packed parallel disks attached to a shaft and arranged within a sealed housing. When a fluid 140, such as a thixotropic fluid 140a, (see FIG. 9) is allowed to enter the housing at an inlet or intake side of the bladeless turbine pump 104g, and pass over the disk or between the disks, the disk or disks turn, which in turn rotates the shaft. The fluid, such as the thixotropic fluid 140a, may then be discharged out of the bladeless turbine pump 104g at an outlet or discharge side of the bladeless turbine pump 104g. The fluid 140, such as the thixotropic fluid 140a, may drag on the disk or disks via viscosity and adhesion of a surface layer of the fluid 140, such as the thixotropic fluid 140a.

As shown in FIG. 5, in one version, the hydraulic rotary actuator 102, such as the pump 104, for example, the variable displacement piston pump 104a, comprises a shaft 112, a cylinder block 114, a valve plate 118, a plurality of pistons 122 coupled to piston shoes 128, and a swash plate 130. As further shown in FIG. 5, the cylinder block 114 comprises a first end 116a and a second end 116b. The plurality of pistons 122 (see FIG. 5) are preferably arranged parallel to each other and slidably secured in the cylinder block 114 (see FIG. 5). Each of the plurality of pistons 122 (see FIG. 5) rotates, or is configured to rotate, around the shaft 112 (see FIG. 5), to generate reciprocating motions of the pistons 122, which draw the fluid 140, such as the thixotropic fluid 140a (see FIG. 5), into the cylinder block 114, and discharge the fluid 140, such as the thixotropic fluid 140, out of the cylinder block 114, to produce a flow 238 (see FIG. 8) of the fluid 140, such as the thixotropic fluid 140a. For purposes of clarity, FIG. 5 shows the plurality of pistons 122 including two pistons 122, for example, a first piston 122a and a second piston 122b. However, the number of pistons 122 used in the hydraulic rotary actuator 102, such as the pump 104, in the form of the variable displacement piston pump 104a, is preferably a greater number, for example, six pistons, seven pistons, nine pistons, eleven pistons, or more pistons.

Each of the plurality of pistons 122 (see FIG. 5) is coupled between the swash plate 130 (see FIG. 5) and the valve plate 118 (see FIG. 5). As shown in FIG. 5, each piston 122 has a first rounded end 124 and a second flat end 126. The first rounded end 124 (see FIG. 5) of each piston 122 may be pivotably coupled to a piston shoe 128 (see FIG. 5). Each piston shoe 128 (see FIG. 5) coupled to each piston 122 glides or moves along, or is configured to glide or move along, a surface 132 (see FIG. 5) of the swash plate 130 (see FIG. 5). At the end opposite the swash plate 130 (see FIG. 5), the valve plate 118 (see FIG. 5) enables contact of the fluid 140, such as the thixotropic fluid 140a (see FIG. 5), to the second flat ends 126 (see FIG. 5) of the plurality of pistons 122 (see FIG. 5). The cylinder block 114 (see FIG. 5) may further comprise one or more springs (not shown) that may provide force against the pistons 122, to move the pistons 122 toward the swash plate 130.

During the pumping action of the hydraulic rotary actuator 102 (see FIG. 5), the plurality of pistons 122 (see FIG. 5) rotate about the shaft 112 (see FIG. 5). As the plurality of pistons 122 (see FIG. 5) rotate about the shaft 112 (see FIG. 5), the plurality of pistons 122 move in and out of the cylinder block 114 (see FIG. 5). The valve plate 118 (see FIG. 5) at the opposite end from the swash plate 130 (see FIG. 5) alternately connects each piston 122 (see FIG. 5) in the cylinder block 114 (see FIG. 5) to the fluid lines 174 (see FIG. 5) and to a fluid reservoir 172 (see FIG. 9) of the fluid supply system 170 (see FIG. 5) of the hydraulic system 10 (see FIG. 5), where the fluid reservoir 172 (see FIG. 9) contains fluid 140, such as thixotropic fluid 140a. The valve plate 118 (see FIG. 5) enables contact of the fluid 140 (see FIG. 5), such as the thixotropic fluid 140a (see FIGS. 5, 9), to the plurality of pistons 122 (see FIG. 5).

Figure 6A:
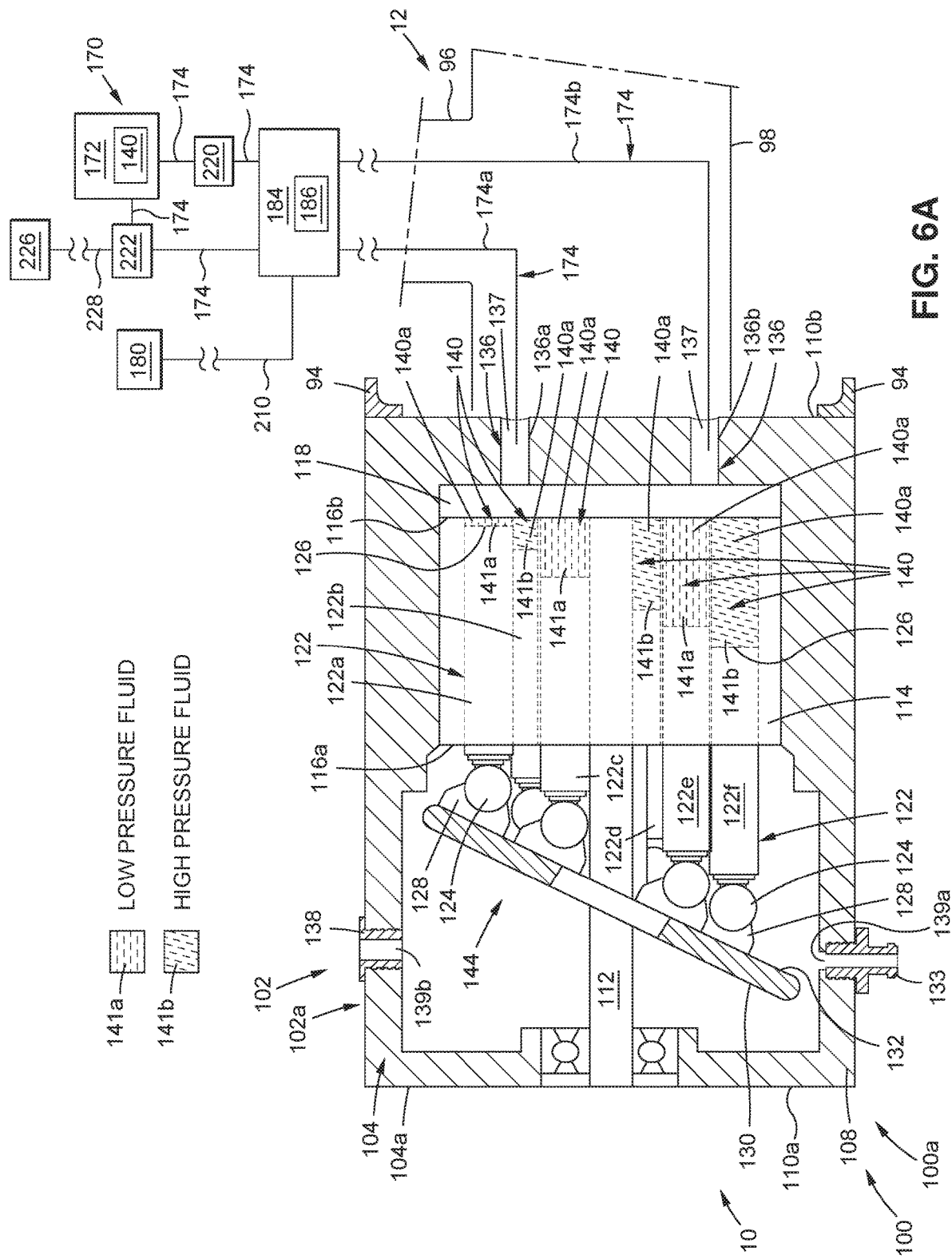
FIG. 6A is an illustration of an enlarged front view in partial cross-section of a hydraulic system of the disclosure with a version of a hydraulic rotary actuator assembly, where the hydraulic rotary actuator assembly is shown installed in a vehicle.

By changing the angled position 144 (see FIG. 6A) of the swash plate 130 (see FIG. 5), the stroke of the pistons 122 (see FIG. 5) may be varied continuously. If the swash plate 130 is vertical, or perpendicular to the axis of rotation, no flow 238 (see FIG. 8) of the fluid 140, such as thixotropic fluid 140a (see FIG. 5), occurs. If the swash plate 130 (see FIG. 5) is at the angled position 144 (see FIG. 6A), such as angled forward as shown in FIG. 6A, or angled backward as shown in FIG. 5, a volume of the fluid 140, such as the thixotropic fluid 140a (see FIG. 5), may be allowed to flow or be pumped into the hydraulic rotary actuator 102. The greater the angle of the angled position 144 (see FIG. 6A) of the swash plate 130 (see FIG. 5), the greater the suction of the fluid 140, such as the thixotropic fluid 140a (see FIG. 5), into the hydraulic rotary actuator 102 (see FIG. 5), and the greater the discharge of the fluid 140, such as the thixotropic fluid 140a, out of the hydraulic rotary actuator 102. The smaller the angle of the angled position 144 (see FIG. 6A) of the swash plate 130, the lesser the suction of the fluid 140, such as the thixotropic fluid 140a, into the hydraulic rotary actuator 102, and the lesser the discharge of the fluid 140, such as the thixotropic fluid 140a, out of the hydraulic rotary actuator 102. In one version, the hydraulic rotary actuator 102 (see FIG. 5) may allow the swash plate 130 (see FIG. 5) to be moved in both directions from the vertical position, pumping the fluid 140, such as the thixotropic fluid 140a (see FIG. 5), in either direction, without reversing the rotation of the hydraulic rotary actuator 102. The hydraulic rotary actuator 102 (see FIGS. 5, 9) may be of a variable displacement design or a fixed displacement design.

The fluid 140 (see FIGS. 5, 9) of the hydraulic system 10 (see FIGS. 5, 7, 9) may comprise one of, a mineral oil-based hydraulic fluid, a water-based hydraulic fluid, a fire-resistant hydrogenated polyalphaolefin-based fluid, phosphate ester-based hydraulic fluid, a thixotropic fluid 140a, or another suitable fluid 140.

The fluid 140, such as in the form of the thixotropic fluid 140a (see FIGS. 5, 9), preferably comprises a substance 142 (see FIG. 9) mixed with or into a polar solvent 143 (see FIG. 9). The substance 142 may comprise one of, cornstarch, fumed silica, iron oxide gel, xanthan gum, or another suitable substance 142. The polar solvent 143 (see FIG. 9) may comprise one of, water, propylene carbonate, diphenyl ether, triethylene glycol dimethyl ether (triglyme), 1,3-dimethyl-3,4,5,6-tetrahydro-2(1H)-pyrimidinone (DMPU), or another suitable polar solvent 143. The fluid 140, such as the thixotropic fluid 140a (see FIGS. 5, 9), may comprise one of, a suspension of cornstarch in the polar solvent 143, a suspension of fumed silica in the polar solvent 143, a suspension of iron oxide gel in the polar solvent 143, a solution of xanthan gum in the polar solvent 143, a gelatin which contains water, or another suitable fluid 140, such as the thixotropic fluid 140a.

The fluids 140 (see FIGS. 5, 9), including the thixotropic fluid 140a (see FIGS. 5, 9), each has a viscosity 166 (see FIG. 9), preferably a high viscosity, that makes it closer to a solid than a liquid and/or that makes it a thick or viscous fluid. High viscosity fluids, including thixotropic fluids 140a, may be particularly advantageous because they react to produce higher viscosity at high speed deformations, enabling an efficient and safe absorption of braking energy. In addition, high viscosity fluids, including thixotropic fluids 140a, may be used over a broad range of temperatures. The fluid 140, including the thixotropic fluid 140 (see FIGS. 5, 9), has a heat capacity 167 (see FIG. 9), preferably a high heat capacity, and has a boiling point 168 (see FIG. 9).

As used herein, "thixotropic fluid" means a fluid, a gel, or a colloid material that is thick or viscous under static or resting conditions, and that becomes more fluid or less viscous and thinner over time, when agitated or otherwise stressed, and a thixotropic fluid is a fluid, gel, or colloid material that takes a finite time to attain equilibrium when introduced to a step change in shear rate. As used herein, "viscosity" means a measure of the resistance to flow of a fluid, for example, a thixotropic fluid, and a fluid with high viscosity is more solid than liquid, and a high viscosity liquid requires more power to pump than a low viscosity liquid.

As shown in FIG. 5, the hydraulic rotary actuator assembly 100, such as in the form of hydraulic pump-motor assembly 100a, may further comprise a drain port 133 coupled to the hydraulic rotary actuator 102, via an opening 139a, such as a drain port opening, in the housing 108. The drain port 133 (see FIG. 5) drains, or is configured to drain, from the hydraulic rotary actuator 102 in the housing 108, any excess fluid 140, such as thixotropic fluid 140a (see FIG. 5), that may leak from, or out of, the pistons 122 (see FIG. 5) during pumping. The excess drained fluid 140, such as thixotropic fluid 140a, is sent to the fluid reservoir 172 (see FIG. 5) of the fluid supply system 170 (see FIGS. 5, 9). Although FIG. 5 shows one drain port 133, more than one drain port 133 may be coupled to the hydraulic rotary actuator 102.

As shown in FIG. 5, the hydraulic rotary actuator assembly 100, such as in the form of hydraulic pump-motor assembly 100a, further comprises one or more flow ports 136 coupled to the hydraulic rotary actuator 102, via one or more openings 137 in the housing 108. As further shown in FIG. 5, the flow ports 136 comprise an inlet flow port 136a and an outlet flow port 136b.

Figure 7:
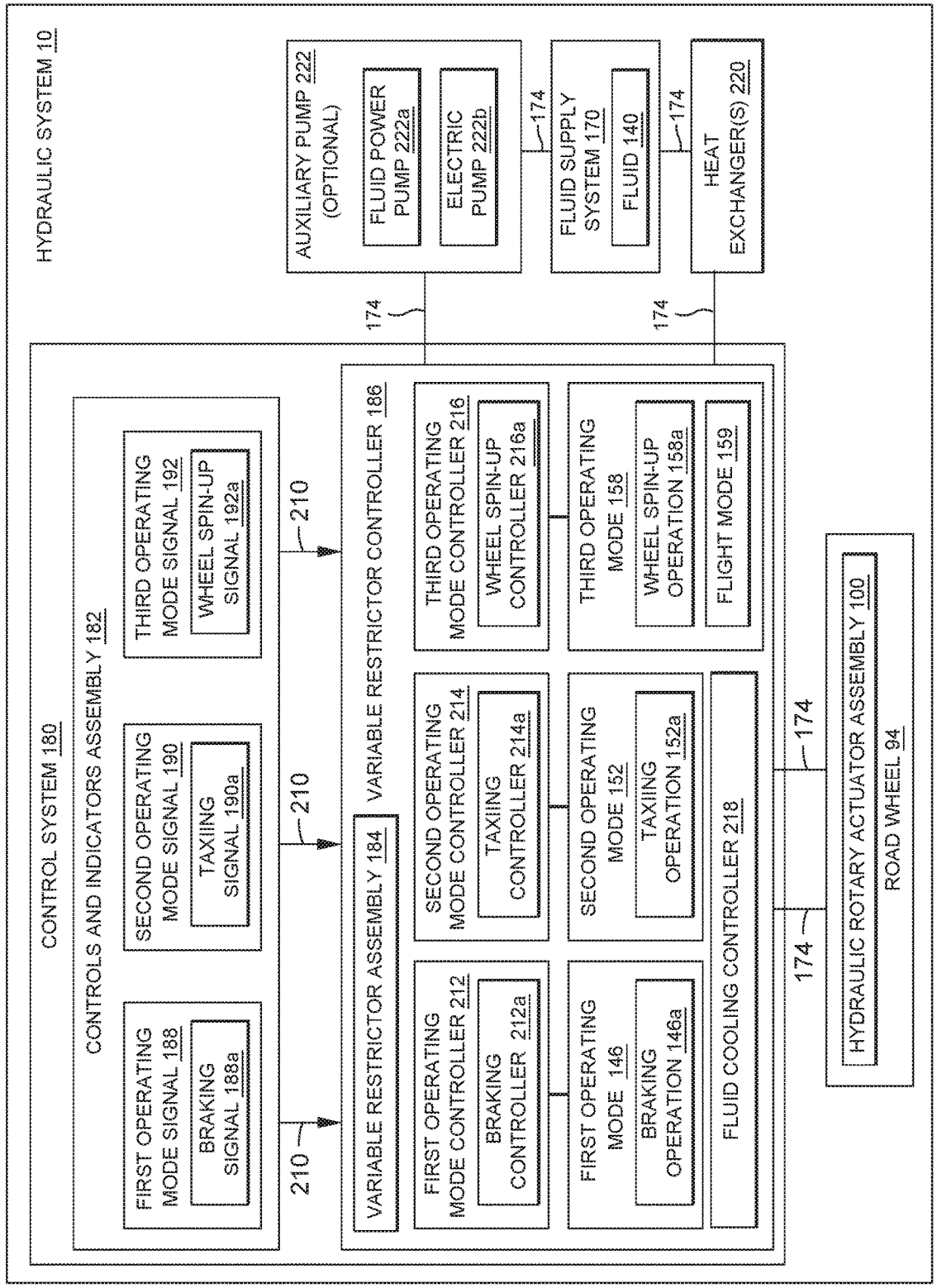
FIG. 7 is an illustration of a functional block diagram showing a hydraulic system of the disclosure and operating modes of the control system.
Figure 8:
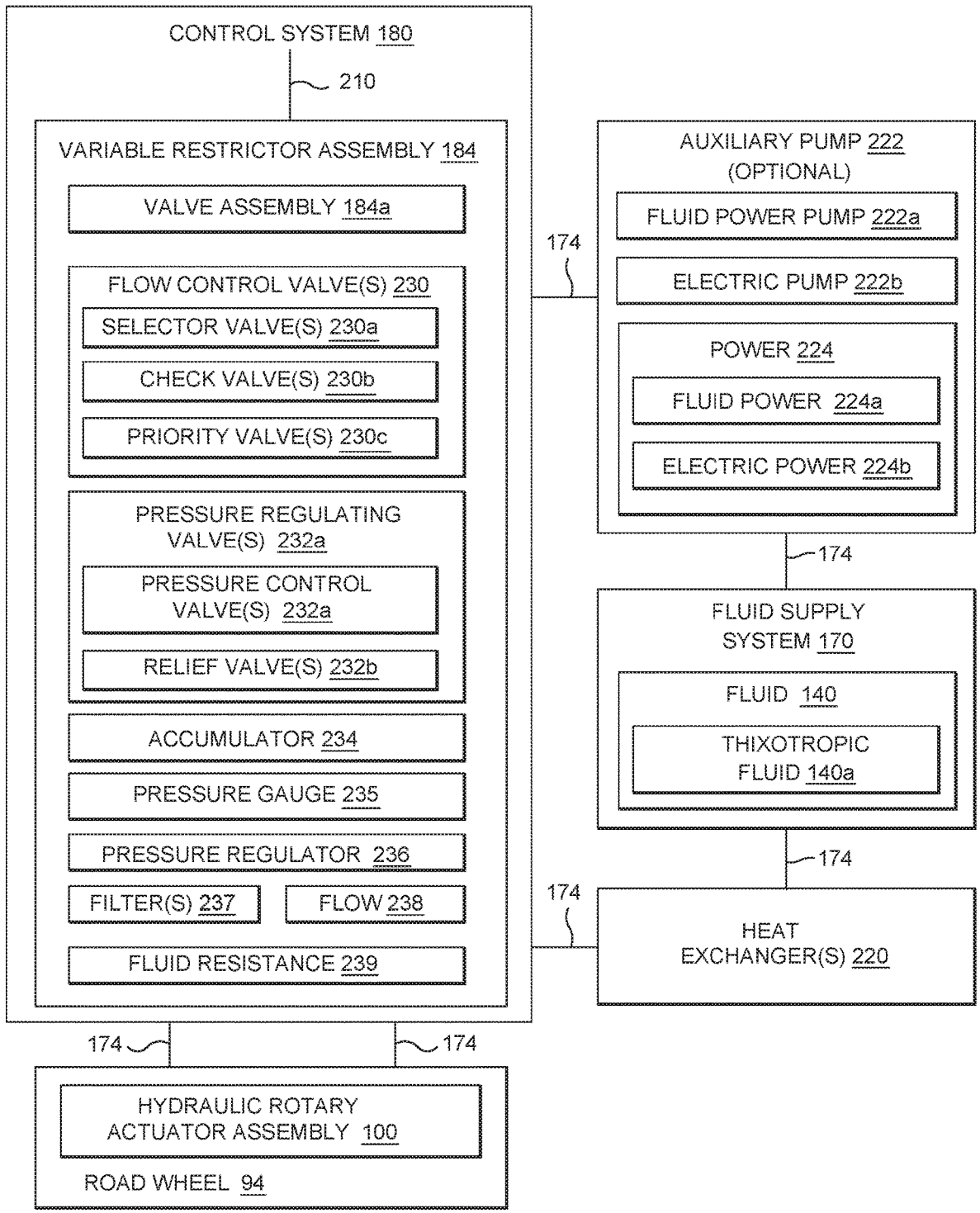
FIG. 8 is an illustration of a functional block diagram showing a version of a variable restrictor assembly of the disclosure.

The inlet flow port 136a (see FIG. 5) receives, or is configured to receive, the fluid 140, such as the thixotropic fluid 140a (see FIG. 5), for example, a low pressure fluid 141a (see FIG. 5) during a braking operation 146a (see FIGS. 6B, 7), at a low pressure, into the hydraulic rotary actuator 102 (see FIG. 5) of the hydraulic rotary actuator assembly 100, from the fluid reservoir 172 (see FIG. 5) of the fluid supply system 170 (see FIG. 5), via the variable restrictor assembly 184 (see FIGS. 5, 8). As shown in FIG. 5, the first piston 122a is moved away from the valve plate 118 with the fluid 140, such as the thixotropic fluid 140a, for example, low pressure fluid 141a, received through the valve plate 118 and through the inlet flow port 136a.

The outlet flow port 136b (see FIG. 5) discharges the fluid 140, such as the thixotropic fluid 140a (see FIG. 5), for example, a high pressure fluid 141b (see FIG. 5) during a braking operation 146a (see FIGS. 6B, 7), at a high pressure, from the hydraulic rotary actuator 102 (see FIG. 5) of the hydraulic rotary actuator assembly 100, to the fluid reservoir 172 (see FIG. 5), of the fluid supply system 170 (see FIG. 5), via the variable restrictor assembly 184 (see FIGS. 5, 8). As shown in FIG. 5, the second piston 122b is moved closer to the valve plate 118 with the fluid 140, such as the thixotropic fluid 140a, for example, the high pressure fluid 141b, discharged through the valve plate 118 and the outlet flow port 136b.

As shown in FIG. 5, the hydraulic rotary actuator assembly 100, such as in the form of hydraulic pump-motor assembly 100a, may further comprise one or more vents 138 coupled to the hydraulic rotary actuator 102, via an opening 139b, such as a vent opening, formed in the housing 108. The one or more vents 138 (see FIG. 5) facilitate removal of steam 252 (see FIG. 9) formed from a phase change 248 (see FIG. 9) of the fluid 140, such as the thixotropic fluid 140a (see FIGS. 5, 9), when the fluid 140, such as the thixotropic fluid 140a, is heated to the boiling point 168 (see FIG. 9) of the fluid 140, such as the thixotropic fluid 140a, that is being used. Although FIG. 5 shows one vent 138, more than one vent 138 may be coupled to the hydraulic rotary actuator 102.

As shown in FIG. 5, the hydraulic system 10 further comprises the fluid supply system 170. The fluid supply system 170 (see FIGS. 1, 5) is preferably installed in the interior 27 (see FIG. 1) of the aircraft 12a (see FIG. 1), and coupled to the hydraulic rotary actuator assembly 100 (see FIGS. 1, 5), via the variable restrictor assembly 184, which is controlled with a variable restrictor controller 186. The variable restrictor assembly 184 is coupled to the hydraulic rotary actuator assembly 100 with fluid lines 174 of the fluid supply system 170. As shown in FIG. 5, the variable restrictor assembly 184 may be coupled to one or more heat exchangers 220, via a fluid line 174, and the one or more heat exchangers 220 may be coupled to the fluid reservoir 172, via a fluid line 174. As further shown in FIG. 5, the fluid reservoir 172 may be coupled, via a fluid line 174, to an auxiliary pump 222, which may be optional. As further shown in FIG. 5, an auxiliary power unit (APU) may be coupled or connected to the optional auxiliary pump 222, via one or more auxiliary power unit (APU) lines 228. As further shown in FIG. 5, the auxiliary pump 222 may be coupled to the variable restrictor assembly 184 via a fluid line 174. In the absence of the auxiliary pump 222, the fluid reservoir 172 of the fluid supply system 170 may be directly coupled to the variable restrictor assembly 184. Thus, the fluid reservoir 172 of the fluid supply system 170 may be directly or indirectly coupled to the variable restrictor assembly 184. As further shown in FIG. 5, a control system 180 is coupled or connected to the variable restrictor assembly 184 and the variable restrictor controller 185, via one or more connection elements 210.

The fluid supply system 170 (see FIGS. 5, 9) comprises the fluid reservoir 172 (see FIGS. 5, 9) containing the fluid 140 (see FIGS. 5, 9), such as the thixotropic fluid 140a (see also FIGS. 5, 9). The fluid 140 (see FIG. 5), such as the thixotropic fluid 140a (see FIG. 5), is transported to and from and between the hydraulic rotary actuator 102 (see FIG. 5), the variable restrictor assembly 184 (see FIG. 5), and the fluid reservoir 172 with fluid lines 174 (see FIG. 5), coupled to the flow ports 136 (see FIG. 5). As shown in FIG. 5, one or more fluid supply lines 174a coming from the variable restrictor assembly 184, the fluid reservoir 172, and the optional auxiliary pump 222, may be coupled to an inlet flow port 136a, and one or more fluid return lines 174b may be coupled to an outlet flow port 136b and go to or connect to the variable restrictor assembly 184, the one or more heat exchangers 220, and the fluid reservoir 172.

The auxiliary pump 222 (see FIG. 5) may comprise a fluid power pump 222a (see FIG. 8) or an electric pump 222b (see FIG. 8). The fluid power pump 222a (see FIG. 8) may be powered with fluid power 224a (see FIG. 8) provided by a fluid power source, such as from the APU 226 (see FIGS. 1, 5), via the one or more APU lines 228 (see FIGS. 1, 5), such as in the form of hydraulic fluid lines, tubes, or hoses, between the APU 226 and the fluid power pump 222a. The electric pump 222b (see FIG. 8) may be powered with electric power 224b (see FIG. 8) provided by an electric power source, such as from the APU 226, via one or more APU lines 228, such as in the form of electrical wires or wired connections, between the APU 226 and the electric pump 222b.

As discussed above, in one version, the hydraulic rotary actuator assembly 100 (see FIGS. 1, 5) may include the first operating mode 146 (see FIG. 7), such as the braking operation 146a (see FIG. 7), where the rotation 240 (see FIG. 9) of the road wheel 94 (see FIG. 5) causes the hydraulic rotary actuator 102 (see FIG. 5) and the hydraulic rotary actuator assembly 100 to pump the fluid 140 (see FIG. 5). In another version, the hydraulic rotary actuator assembly 100 (see FIGS. 1, 5) may include the first operating mode 146 (see FIG. 7) and may also include a second operating mode 152 (see FIG. 7), such as a taxiing operation 152a (see FIG. 7) and/or a third operating mode 158 (see FIG. 7), such as a wheel spin-up mode 158a (see FIG. 7). With the second operating mode 152 and the third operating mode 158, the flow 238 (see FIG. 8) of the fluid 140 (see FIG. 5), such as the thixotropic fluid 140a (see FIG. 5), may be directed or pumped from the fluid reservoir 172 (see FIG. 5) by the auxiliary pump 222 (see FIG. 5), and directed or pumped through the variable restrictor assembly 184 (see FIG. 5), and through the hydraulic rotary actuator assembly 100 (see FIG. 5) and the hydraulic rotary actuator 102 (see FIG. 5), which causes the road wheel 94 (see FIG. 5) to rotate.

With the second operating mode 152 (see FIG. 7) comprising the taxiing operation 152a (see FIG. 7), the auxiliary pump 222 (see FIG. 5) is used, and the APU 226 (see FIG. 5) may be used to power the auxiliary pump 222. The auxiliary pump 222 (see FIG. 5) is coupled between the variable restrictor assembly 184 (see FIG. 5) and the fluid reservoir 172 (see FIG. 5) of the fluid supply system 170 (see FIG. 5) in the vehicle 12 (see FIG. 5). The auxiliary pump 222 (see FIG. 5) pumps the fluid 140 (see FIG. 5), such as thixotropic fluid 140a (see FIG. 5), through the hydraulic rotary actuator assembly 100 (see FIG. 5) and the hydraulic rotary actuator 102 (see FIG. 5), via the variable restrictor assembly 184 (see FIG. 5), to cause the road wheel 94 (see FIG. 5) to rotate on the ground surface 28 (see FIG. 5). A taxiing controller 214a (see FIG. 7) integral with and coupled to the variable restrictor assembly 184 controls an output 225 (see FIG. 9) of the auxiliary pump 222 (see FIG. 5), so as to enable variation 242 (see FIG. 9) of the rate 244b (see FIG. 9) of rotation 240 (see FIG. 9) of the road wheel 94 (see FIG. 9) of the vehicle 12 (see FIG. 5), such as the aircraft 12a (see FIG. 1), that is on the ground surface 28 (see FIGS. 1, 5), to provide the taxiing operation 152a (see FIG. 7) to taxi the vehicle 12 (see FIG. 5), such as an aircraft 12a (see FIG. 1).

With the third operating mode 158 (see FIG. 7) comprising the wheel spin-up operation 158a (see FIG. 7), an auxiliary pump 222 (see FIG. 5) is used, and the APU 226 (see FIG. 5) may be used to power the auxiliary pump 222. With the third operating mode 158 (see FIG. 7), preferably the vehicle 12 (see FIG. 1) is an aircraft 12a (see FIG. 1) or another vehicle that is capable of flight in the air. With the third operating mode 158 (see FIG. 7), the auxiliary pump 222 (see FIG. 5) is coupled between the variable restrictor assembly 184 (see FIG. 5) and the fluid reservoir 172 (see FIG. 5) of the fluid supply system 170 (see FIG. 5) in the vehicle 12 (see FIG. 5). The auxiliary pump 222 (see FIG. 5) pumps the fluid 140 (see FIG. 5), such as thixotropic fluid 140a (see FIG. 5), through the hydraulic rotary actuator assembly 100 (see FIG. 5) and the hydraulic rotary actuator 102 (see FIG. 5), via the variable restrictor assembly 184, to cause the road wheel 94 (see FIG. 5), such as the aircraft wheel 94a (see FIG. 9), to rotate during a flight mode 159 (see FIG. 7), prior to the vehicle 12 (see FIG. 5), such as the aircraft 12a (see FIGS. 1, 9), landing or touching down on the ground surface 28 (see FIG. 5).

A wheel spin-up controller 216a (see FIG. 7) integral with and coupled to the variable restrictor assembly 184 controls an output 225 (see FIG. 9) of the auxiliary pump 222 (see FIG. 5), so as to enable variation 242 (see FIG. 9) of the rate 244b (see FIG. 9) of rotation 240 (see FIG. 9) of the road wheel 94 (see FIG. 9) of the vehicle 12 (see FIG. 5), such as the aircraft 12a (see FIG. 1), during the flight mode 159 (see FIG. 7), to provide the wheel spin-up operation 158a (see FIG. 7), to rapidly spin up or rotate the road wheels 94, such as the aircraft wheels 94a, to a full speed, while in the flight mode 159 (see FIG. 7).

As shown in FIG. 5, the hydraulic system 10 further comprises the control system 180. The control system 180 (see FIGS. 1, 5) is preferably installed in the interior 27 (see FIG. 1) of the aircraft 12a (see FIG. 1), and coupled to the hydraulic rotary actuator assembly 100 (see FIGS. 1, 5). The control system 180 (see FIGS. 5, 7, 9) comprises a controls and indicators assembly 182 (see FIG. 7) coupled to a variable restrictor assembly 184 (see FIG. 7), via one or more connection elements 210 (see FIGS. 1, 5, 7). The one or more connection elements 210 (see FIGS. 5, 7, 9) may comprise one or more of, wired connections 210a (see FIG. 9), wireless connections 210b (see FIG. 9), mechanical linkages 210c (see FIG. 9), hydraulic linkages 210d (see FIG. 9), or another suitable connection element 210. The control system 180 (see FIGS. 1, 5) controls operation of the hydraulic rotary actuator assembly(ies) 100 (see FIGS. 1, 5). The controls and indicators assembly 182 (see FIG. 7) of the control system 180 (see FIGS. 5, 7, 9) may comprise one or more of, wheel speed controls 194 (see FIG. 9), fluid temperature controls 196 (see FIG. 9), wheel temperature controls 198 (see FIG. 9), valve controls 200 (see FIG. 9), brake controls 202 (see FIG. 9), parking brake controls 204 (see FIG. 9), wheel power controls 206 (see FIG. 9), anti-skid controls 208 (see FIG. 9), or other suitable controls. The variable restrictor assembly 184 (see FIG. 7) of the control system 180 (see FIGS. 5, 7, 9), discussed in further detail below with respect to FIG. 7, may comprise a variable restrictor controller 186 (see FIG. 7), a braking controller 212a (see FIG. 7), a taxiing controller 214a (see FIG. 7), a wheel spin-up controller 216a (see FIG. 7), a fluid cooling controller 218 (see FIG. 7), and/or another suitable controller.

Now referring to FIG. 6A, FIG. 6A is an illustration of an enlarged front view in partial cross-section of a hydraulic system 10 of the disclosure with another version of a hydraulic rotary actuator assembly 100, such as in the form of hydraulic pump-motor assembly 100a, where the hydraulic rotary actuator assembly 100 is shown installed in the landing gear assembly 14 for a vehicle 12 (see FIG. 1), such as an aircraft 12a (see FIG. 1). As shown in FIG. 6A, the hydraulic rotary actuator assembly 100, such as in the form of hydraulic pump-motor assembly 100a, is mounted or installed between the strut 96 and the road wheel 94, and adjacent the axle 98 of the vehicle 12. If the vehicle 12 is an aircraft 12a, the hydraulic rotary actuator assembly 100 may be mounted or coupled to the landing gear assembly 14 (see FIG. 1). The road wheel 94 (see FIG. 6A) is coupled to a tire 92 (not shown) similar to the tire 92 shown in FIG. 5.

As shown in FIG. 6A, the hydraulic rotary actuator assembly 100, such as in the form of hydraulic pump-motor assembly 100a, comprises the hydraulic rotary actuator 102, such as in the form of hydraulic pump-motor 102a, for example, a pump 104, such as a variable displacement piston pump 104a, for example, a variable displacement piston pump 104a with six pistons 122. As shown in FIG. 6A, the hydraulic rotary actuator assembly 100, such as in the form of hydraulic pump-motor assembly 100a, further comprises the housing 108 that houses the hydraulic rotary actuator 102, where the housing 108 comprises the first end 110a and the second end 110b. The hydraulic rotary actuator 102 (see FIG. 6A) rotates, or is configured to rotate, when the road wheel 94 (see FIG. 6A) rotates, to convert the rotation 240 (see FIG. 9) into flow 238 (see FIG. 8) of the fluid 140 (see FIG. 8).

Alternatively, as discussed above, instead of using the variable displacement piston pump 104a (see FIGS. 6A, 9), the hydraulic rotary actuator assembly 100 may use another type of pump 104. For example, the hydraulic rotary actuator 102 may further comprise a pump 104 comprising one of, an axial pump 104b (see FIG. 9), a scroll pump 104c (see FIG. 9), a gerotor pump 104d (see FIG. 9), a gear pump 104e (see FIG. 9), a vane pump 104f (see FIG. 9), a bladeless turbine pump 104g (see FIG. 9), or another type of pump 104.

Like the hydraulic rotary actuator 102 shown in FIG. 5, as shown in FIG. 6A, the hydraulic rotary actuator 102, such as the variable displacement piston pump 104a, comprises the shaft 112, the cylinder block 114 with the first end 116a and the second end 116b, the valve plate 118, the plurality of pistons 122 with piston shoes 128, and the swash plate 130. In this version, as shown in FIG. 6A, the plurality of pistons 122 comprise six pistons including a first piston 122a, a second piston 122b, a third piston 122c, a fourth piston 122d, a fifth piston 122e, and a sixth piston 122f. However, the number of pistons 122 used in the hydraulic rotary actuator 102 may be more than six, for example, seven pistons, nine pistons, eleven pistons, or more pistons. The plurality of pistons 122 (see FIG. 6A) are preferably arranged parallel to each other and slidably secured in the cylinder block 114 (see FIG. 6A). Each of the plurality of pistons 122 (see FIG. 6A) rotates, or is configured to rotate, around the shaft 112 (see FIG. 6A), to generate reciprocating motions of the pistons 122, which draw the fluid 140, such as the thixotropic fluid 140a (see FIG. 6A), into the cylinder block 114, and discharge the fluid 140, such as the thixotropic fluid 140a, out of the cylinder block 114, to produce the flow 238 (see FIG. 8) of the fluid 140, such as the thixotropic fluid 140a. The fluid 140, for example, the thixotropic fluid 140a, used is as discussed above with respect to FIG. 5.

Each of the plurality of pistons 122 (see FIG. 6A) is coupled between the swash plate 130 (see FIG. 6A) and the valve plate 118 (see FIG. 6A). As shown in FIG. 6A, each piston 122 has the first rounded end 124 pivotably coupled to each piston shoe 128, and has the second flat end 126. Each piston shoe 128 (see FIG. 6A) slides or moves along, or is configured to slide or move, the surface 132 (see FIG. 6A) of the swash plate 130 (see FIG. 6A). The valve plate 118 (see FIG. 6A) enables contact of the fluid 140, such as the thixotropic fluid 140a (see FIG. 6A), to the plurality of pistons 122 (see FIG. 6A). The cylinder block 114 (see FIG. 6A) may further comprise one or more springs (not shown) that may provide force against the pistons 122, to move the pistons 122 toward the swash plate 130.

During the pumping action of the hydraulic rotary actuator 102 (see FIG. 6A), the plurality of pistons 122 (see FIG. 6A) rotate about the shaft 112 (see FIG. 6A) which is stationary. As the plurality of pistons 122 (see FIG. 6A) rotate about the shaft 112 (see FIG. 6A), an angled position 144 (see FIG. 6A) of the swash plate 130 (see FIG. 6A) causes the plurality of pistons 122 to move in and out of the cylinder block 114 (see FIG. 6A). The valve plate 118 (see FIG. 6A) at the opposite end from the swash plate 130 (see FIG. 6A) alternately connects each piston 122 (see FIG. 6A) in the cylinder block 114 (see FIG. 6A) to the flow ports 136, and to the fluid lines 174 (see FIG. 6A) and to the fluid reservoir 172 (see FIG. 6A) of the fluid supply system 170 (see FIG. 6A) of the hydraulic system 10 (see FIG. 6A), via the variable restrictor assembly 184 (see FIG. 6A).

By changing the angled position 144 (see FIG. 6A) of the swash plate 130 (see FIG. 6A), the stroke of the pistons 122 (see FIG. 6A) may be varied continuously. If the swash plate 130 (see FIG. 6A) is vertical or perpendicular to the axis of rotation, no flow 238 (see FIG. 8) of the fluid 140, such as thixotropic fluid 140a (see FIG. 6A) occurs. If the swash plate 130 (see FIG. 6A) is at the angled position 144 (see FIG. 6A), such as angled forward as shown in FIG. 6A or angled backward as shown in FIG. 5, a volume of the fluid 140, such as thixotropic fluid 140a (see FIG. 6A), may be allowed to flow or be pumped. The greater the angle of the angled position 144 (see FIG. 6A) of the swash plate 130 (see FIG. 6A), the greater the suction of the fluid 140, such as the thixotropic fluid 140a (see FIG. 6A), into the hydraulic rotary actuator 102 and the hydraulic rotary actuator assembly 100, and the greater the discharge of the fluid 140, such as the thixotropic fluid 140a, out of the hydraulic rotary actuator 102 and the hydraulic rotary actuator assembly 100, and the smaller the angle of the angled position 144 of the swash plate 130, the lesser the suction of the fluid 140, such as the thixotropic fluid 140a, into the hydraulic rotary actuator 102 and the hydraulic rotary actuator assembly 100, and the lesser the discharge of the fluid 140, such as the thixotropic fluid 140a, out of the hydraulic rotary actuator 102 and the hydraulic rotary actuator assembly 100.

As shown in FIG. 6A, the hydraulic rotary actuator assembly 100, such as in the form of hydraulic pump-motor assembly 100a, may further comprise a drain port 133 coupled to the hydraulic rotary actuator 102, via an opening 139a, such as a drain port opening, in the housing 108. The drain port 133 (see FIG. 6A), as discussed above, drains, or is configured to drain, from the hydraulic rotary actuator 102 in the housing 108, any excess fluid 140, such as thixotropic fluid 140a (see FIG. 6A), that may leak from, or out of, the pistons 122 (see FIG. 6A) during pumping. The excess drained fluid 140, such as thixotropic fluid 140*a*, is sent to the fluid reservoir 172 (see FIGS. 6A, 9) of the fluid supply system 170 (see FIGS. 6A, 9). Although FIG. 6A shows one drain port 133, more than one drain port 133 may be coupled to the hydraulic rotary actuator 102.

As shown in FIG. 6A, the hydraulic rotary actuator assembly 100, such as in the form of hydraulic pump-motor assembly 100*a*, further comprises one or more flow ports 136 coupled to the hydraulic rotary actuator 102, via one or more openings 137 formed in the housing 108. As further shown in FIG. 6A, the flow ports 136 comprise the inlet flow port 136*a* and the outlet flow port 136*b*. The inlet flow port 136*a* (see FIG. 6A) receives, or is configured to receive, the fluid 140, such as the thixotropic fluid 140*a* (see FIG. 6A), for example, the low pressure fluid 141*a* (see FIG. 6A), during the braking operation 146*a* (see FIG. 6B), at a low pressure, into the hydraulic rotary actuator 102 (see FIG. 6A), from the fluid reservoir 172 (see FIG. 6A) of the fluid supply system 170 (see FIG. 6A).

As shown in FIG. 6A, the first piston 122*a*, the third piston 122*c*, and the fifth piston 122*e* may all be moved at variable lengths or distances away from or toward the valve plate 118 with the fluid 140, such as thixotropic fluid 140*a*, for example, low pressure fluid 141*a*, received through the valve plate 118 and through the inlet flow port 136*a*, during the braking operation 146*a* (see FIG. 6B). The outlet flow port 136*b* (see FIG. 6A) discharges the fluid 140, such as the thixotropic fluid 140*a* (see FIG. 6A), for example, the high pressure thixotropic fluid 141*b* (see FIG. 6A), at a high pressure, from the hydraulic rotary actuator 102 (see FIG. 6A), to the fluid reservoir 172 (see FIG. 6A), of the fluid supply system 170 (see FIG. 6A). As shown in FIG. 6A, the second piston 122*b*, the fourth piston 122*d*, and the sixth piston 122*f* are all moved at variable lengths or distances away from or toward the valve plate 118 with the fluid 140, such as the thixotropic fluid 140*a*, for example, the high pressure fluid 141*b*, discharged through the valve plate 118 and the outlet flow port 136*b*.

As shown in FIG. 6A, the hydraulic rotary actuator assembly 100, such as in the form of hydraulic pump-motor assembly 100*a*, may further comprise a vent 138, as discussed above, coupled to the hydraulic rotary actuator 102, via an opening 139*b*, such as a vent opening, formed in the housing 108. The vent 138 (see FIG. 6A) facilitates removal of steam 252 (see FIG. 9) formed from the phase change 248 (see FIG. 9) of the fluid 140, such as the thixotropic fluid 140*a* (see FIGS. 6A, 9), when the fluid 140, such as the thixotropic fluid 140*a*, is heated to the boiling point 168 (see FIG. 9) of the fluid 140, such as the thixotropic fluid 140*a*, that is being used. Although FIG. 6A shows one vent 138, more than one vent 138 may be coupled to the hydraulic rotary actuator 102.

As shown in FIG. 6A, the hydraulic system 10 comprises the fluid supply system 170, as discussed above, coupled directly or indirectly to the hydraulic rotary actuator assembly 100, via the variable restrictor assembly 184, with fluid lines 174 of the fluid supply system 170. For example, the fluid supply line 174*a* (see FIG. 6A) may be coupled to the inlet flow port 136*a* (see FIG. 6A), and the fluid return line 174*b* (see FIG. 6A) may be coupled to the outlet flow port 136*b* (see FIG. 6A). As shown in FIG. 6A, the variable restrictor assembly 184 is coupled to and controlled with a variable restrictor controller 186. As further shown in FIG. 6A, the variable restrictor assembly 184 may be coupled to one or more heat exchangers 220, via a fluid line 174, and the one or more heat exchangers 220 may be coupled to the fluid reservoir 172, via a fluid line 174. As further shown in FIG. 6A, the fluid reservoir 172 may be coupled, via a fluid line 174, to an auxiliary pump 222, which may be optional. As further shown in FIG. 6A, the auxiliary pump 222 may be coupled to the variable restrictor assembly 184 via a fluid line 174. In the absence of the auxiliary pump 222, the fluid reservoir 172 of the fluid supply system 170 may be directly coupled to the variable restrictor assembly 184. As further shown in FIG. 6A, an auxiliary power unit (APU) may be coupled or connected to the optional auxiliary pump 222, via one or more auxiliary power unit (APU) lines 228. As further shown in FIG. 6A, the control system 180 is coupled or connected to the hydraulic rotary actuator assembly 100, via the variable restrictor assembly 184 and the variable restrictor controller 185. The control system 180 (see FIG. 6A) is coupled to the variable restrictor assembly 184 and the variable restrictor controller 185 with one or more connection elements 210 (see FIG. 6A).

The hydraulic rotary actuator assembly 100 (see FIG. 6A) of the hydraulic system 10, as discussed above, has the first operating mode 146 (see FIG. 6B), such as the braking mode 146*a* (see FIG. 6B), and if the auxiliary pump 222 is used or installed in the vehicle 12, the hydraulic rotary actuator assembly 100 (see FIG. 6A) may have the second operating mode 152 (see FIG. 6B), such as the taxiing operation 152*a* (see FIG. 6B) and/or may have the third operating mode 158 (see FIG. 7), such as the wheel spin-up operation 158*a* (see FIG. 7). The APU 226 (see FIG. 6A) may be connected, via one or more APU lines 228 (see FIG. 6A), to the auxiliary pump 222 to provide power 224 (see FIG. 8) to the auxiliary pump 222 (FIG. 6A), during the flight mode 159 (see FIG. 7) of the aircraft 12*a* (see FIG. 1), prior to the aircraft 12*a* (see FIG. 1) landing on the ground surface 28 (see FIG. 1).

Now referring to FIG. 6B, FIG. 6B is an illustration of a cross-sectional view of the valve plate 118 and pistons 122 of the hydraulic rotary actuator assembly 100 of FIG. 6A, shown in the first operating mode 146 (see FIG. 7), such as the braking operation 146*a*, or braking action, for the vehicle 12 (see FIG. 6A), such as an aircraft 12*a* (see FIGS. 1, 9). The road wheel 94 (see FIGS. 6A, 9) turns the hydraulic rotary actuator 102 (see FIG. 6A) and the hydraulic rotary actuator assembly 100 (see FIG. 6A) in a wheel turning pump rotation direction 148 (see FIG. 6B) during the first operating mode 146 (see FIG. 6B), such as the braking operation 146*a* (see FIG. 6B), or the braking action, for the vehicle 12, such as an aircraft 12*a* (see FIGS. 1, 9), and such as when the swash plate 130 (see FIG. 6A) is in the angled position 144 (see FIG. 6A). The hydraulic rotary actuator 102 (see FIG. 6A) and the hydraulic rotary actuator assembly 100 (see FIG. 6A) function or act as a pump 104 (see FIG. 6B) during the braking operation 146*a* (see FIG. 6B).

FIG. 6B shows a piston side 150 of the valve plate 118 with openings for the inlet flow port 136*a* and the outlet flow port 136*b*, and the second flat ends 126 (see FIG. 6A) of the pistons 122 are represented in FIG. 6B. The valve plate 118 (see FIG. 6B) comprises a first curved slot opening 120*a* (see FIG. 6B) that mirrors and a second curved slot opening 120*b* (see FIG. 6B) with a gap area 151 (see FIG. 6B) between each end of the first curved slot opening 120*a* and the second curved slot opening 120*b*.

During the first operating mode 146 (see FIG. 6B), such as the braking operation 146*a* (see FIG. 6B), an intake phase starts with the fluid 140 (see FIG. 6B), such as the thixotropic fluid 140*a* (see FIG. 6B), being drawn, pulled, or sucked into the inlet flow port 136*a* and into the first curved slot opening 120*a*, from the fluid reservoir 172 (see FIG. 6A), via the variable restrictor assembly 184 (see FIG. 6A), with one or more fluid lines 174 (see FIG. 6A), from outside the hydraulic rotary actuator assembly 100 (see FIG. 6A). The fluid 140 (see FIG. 6B), such as the thixotropic fluid 140*a* (see FIG. 6B), for example, the low pressure fluid 141*a* (see FIG. 6B), may be drawn, pulled, or sucked through the inlet flow port 136*a* (see FIG. 6B) and the first curved slot opening 120*a* (see FIG. 6B) at a low pressure, which causes certain of the pistons 122 (see FIG. 6B) to move away from the valve plate 118 (see FIGS. 6A, 6B) and toward the swash plate 130 (see FIG. 6A). The flow 238 (see FIG. 8) of the fluid 140 (see FIG. 6B), such as the thixotropic fluid 140*a* (see FIG. 6B), for example, the low pressure fluid 141*a* (see FIG. 6B), moves from the first curved slot opening 120*a*, at a low pressure, to the second curved slot opening 120*b*, at a higher pressure, by the rotation 240 (see FIG. 9) of the hydraulic rotary actuator 102 (see FIG. 6A) and the hydraulic rotary actuator assembly 100 (see FIG. 6A), caused by the rotation 240 (see FIG. 9) of the road wheel 94 (see FIG. 6A). After each piston 122 (see FIG. 6B) reaches its furthest point from the valve plate 118 (see FIG. 6B), the piston 122 passes the gap area 151 (see FIG. 6B) between the first curved slot opening 120*a* (see FIG. 6B) and the second curved slot opening 120*b* (see FIG. 6B), and a compression phase starts with the piston 122 moving toward the valve plate 118 and compressing the fluid 140 (see FIG. 6B), such as the thixotropic fluid 140*a* (see FIG. 6B), out of the outlet flow port 136*b* (see FIG. 6B).

During the first operating mode 146 (see FIG. 6B), such as the braking operation 146*a* (see FIG. 6B), the fluid 140 (see FIG. 6B), such as the thixotropic fluid 140*a* (see FIG. 6B), for example, the high pressure fluid 141*b* (see FIG. 6B), is forced at a high pressure out of the second curved slot opening 120*b* and out of the outlet flow port 136*b* back to the fluid reservoir 172 (see FIG. 6A), via the variable restrictor assembly 184 (see FIG. 6A) and via one or more heat exchangers 220 (see FIG. 6A), with one or more fluid lines 174 (see FIG. 6A). Dynamic hydraulic resistance, or braking resistance, for the first operating mode 146, such as the braking operation 146*a*, is accomplished by restricting the flow 238 (see FIG. 8) of the fluid 140 (see FIG. 6B), such as the thixotropic fluid 140*a* (see FIG. 6B), through the hydraulic rotary actuator assembly 100 (see FIG. 6A) and through the hydraulic rotary actuator 102 (see FIG. 6A). As discussed above, with the first operating mode 146 (see FIG. 7), such as the braking operation 146*a* (see FIG. 7), the rotation 240 (see FIG. 9) of the road wheel 94 (see FIG. 6A) causes the hydraulic rotary actuator assembly 100 (see FIG. 6A), including the hydraulic rotary actuator 102 (see FIG. 6A), to pump the fluid 140 (see FIG. 6A), and the variable restrictor assembly 184 (see FIG. 6A) controls the flow 238 (see FIG. 8) of the fluid 140 issuing from the hydraulic rotary actuator assembly 100.

Now referring to FIG. 6C, FIG. 6C is an illustration of a cross-sectional view of the valve plate 118 and pistons 122 of the hydraulic rotary actuator assembly 100 of FIG. 6A, shown in the second operating mode 152, such as the taxiing operation 152*a*, or taxiing action, for the vehicle 12 (see FIG. 6A), such as an aircraft 12*a* (see FIGS. 1, 9). The hydraulic rotary actuator 102 (see FIG. 6A) and/or the hydraulic rotary actuator assembly 100 (see FIG. 6A) turns the road wheel 94 (see FIGS. 6A, 9) in a pump turning wheel rotation direction 154 (see FIG. 6C) during the second operating mode 152 (see FIG. 6C), such as the taxiing operation 152*a* (see FIG. 6C), or taxiing action, for the vehicle 12 (see FIG. 6A), such as an aircraft 12*a* (see FIGS. 1, 9). The hydraulic rotary actuator 102 (see FIG. 6A) and the hydraulic rotary actuator assembly 100 (see FIG. 6A) function or act as a motor 106 (see FIG. 6C) during the second operating mode 152 (see FIG. 6C), such as the taxiing operation 152*a* (see FIG. 6C), by pumping the fluid 140 (see FIG. 6C), such as the thixotropic fluid 140*a* (see FIG. 6C) through the hydraulic rotary actuator 102 (FIG. 6A) and the hydraulic rotary actuator assembly 100 (see FIG. 6A) to cause the road wheel(s) 94 (see FIG. 6A) to rotate on the ground surface 28 (see FIG. 1).

FIG. 6C shows a flow valve side 156 of the valve plate 118 with openings for the inlet flow port 136*a* and the outlet flow port 136*b*, and the second flat ends 126 (see FIG. 6A) of the pistons 122 (see FIG. 6C) are represented. The valve plate 118 (see FIG. 6C) comprises the first curved slot opening 120*a* (see FIG. 6C) and the second curved slot opening 120*b* (see FIG. 6C) with the gap area 151 (see FIG. 6C) between each end of the first curved slot opening 120*a* and the second curved slot opening 120*b*.

With the second operating mode 152, the flow 238 (see FIG. 8) of the fluid 140 (see FIG. 6C), such as the thixotropic fluid 140*a* (see FIG. 6C), may be directed or pumped from the fluid reservoir 172 (see FIG. 6C) by the auxiliary pump 222 (see FIG. 6A), and directed or pumped via the variable restrictor assembly 184 (see FIG. 6A), and through the hydraulic rotary actuator assembly 100 (see FIG. 6A) and the hydraulic rotary actuator 102 (see FIG. 6A), which causes the road wheel 94 (see FIG. 6A) to rotate. With the second operating mode 152 (see FIG. 7) comprising the taxiing operation 152*a* (see FIG. 7), the APU 226 (see FIG. 6A) may be used to power the auxiliary pump 222 (see FIG. 6A) with fluid power 224*a* (see FIG. 8) or electric power 222*b* (see FIG. 8). The auxiliary pump 222 (see FIG. 6A) pumps the fluid 140 (see FIG. 6C), such as thixotropic fluid 140*a* (see FIG. 6C), through the hydraulic rotary actuator assembly 100 (see FIG. 6A), including the hydraulic rotary actuator 102 (see FIG. 6A), via the variable restrictor assembly 184 (see FIG. 6A), to cause the road wheel 94 (see FIG. 6A) to rotate on the ground surface 28 (see FIG. 6A).

The flow 238 (see FIG. 8) of the fluid 140 (see FIG. 6C), such as the thixotropic fluid 140*a* (see FIG. 6C), for example, high pressure fluid 141*b* (see FIG. 6C), may be directed to the hydraulic rotary actuator assembly 100 (see FIG. 6A), via the auxiliary pump 222 (see FIG. 6A) and the variable restrictor assembly 184 (see FIG. 6A), and pumped through the inlet flow port 136*a* (see FIG. 6C) and through the first curved slot opening 120*a* (see FIG. 6C) at a high pressure, which causes certain of the pistons 122 to move away from the valve plate 118 (see FIGS. 6A, 6C) and toward the swash plate 130 (see FIG. 6A).

The flow 238 (see FIG. 8) of the fluid 140 (see FIG. 6C), such as the thixotropic fluid 140*a* (see FIG. 6C), for example, the high pressure fluid 141*b* (see FIG. 6C), moves from the first curved slot opening 120*a*, at a high pressure, to the second curved slot opening 120*b*, at a lower pressure, to provide torque or rotation 240 (see FIG. 9) to the road wheels 94 (see FIG. 6A), and to turn the road wheels 94 for the second operating mode 152 (see FIG. 6C), such as the taxiing operation 152*a* (see FIG. 6C), of the vehicle 12 (see FIG. 6A), such as aircraft 12*a* (see FIG. 1). Each piston 122 (see FIG. 6C) passes the gap area 151 (see FIG. 6C) between the first curved slot opening 120*a* (see FIG. 6C) and the second curved slot opening 120*b* (see FIG. 6C), with the piston 122 moving toward the valve plate 118 to move the fluid 140 (see FIG. 6C), such as the thixotropic fluid 140*a* (see FIG. 6C), out of the outlet flow port 136*b* (see FIG. 6C). During the second operating mode 152 (see FIG. 6C), such as the taxiing operation 152*a* (see FIG. 6C), the fluid 140 (see FIG. 6C), such as the thixotropic fluid 140*a* (see FIG.

6C), for example, the low pressure fluid 141a (see FIG. 6C), flows at a low pressure out of the second curved slot opening 120b and out of the outlet flow port 136b back to the fluid reservoir 172 (see FIG. 6A), via the variable restrictor assembly 184 (see FIG. 6A) and via the one or more heat exchangers 220 (see FIG. 6A), with one or more fluid lines 174 (see FIG. 6A).

Figure 6D:
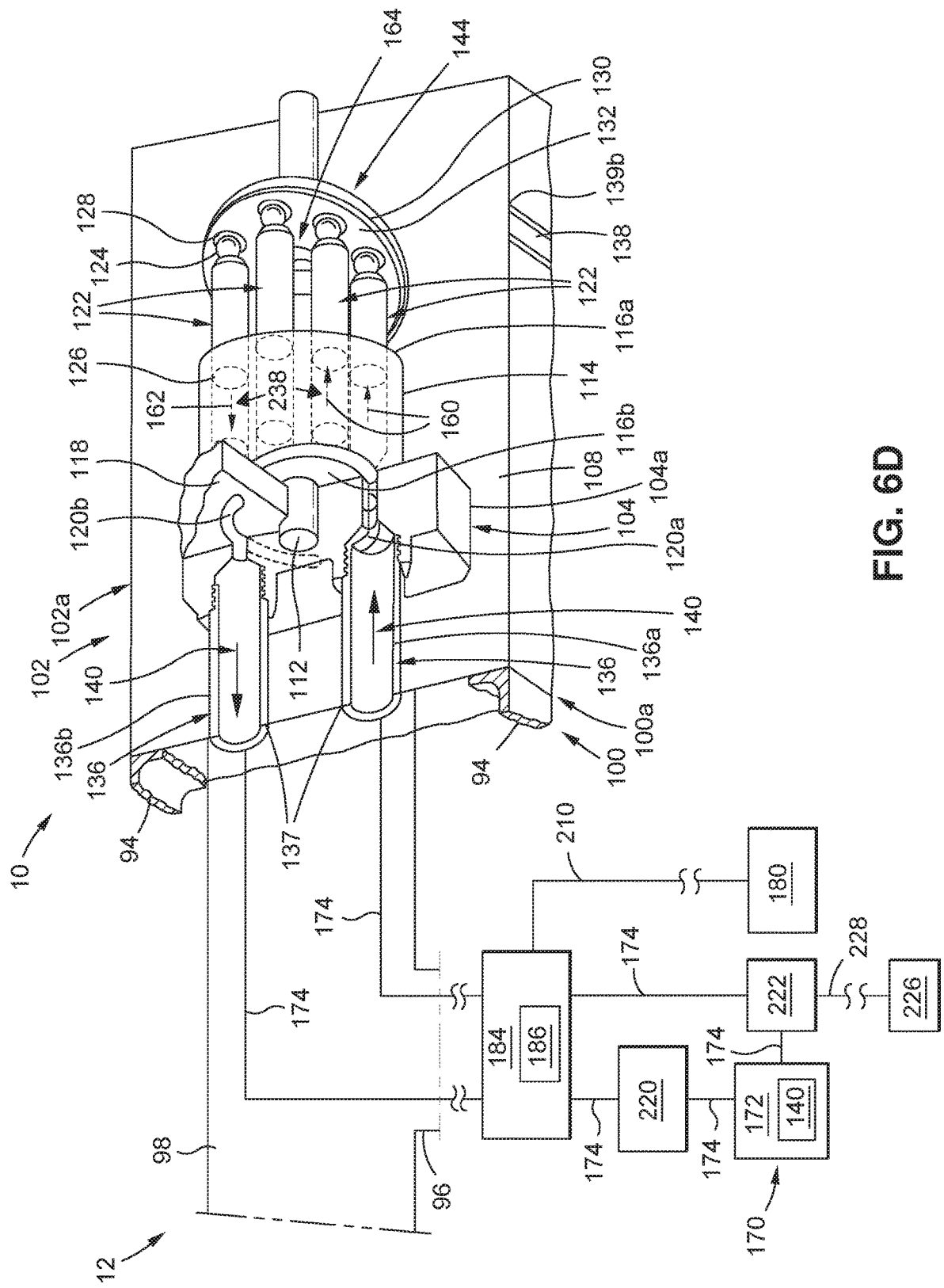
FIG. 6D is an illustration of an enlarged back perspective view in partial cross-section of a hydraulic system of the disclosure showing flow of fluid through a hydraulic rotary actuator assembly.

Now referring to FIG. 6D, FIG. 6D is an illustration of an enlarged back perspective view in partial cross-section of a hydraulic system 10 of the disclosure showing flow 238 of fluid 140 into, through, and out of a hydraulic rotary actuator assembly 100. The fluid 140 may comprise thixotropic fluid 140a (see FIG. 9) or another suitable fluid 140, as discussed above with respect to FIG. 5. As shown in FIG. 6D, the hydraulic rotary actuator assembly 100 in the housing 108 is mounted or installed adjacent the road wheel 94 and the axle 98 and the strut 96 of the vehicle 12 (see FIGS. 1, 6A).

As shown in FIG. 6D, the hydraulic rotary actuator assembly 100, such as in the form of hydraulic pump-motor assembly 100a, comprises the hydraulic rotary actuator 102, such as in the form of hydraulic pump-motor 102a, comprising a pump 104, for example, a variable displacement piston pump 104a disposed in the housing 108. Alternatively, as discussed above, instead of using the variable displacement piston pump 104a (see FIGS. 6D, 9), the hydraulic rotary actuator assembly 100 may use another type of pump 104. For example, the pump 104 may comprise one of, an axial pump 104b (see FIG. 9), a scroll pump 104c (see FIG. 9), a gerotor pump 104d (see FIG. 9), a gear pump 104e (see FIG. 9), a vane pump 104f (see FIG. 9), a bladeless turbine pump 104g (see FIG. 9), or another type of pump 104.

As shown in FIG. 6D, the hydraulic rotary actuator assembly 100 further comprises the shaft 112, the cylinder block 114 with the first end 116a and the second end 116b, the valve plate 118 with the first curved slot opening 120a and the second curved slot opening 120b, the plurality of pistons 122, each with the first rounded end 124 coupled to a piston shoe 128 and each with the second flat end 126, and the swash plate 130. Each of the plurality of pistons 122 (see FIG. 6D) is coupled between the swash plate 130 (see FIG. 6D) and the valve plate 118 (see FIG. 6D) in a parallel configuration 164 (see FIG. 6D). The cylinder block 114 (see FIG. 6D) may further comprise one or more springs (not shown) that may provide force against the pistons 122, to move the pistons 122 toward the swash plate 130. The swash plate 130 (see FIG. 6D) is shown in an angled position 144 (see FIG. 6D).

As further shown in FIG. 6D, the hydraulic rotary actuator assembly 100 comprises one or more flow ports 136 coupled to the hydraulic rotary actuator 102, via one or more openings 137 formed in the housing 108. The flow ports 136 (see FIG. 6D) comprise the inlet flow port 136a (see FIG. 6D) and the outlet flow port 136b (see FIG. 6D). The inlet flow port 136a (see FIG. 6D) receives, or is configured to receive, the fluid 140 (see FIG. 6D), such as the thixotropic fluid 140a (see FIG. 6D), at a low pressure, during a first operating mode 146, such as a braking operation 146a (see FIG. 6B), into the hydraulic rotary actuator 102 (see FIG. 6D) of the hydraulic rotary actuator assembly 100 (see FIG. 6D), from the fluid reservoir 172 (see FIG. 6D) of the fluid supply system 170 (see FIG. 6D), via the variable restrictor assembly 184 (see FIG. 6D), connected by one or more fluid lines 174 (see FIG. 6D). The outlet flow port 136b (see FIG. 6D) discharges the fluid 140 (see FIG. 6D), such as the thixotropic fluid 140a (see FIG. 6D), at a high pressure during the first operating mode 146 (see FIG. 6B), such as the braking operation 146a (see FIG. 6B), from the hydraulic rotary actuator 102 (see FIG. 6D) of the hydraulic rotary actuator assembly 100 (see FIG. 6D), to the fluid reservoir 172 (see FIG. 6D), of the fluid supply system 170 (see FIG. 6D), via the variable restrictor assembly 184 (see FIG. 6D) and one or more heat exchangers 220 (see FIG. 6D), connected by one or more fluid lines 174 (see FIG. 6D).

As shown in FIG. 6D, the hydraulic rotary actuator assembly 100 may further comprise a vent 138, as discussed above, coupled to the hydraulic rotary actuator 102, via an opening 139b, such as a vent opening, formed in the housing 108. The vent 138 (see FIG. 6D), as discussed above, facilitates removal of steam 252 (see FIG. 9) formed from the phase change 248 (see FIG. 9) of the fluid 140 (see FIGS. 6D, 9), such as the thixotropic fluid 140a (see FIGS. 6D, 9), when the fluid 140, such as the thixotropic fluid 140a, is heated to the boiling point 168 (see FIG. 9) of the fluid 140, such as the thixotropic fluid 140a, that is being used. Although FIG. 6D shows one vent 138, more than one vent 138 may be coupled to the hydraulic rotary actuator 102. The hydraulic rotary actuator assembly 100 (see FIG. 6D) may further comprise a drain port 133 (see FIGS. 5, 6A) coupled to the hydraulic rotary actuator 102, via an opening 139a (see FIGS. 5, 6A), such as a drain port opening, in the housing 108 (see FIG. 6D).

As shown in FIG. 6D, the hydraulic rotary actuator system 10 further comprises the fluid supply system 170, as discussed above, coupled to the hydraulic rotary actuator assembly 100, via the variable restrictor assembly 184. In particular, the fluid reservoir 172 (see FIG. 6D) of the fluid supply system 170 (see FIG. 6D) is coupled to the inlet flow port 136a (see FIG. 6D) and the outlet flow port 136b (see FIG. 6D) of the hydraulic rotary actuator assembly 100, via the variable restrictor assembly 184, with one or more fluid lines 174 (see FIG. 6D) of the fluid supply system 170.

As shown in FIG. 6A, the hydraulic system 10 comprises the fluid supply system 170, as discussed above, coupled directly or indirectly to the hydraulic rotary actuator assembly 100, via the variable restrictor assembly 184, with fluid lines 174 of the fluid supply system 170. For example, a fluid supply line 174a (see FIGS. 5, 6A) from the fluid reservoir 172 (see FIG. 6D) of the fluid supply system 170 (see FIG. 6D), may be coupled to the inlet flow port 136a (see FIG. 6D), and a fluid return line 174b (see FIGS. 5, 6A) may be coupled from the outlet flow port 136b (see FIG. 6D) to the fluid reservoir 172, via the variable restrictor assembly 184 and one or more heat exchangers 220 (see FIG. 6D). As shown in FIG. 6D, the variable restrictor assembly 184 is coupled to and controlled with a variable restrictor controller 186. As further shown in FIG. 6D, the variable restrictor assembly 184 may be coupled to one or more heat exchangers 220, via a fluid line 174, and the one or more heat exchangers 220 may be coupled to the fluid reservoir 172, via a fluid line 174. As further shown in FIG. 6D, the fluid reservoir 172 may be coupled, via a fluid line 174, to an auxiliary pump 222, which may be optional. As further shown in FIG. 6D, the auxiliary pump 222 may be coupled to the variable restrictor assembly 184, via a fluid line 174. In the absence of the auxiliary pump 222, the fluid reservoir 172 of the fluid supply system 170 may be directly coupled to the variable restrictor assembly 184. As further shown in FIG. 6D, the auxiliary power unit (APU) may be coupled or connected to the optional auxiliary pump 222, via one or more auxiliary power unit (APU) lines 228. As further shown in FIG. 6D, the control system 180 is coupled or connected to the variable restrictor assembly 184 and the variable restrictor controller 185, via one or more connection elements 210.

The hydraulic rotary actuator assembly 100 (see FIG. 6D) of the hydraulic system 10 (see FIG. 6D), as discussed above, has the first operating mode 146 (see FIG. 7), such as the braking mode 146*a* (see FIG. 7), and if the auxiliary pump 222 (see FIG. 6D) is used or installed in the vehicle 12 (see FIG. 6D), the hydraulic rotary actuator assembly 100 (see FIG. 6D) may have the second operating mode 152 (see FIG. 7), such as the taxiing operation 152*a* (see FIG. 7) and/or may have the third operating mode 158 (see FIG. 7), such as the wheel spin-up operation 158*a* (see FIG. 7). The APU 226 (see FIG. 6D) may be connected, via one or more APU lines 228 (see FIG. 6D), to the auxiliary pump 222 (see FIG. 6D) to provide power 224 (see FIG. 8) to the auxiliary pump 222 (FIG. 6D), during the flight mode 159 (see FIG. 7) of the aircraft 12*a* (see FIG. 1), prior to the aircraft 12*a* (see FIG. 1) landing on the ground surface 28 (see FIG. 1).

During the pumping action of the hydraulic rotary actuator 102 (see FIG. 6D), the plurality of pistons 122 (see FIG. 6D) rotate about the shaft 112 (see FIG. 6D) which is stationary, and the swash plate 130 (see FIG. 6D) is preferably in an angled position 144 (see FIG. 6D) and is also stationary. As shown in FIG. 6D, each of the plurality of pistons 122 rotates, or is configured to rotate, around the shaft 112, to generate reciprocating motion of the pistons 122, which draws the fluid 140 into the cylinder block 114.

As further shown in FIG. 6D, the fluid 140 flows, or is configured to flow, from the fluid reservoir 172, via the variable restrictor assembly 184, and via the auxiliary pump 220, if the auxiliary pump 220 is included, through one or more fluid lines 174, into the inlet flow port 136*a*, through the first curved slot opening 120*a* of the valve plate 118, and into the cylinder block 114. In the cylinder block 114 (see FIG. 6D), the fluid 140 (see FIG. 6D) flows in a flow direction 160 (see FIG. 6D) away from the valve plate 118 (see FIG. 6D) and toward or against the second flat end 126 (see FIG. 6D) of the pistons 122 (see FIG. 6D).

The flow 238 (see FIG. 6D) of the fluid 140 (see FIG. 6D) preferably moves from the first curved slot opening 120*a* (see FIG. 6D) to the second curved slot opening 120*b* (see FIG. 6D) by pumping of the fluid 140 by the hydraulic rotary actuator 102 (see FIG. 6D) and the hydraulic rotary actuator assembly 100 (see FIG. 6D), caused by rotation 240 (see FIG. 9) of the road wheel 94 (see FIG. 6D). In addition, the hydraulic rotary actuator 102 (see FIG. 6D) and the hydraulic rotary actuator assembly 100 (see FIG. 6D) rotate, or are configured to rotate, when the road wheel 94 (see FIG. 6D) rotates, to convert rotation 240 (see FIG. 9) into flow 238 (see FIG. 6D) of the fluid 140 (see FIGS. 6D, 9). As shown in FIG. 6D, the fluid 140 then flows in a flow direction 162 back toward the valve plate 118, and is forced out of the cylinder block 114, out of the second curved slot opening 120*b*, out of the outlet flow port 136*b*, and back to the fluid reservoir 172, via the variable restrictor assembly 184 and the one or more heat exchangers 220, connected with one or more fluid lines 174.

Now referring to FIG. 7, FIG. 7 is an illustration of a functional block diagram showing a hydraulic system 10 of the disclosure and various operating modes of the control system 180. As shown in FIG. 7, the control system 180 comprises a controls and indicators assembly 182 and a variable restrictor assembly 184. The variable restrictor assembly 184 (see FIG. 7) is coupled, via fluid lines 174, between the fluid supply system 170 (see FIG. 7) containing the fluid 140 (see FIG. 7), and the hydraulic rotary actuator assembly 100 (see FIG. 7) installed in or to the road wheel 94 (see FIG. 7). An optional auxiliary pump 222 (see FIG. 7) may be coupled, via fluid line 174, between the fluid supply system 170 (see FIG. 7) and the variable restrictor assembly 174 (see FIG. 7) of the control system 180 (see FIG. 7). As shown in FIG. 7, the auxiliary pump 222 may comprise a fluid power pump 222*a* or an electric pump 222*b*.

As further shown in FIG. 7, the controls and indicators assembly 182 may comprise a first operating mode signal 188, such as a braking signal 188*a*, a second operating mode signal 190, such as a taxiing signal 190*a*, and a third operating mode signal 192, such as a wheel spin-up signal 192*a*. The controls and indicators assembly 182 (see FIG. 7) may further comprise one or more of, wheel speed controls 194 (see FIG. 9), fluid temperature controls 196 (see FIG. 9), wheel temperature controls 198 (see FIG. 9), valve controls 200 (see FIG. 9), brake controls 202 (see FIG. 9), parking brake controls 204 (see FIG. 9), wheel power controls 206 (see FIG. 9), anti-skid controls 208 (see FIG. 9), or other suitable controls.

As further shown in FIG. 7, the first operating mode signal 188, such as the braking signal 188*a*, sends, or is configured to send, a signal to a first operating mode controller 212, such as a braking controller 212*a*, in the variable restrictor assembly 184, via a connection element 210. The variable restrictor assembly 184 (see FIG. 7) is controlled by the variable restrictor controller 186 (see FIG. 7). The variable restrictor assembly (see FIG. 7) and the variable restrictor controller 186 (see FIG. 7) are integral to and preferably integrated with the first operating mode controller 212 (see FIG. 7), such as the braking controller 212*a* (see FIG. 7), to control the first operating mode 146 (see FIG. 7), such as the braking operation 146*a* (see FIG. 7) for the hydraulic rotary actuator assembly 100 (see FIG. 7) of the vehicle 12 (see FIGS. 1, 5, 6A, 9), such as an aircraft 12*a* (see FIGS. 1, 9).

As further shown in FIG. 7, the second operating mode signal 190, such as the taxiing signal 190*a*, sends, or is configured to send, a signal to a second operating mode controller 214, such as a braking controller 212*a*, in the variable restrictor assembly 184, via a connection element 210. The variable restrictor assembly (see FIG. 7) and the variable restrictor controller 186 (see FIG. 7) are integral to and preferably integrated with the second operating mode controller 214 (see FIG. 7), such as the taxiing controller 214*a* (see FIG. 7), to control the second operating mode 152 (see FIG. 7), such as the taxiing operation 152*a* (see FIG. 7), for the hydraulic rotary actuator assembly 100 (see FIG. 7) of the vehicle 12 (see FIGS. 1, 5, 6A, 9), such as an aircraft 12*a* (see FIGS. 1, 9).

With the second operating mode 152 (see FIG. 7) comprising the taxiing operation 152*a* (see FIG. 7), the fluid 140 (see FIG. 7), such as in the form of thixotropic fluid 140*a* (see FIGS. 5, 9), is pumped through the hydraulic rotary actuator assembly 100, and causes the road wheel 94 (see FIGS. 5, 9), for example, an aircraft wheel 94*a* (see FIG. 9), to rotate on the ground surface 28 (see FIG. 1). Further, with the second operating mode 152 (see FIG. 7) comprising the taxiing operation 152*a* (see FIG. 7), the hydraulic system 10 (see FIG. 7) may further comprise the auxiliary pump 222 (see FIG. 7) coupled between the variable restrictor assembly 184 (see FIG. 7) and the fluid supply system 170 (see FIG. 7) in the vehicle 12 (see FIG. 1), such as the aircraft 12*a* (see FIG. 1). The auxiliary pump 222 (see FIG. 7) pumps the fluid 140 (see FIG. 7), such as in the form of thixotropic fluid 140*a* (see FIGS. 5, 9), through the hydraulic rotary actuator assembly 100 (see FIG. 7), via the variable restrictor assembly 184 (see FIG. 7). With the second operating mode 152

(see FIG. 7) comprising the taxiing operation 152a (see FIG. 7), the hydraulic system 10 (see FIG. 7) may further comprise the second operating mode controller 214 (see FIG. 7), such as the taxiing controller 214a (see FIG. 7), coupled to the variable restrictor assembly 184 (see FIG. 7). The taxiing controller 214a (see FIG. 7) controls, or is configured to control, an output 225 (see FIG. 9) of the auxiliary pump 222 (see FIG. 7), so as to enable the variation 242 (see FIG. 9) of a rate 244b (see FIG. 9) of the rotation 240 (see FIG. 9) of the road wheel 94 (see FIG. 9) on the ground surface 28 (see FIG. 1).

As further shown in FIG. 7, the third operating mode signal 192, such as the wheel spin-up signal 192a, sends, or is configured to send, a signal to a third operating mode controller 216, such as a wheel spin-up controller 216a, in the variable restrictor assembly 184, via a connection element 210. The variable restrictor assembly (see FIG. 7) and the variable restrictor controller 186 (see FIG. 7) are integral to and preferably integrated with the third operating mode controller 216 (see FIG. 7), such as the wheel spin-up controller 216a (see FIG. 7), to control the third operating mode 158 (see FIG. 7), such as a wheel spin-up operation 158a (see FIG. 7), for the hydraulic rotary actuator assembly 100 (see FIG. 7) of the vehicle 12 (see FIGS. 1, 5, 6A, 9), such as an aircraft 12a (see FIGS. 1, 9).

With the third operating mode 158 (see FIG. 7) comprising the wheel spin-up operation 158a (see FIG. 7), the fluid 140 (see FIG. 7), such as in the form of thixotropic fluid 140a (see FIGS. 5, 9), is pumped through the hydraulic rotary actuator assembly 100, and causes the road wheel 94 (see FIGS. 5, 9), for example, the aircraft wheel 94a (see FIG. 9), to rotate or spin up very fast while the vehicle 12, such as in the form of aircraft 12a, is in a flight mode 159 (see FIG. 9), prior to landing on the ground surface 28 (see FIG. 1). Further, with the third operating mode 158 (see FIG. 7) comprising the wheel spin-up operation 158a (see FIG. 7), the hydraulic system 10 (see FIG. 7) may further comprise the auxiliary pump 222 (see FIG. 7) coupled between the variable restrictor assembly 184 (see FIG. 7) and the fluid supply system 170 (see FIG. 7) in the vehicle 12 (see FIG. 1), such as the aircraft 12a (see FIG. 1). The auxiliary pump 222 (see FIG. 7) pumps the fluid 140 (see FIG. 7), such as in the form of thixotropic fluid 140a (see FIGS. 5, 9), through the hydraulic rotary actuator assembly 100 (see FIG. 7), via the variable restrictor assembly 184 (see FIG. 7). With the third operating mode 158 (see FIG. 7) comprising the wheel spin-up operation 158a (see FIG. 7), the hydraulic system 10 (see FIG. 7) may further comprise a third operating mode controller 216 (see FIG. 7), such as a wheel spin-up controller 216a (see FIG. 7), coupled to the variable restrictor assembly 184 (see FIG. 7). The wheel spin-up controller 216a (see FIG. 7) controls, or is configured to control, an output 225 (see FIG. 9) of the auxiliary pump 222 (see FIG. 7), so as to enable the variation 242 (see FIG. 9) of a rate 244b (see FIG. 9) of the rotation 240 (see FIG. 9) of the road wheel 94 (see FIG. 9) during the flight mode 159 (see FIG. 7). Preferably, the spinning up of the road wheel 94 (see FIGS. 7, 9), such as the aircraft wheel 94a (see FIG. 9), is at full speed of rotation prior to landing or before touchdown of the aircraft 12a.

As further shown in FIG. 7, the variable restrictor assembly (see FIG. 7) and the variable restrictor controller 186 (see FIG. 7) are integral to and preferably integrated with a fluid cooling controller 218 (see FIG. 7), to control cooling and a heat exchange function by one or more heat exchangers 220 (see FIG. 7), for the hydraulic system 10 (see FIG. 7) of the vehicle 12 (see FIGS. 1, 5, 6A, 9), such as an aircraft 12a (see FIGS. 1, 9). As shown in FIG. 7, the hydraulic rotary actuator assembly 100 coupled to the road wheel 94 is connected to the variable restrictor assembly 184 with two fluid lines 174, such as hydraulic fluid lines, tubes, hoses, or other fluid transport elements.

Now referring to FIG. 8, FIG. 8 is an illustration of a functional block diagram showing a version of a variable restrictor assembly 184 of the control system 180 of the disclosure. The variable restrictor assembly 184 (see FIG. 8) of the control system 180 (see FIG. 8) is coupled to the controls and indicators assembly 182 (see FIG. 7) of the control system 180, via one or more connection elements 210 (see FIG. 8). As shown in FIG. 8, the variable restrictor assembly 184 is coupled to the hydraulic rotary actuator assembly 100 in the road wheel 94, via one or more fluid lines 174. As further shown in FIG. 8, the variable restrictor assembly 184 is also coupled to the fluid supply system 170 containing the fluid 140, such as the thixotropic fluid 140a, via one or more fluid lines 174. An optional auxiliary pump 222 (see FIG. 8) may be coupled between the fluid supply system 170 (see FIG. 8) and the variable restrictor assembly 184 (see FIG. 8), if the hydraulic system 10 (see FIG. 7) uses, or is configured to use, the taxiing operation 152a (see FIG. 7) and/or the wheel spin-up operation 158a (see FIG. 7). The optional auxiliary pump 222 (see FIG. 8) may be coupled to the variable restrictor assembly 184 (see FIG. 8) with the one or more fluid lines 174. As further shown in FIG. 8, one or more heat exchangers 220 may be coupled between the variable restrictor assembly 184 and the fluid supply system 170 via one or more fluid lines 174.

As shown in FIG. 8, the variable restrictor assembly 184 comprises a valve assembly 184a preferably in-line. As further shown in FIG. 8, the variable restrictor assembly 184, such as in the form of the valve assembly 184a, comprises at least one or more flow control valves 230, including one of, one or more selector valves 230a, one or more check valves 230b, one or more priority valves 230c, or other suitable flow control valves 230. The flow control valves 230 control the flow of the fluid 140, such as the thixotropic fluid 140a, and may comprise electro-hydraulic flow control valves or other suitable flow control valves. For example, the selector valves 230a may comprise poppet-type, spool-type, piston-type, rotary-type, plug-type, or another suitable type of selector valve, and the selector valve 230a may be mechanically controlled by an actuator or lever, or electrically controlled by a solenoid or a servo. The check valves 230b may comprise a spring loaded ball and seat inside a housing, orifice-type check valves, damping valves, sequence valves, pressure-controlled sequence valves, mechanically operated sequence valves, or another suitable type of check valve.

As further shown in FIG. 8, the variable restrictor assembly 184, such as in the form of the valve assembly 184a, comprises at least one or more pressure control valves 232, including one of, one or more pressure regulating valves 232a, one or more relief valves 232b, or other suitable pressure control valves 232. The one or more pressure control valves 232 (see FIG. 8) control the pressure in the hydraulic rotary actuator assembly 100. The relief valves 232b may be used to limit the amount of pressure being exerted on the fluid 140, and may comprise ball type-in pressure relief valves, sleeve type-in pressure relief valves, poppet type-in pressure relief valves, or other suitable relief valves.

As further shown in FIG. 8, the variable restrictor assembly 184, such as in the form of the valve assembly 184a, may comprise an accumulator 234, a pressure gauge 235, a pressure regulator 236, and one or more filters 237. The accumulator 234 (see FIG. 8) may dampen pressure surges or supplement power to the hydraulic rotary actuator 102 (see FIGS. 5, 6A, 9) of the hydraulic rotary actuator assembly 100 (see FIG. 8). The pressure regulator 236 manages the output or discharge from the hydraulic rotary actuator assembly 100 and/or the auxiliary pump 222 to maintain system operating pressure within a predetermined range for the hydraulic system 10. The variable restrictor assembly 184, such as in the form of the valve assembly 184a, may further comprise shutoff valves, flow meters, temperature gauges, or other suitable valve assembly components.

The variable restrictor assembly 184 (see FIG. 8), such as the valve assembly 184a (see FIG. 8) controls or regulates the flow 238 (see FIG. 8) of the fluid 140, fluid resistance 239 (see FIG. 8) of the fluid 140, and pressure of the fluid 140, such as the thixotropic fluid 140a, and may provide flow factors regarding the speed and direction of the fluid 140, such as the thixotropic fluid 140a, and operating pressures. The variable restrictor assembly 184 (see FIG. 8), such as the valve assembly 184a (see FIG. 8) may comprise automatic valves that do not require an external power source where the fluid pressure is enough to open and close the valves, or may comprise valves that require an external power source to open and close the valve.

In one version, for the braking operation 146a (see FIG. 7) using the hydraulic rotary actuator assembly 100 (see FIG. 8), the fluid 140 (see FIG. 8), such as the thixotropic fluid 140a (see FIG. 8) may be drawn into or flow into the hydraulic rotary actuator assembly 100 (see FIG. 8), via the variable restrictor assembly 184, and then discharged out of the hydraulic rotary actuator assembly 100, via the variable restrictor assembly 184. The fluid 140 which may be heated may then be cooled by flowing through one or more heat exchangers 220 before returning back to the fluid supply system 170. In another version, for the taxiing operation 152a (see FIG. 7) and/or the wheel spin-up operation 158a (see FIG. 7) using the hydraulic rotary actuator assembly 100 (see FIG. 8), the fluid 140 (see FIG. 8), such as the thixotropic fluid 140a (see FIG. 8) may be drawn into or flow into the auxiliary pump 222 (see FIG. 7), then pumped by the auxiliary pump 222 into the hydraulic rotary actuator assembly 100 (see FIG. 8), via the variable restrictor assembly 184, and then discharged out of the hydraulic rotary actuator assembly 100, via the variable restrictor assembly 184. The fluid 140 which may be heated may then be cooled by flowing through one or more heat exchangers 220 before returning back to the fluid supply system 170.

As further shown in FIG. 8, the optional auxiliary pump 222 may comprise a fluid power pump 222a or an electric pump 222b. The fluid power pump 222a (see FIG. 8) may be powered with fluid power 224a (see FIG. 8) provided by a fluid power source, such as from an auxiliary power unit (APU) 226 (see FIGS. 1, 5, 6A, 9), via one or more APU lines 228 (see FIGS. 1, 5, 6A, 9), such as hydraulic fluid lines, tubes, or hoses, between the APU 226 and the fluid power pump 222a. The electric pump 222b (see FIG. 8) may be powered with electric power 224b (see FIG. 8) provided by an electric power source, such as from the auxiliary power unit (APU) 226 (see FIGS. 1, 5, 6A, 9), via one or more APU lines 228 (see FIGS. 1, 5, 6A, 9), such as electrical wires or wired connections, between the APU 226 and the electric pump 222b.

Now referring to FIG. 9, FIG. 9 is an illustration of a functional block diagram showing a vehicle 12, such as an aircraft 12a, having the hydraulic system 10 of the disclosure with versions of the hydraulic rotary actuator assembly 100 and hydraulic rotary actuator 102. In this version of the disclosure, there is provided an aircraft 12a (see FIG. 9) with the hydraulic system 10 (see FIGS. 1, 9) installed in the aircraft 12a. The aircraft 12a (see FIG. 1, 9), comprises a fuselage 22 (see FIGS. 1, 9), at least one wing 24 (see FIG. 1) attached to the fuselage 22, a cockpit 21 (see FIGS. 1, 9), and one or more landing gear assemblies 14 (see FIGS. 1, 9) attached to the fuselage 22. The one or more landing gear assemblies 14 (see FIGS. 1, 9) each comprises a strut 96 (see FIG. 9), an axle 98 (see FIG. 9), tires 92 (see FIG. 9), and one or more road wheels 94 (see FIGS. 5, 6A, 9), such as aircraft wheels 94a (see FIG. 9).

As shown in FIG. 9, the hydraulic system 10 (see FIG. 9) comprises at least one hydraulic rotary actuator assembly 100 (see FIG. 9), such as in the form of hydraulic pump-motor assembly 100a (see FIG. 9). The hydraulic rotary actuator assembly 100 (see FIG. 9), such as in the form of hydraulic pump-motor assembly 100a (see FIG. 9), is rotationally coupled to the road wheel 94, such as the aircraft wheel 94a (see FIG. 9). The at least one hydraulic rotary actuator assembly 100 (see FIG. 9) has the first operating mode 146 (see FIG. 7) comprising the braking operation 146a (see FIG. 7), wherein a rotation 240 (see FIG. 9) of the aircraft wheel 94a causes the at least one hydraulic rotary actuator assembly 100 to pump a fluid, such as a thixotropic fluid 140a (see FIG. 9), from a fluid reservoir 172 (see FIG. 9) of a fluid supply system 170 (see FIG. 9). The hydraulic system 10 (see FIG. 9) further comprises a variable restrictor assembly 184 (see FIG. 9) coupled to the at least one hydraulic rotary actuator assembly 100. The variable restrictor assembly 184 (see FIG. 9) controls the flow 238 (see FIG. 8) of the fluid 140, such as the thixotropic fluid 140a issuing from or issuing to and from the at least one hydraulic rotary actuator assembly 100, to brake the rotation 240 (see FIG. 9) of the aircraft wheel 94a (see FIG. 9) on a ground surface 28 (see FIG. 1). The hydraulic system 10 (see FIG. 9) further comprises a variable restrictor controller 186 (see FIG. 9) coupled to the variable restrictor assembly 184 (see FIG. 9). The variable restrictor controller 186 (see FIG. 9) controls the variable restrictor assembly 184, so as to enable a variation 242 (see FIG. 9) of a rate 244a (see FIG. 9) of braking of the aircraft wheel 94a on the ground surface 28. With the braking operation 146a (see FIGS. 6B, 7) for the vehicle 12, such as the aircraft 12a (see FIG. 9), the hydraulic rotary actuator 102 (see FIG. 9) and the hydraulic rotary actuator assembly 100 (see FIG. 9) function as a pump 104 (see FIG. 9).

A dynamic hydraulic resistance or braking resistance for the first operating mode 146 (see FIGS. 6B, 7), such as the braking operation 146a (see FIGS. 6B, 7), for the vehicle 12, such as the aircraft 12a, may be accomplished by restricting the flow 238 (see FIG. 8) of the fluid 140 (see FIG. 9), such as the thixotropic fluid 140a (see FIG. 9), through the hydraulic rotary actuator assembly 100 (see FIG. 9), including the hydraulic rotary actuator 102 (see FIG. 9). The hydraulic system 10 (see FIG. 9) converts kinetic energy 260 (see FIG. 9) into heat 262 (see FIG. 9) through fluid resistance 239 (see FIG. 8) of the fluid 140 (see FIG. 9), such as the thixotropic fluid 140a (see FIG. 9), in the hydraulic rotary actuator assembly 100 (see FIG. 9), such as the hydraulic pump-motor assembly 100a (see FIG. 9). The heat 262 (see FIG. 9) is primarily generated in the volume of the fluid 140 (see FIGS. 5, 9), such as the thixotropic fluid 140a (see FIGS. 5, 9). The fluid 140 (see FIGS. 5, 9), such as the thixotropic fluid 140a (see FIGS. 5, 9), may be circulated to increase the volume of the fluid 140 that is heated and the heated fluid may be moved from the hydraulic rotary actuator assembly 100 (see FIGS. 5, 9) to one or more heat exchangers 220 (see FIGS. 5, 9). In one version, the one or more heat exchangers 220 (see FIGS. 5, 9) may use the heated or hot fluid 140, such as heated or hot thixotropic fluid 140*a*, to heat cold fuel or to heat up another substance or component. In another version, the one or more heat exchangers 220 (see FIGS. 5, 9) may use the heated or hot fluid 140, such as heated or hot thixotropic fluid 140*a*, to heat water or use water to cool the heated or hot fluid 140, such as the heated or hot thixotropic fluid 140*a*. The water heats up and may undergo a phase change 248 (see FIG. 9) from a fluid state 250 (see FIG. 9), or liquid state, to steam 252 (see FIG. 9), or vapor state. The steam 252 (see FIG. 9) may be vented out of the vehicle 12 (see FIGS. 5, 9), such as the aircraft 12*a* (see FIGS. 1, 9). The water may be carried onboard the vehicle 12 (see FIGS. 5, 9), such as the aircraft 12*a* (see FIGS. 1, 9), and since the venting is taking place with the braking operation 146*a* (see FIG. 7) on the ground surface 28 (see FIG. 1), the water may be replaced when the vehicle 12 is on the ground surface 28. The dynamic hydraulic resistance or braking resistance slows the road wheels 94 (see FIGS. 5, 6A, 9), such as the aircraft wheels 94*a* (see FIG. 9), to allow for the heat rejection 256 (see FIG. 9) through the phase change 248 (see FIG. 9) of the fluid 140 (see FIG. 9), such as the thixotropic fluid 140*a* (see FIG. 9), and to allow for an environmentally friendly and reliable braking and heat rejection 256.

As shown in FIG. 9, the hydraulic system 10 may further comprise the auxiliary pump 222, which is optional, coupled between the variable restrictor assembly 184 and the fluid supply system 170 in the aircraft 12*a*. The auxiliary pump 222 (see FIG. 9) pumps, or is configured to pump, the thixotropic fluid 140*a* (see FIG. 9) through the hydraulic rotary actuator assembly 100 (see FIG. 9), including the hydraulic rotary actuator 102 (see FIG. 9), via the variable restrictor assembly 184 (see FIG. 9). When the auxiliary pump 222 (see FIG. 9) is used, the at least one hydraulic rotary actuator assembly 100 (see FIG. 9) may have a second operating mode 152 (see FIG. 9) comprising the taxiing operation 152*a* (see FIG. 9), wherein the thixotropic fluid 140*a* (see FIG. 9) is pumped through the at least one hydraulic rotary actuator assembly 100, and causes the aircraft wheel 94*a* (see FIG. 9) to rotate on the ground surface 28 (see FIG. 1). The taxiing controller 214*a* (see FIG. 7) coupled to the variable restrictor assembly 184 (see FIG. 9) controls an output 225 (see FIG. 9) of the auxiliary pump 222 (see FIG. 9), so as to enable the variation 242 (see FIG. 9) of a rate 244*b* (see FIG. 9) of the rotation 240 (see FIG. 9) of the aircraft wheel 94*a* (see FIG. 9) on the ground surface 28. With the taxiing operation 152*a* (see FIGS. 6C, 7) for the vehicle 12, such as the aircraft 12*a* (see FIG. 9), the hydraulic rotary actuator 102 (see FIG. 9) and the hydraulic rotary actuator assembly 100 (see FIG. 9) function or act as a motor 106 (see FIG. 9). An added benefit of applying the taxiing operation 152*a* (see FIGS. 6B, 7) to the road wheels 94 (see FIGS. 5, 6A, 9), such as the aircraft wheels 94*a* (see FIG. 9), through the hydraulic rotary actuator 102 (see FIG. 9), allows for an improved operation efficiency 258 (see FIG. 9), a reduced wear 254 (see FIG. 9) of the tires 92 (see FIG. 9) and hydraulic system or braking components, and decreased costs for replacement parts, such as tires 92 (see FIGS. 5, 6A, 9) and hydraulic system or braking components.

The hydraulic system 10 (see FIG. 9) of the aircraft 12*a* (see FIG. 9) may further comprise the at least one hydraulic rotary actuator assembly 100 (see FIG. 9) having the third operating mode 158 (see FIG. 7) comprising the wheel spin-up operation 158*a* (see FIG. 7), wherein the thixotropic fluid 140*a* (see FIG. 9) is pumped by the auxiliary pump 222 (see FIG. 9) through the at least one hydraulic rotary actuator assembly 100 (see FIG. 9), via the variable restrictor assembly 184 (see FIG. 9), and causes the aircraft wheel 94*a* (see FIG. 9) to rotate during a flight mode 159 (see FIG. 7) of the aircraft 12*a*, prior to the aircraft 12*a* landing or touching down on the ground surface 28). The wheel spin-up controller 216*a* (see FIG. 7) coupled to the variable restrictor assembly 184 (see FIG. 9) controls the output 225 (see FIG. 9) of the auxiliary pump 222 (see FIG. 9), so as to enable the variation 242 (see FIG. 9) of the rate 244*b* (see FIG. 9) of the rotation 240 (see FIG. 9) of the aircraft wheel 94*a* (see FIG. 9) during the flight mode 159 (see FIG. 7). With the wheel spin-up operation 158*a* (see FIG. 7) for the vehicle 12, such as the aircraft 12*a* (see FIG. 9), the hydraulic rotary actuator 102 (see FIG. 9) and the hydraulic rotary actuator assembly 100 (see FIG. 9) function or act as a motor 106 (see FIG. 9).

As discussed above, the hydraulic system 10 (see FIG. 9) comprises at least one hydraulic rotary actuator assembly 100 (see FIG. 9), each comprising a housing 108 (see FIGS. 5, 6A), a hydraulic rotary actuator 102 (see FIG. 9) disposed within the housing 108, and one or more flow ports 136 (see FIGS. 5, 6A). The at least one hydraulic rotary actuator assembly 100 (see FIG. 9) may comprise a hydraulic pump-motor assembly 100*a* (see FIG. 9), and in one version, for the first operating mode 146 (see FIGS. 6B, 7), such as the braking operation 146*a* (see FIGS. 6B, 7), the hydraulic rotary actuator assembly 100 functions as a pump 104 (see FIG. 9), and in other versions, for second operating mode 152 (see FIGS. 6C, 7), such as the taxiing operation 152*a* (see FIGS. 6C, 7), and for the third operating mode 158 (see FIG. 7), such as the wheel spin-up operation 158*a* (see FIG. 7), the hydraulic rotary actuator assembly 100 functions as a motor 106 (see FIGS. 6C, 9).

The hydraulic rotary actuator 102 (see FIG. 9) may comprise a hydraulic pump-motor 102*a* (see FIG. 9), for example, a pump 104 (see FIG. 9) in the form of a variable displacement piston pump 104*a* (see FIG. 9). As shown in FIG. 9, the hydraulic rotary actuator 102, for example, the pump 104, may comprise the variable displacement piston pump 104*a*. As discussed above, the variable displacement piston pump 104*a* (see FIGS. 5, 6A) comprises a shaft 112 (see FIGS. 5, 6A), a cylinder block 114 (see FIGS. 5, 6A), a valve plate 118 (see FIGS. 5, 6A), a plurality of pistons 122 (see FIGS. 5, 6A) with piston shoes 128 (see FIGS. 5, 6A), a swash plate 130 (see FIGS. 5, 6A), one or more drain ports 133 (see FIGS. 5, 6A), and one or more vents 138 (see FIGS. 5, 6A). The plurality of pistons 122 (see FIGS. 5, 6A) may be arranged parallel to each other in the cylinder block 114 (see FIGS. 5, 6A), and each of the plurality of pistons 122 may be coupled between the swash plate 130 and the valve plate 118, and each may rotate around the shaft 112. The valve plate 118 (see FIGS. 5, 6A) enables contact of the fluid 140 (see FIG. 9), such as the thixotropic fluid 140*a* (see FIG. 9) with the plurality of pistons 122 (see FIGS. 5, 6A). As discussed above, the hydraulic rotary actuator 102 (see FIG. 9) rotates when the road wheel 94 (see FIG. 9), such as an aircraft wheel 94*a* (see FIG. 9), rotates, to convert the rotation 240 (see FIG. 9) of the road wheel 94, such as the aircraft wheel 94*a*, into the flow 238 (see FIG. 9) of the fluid 140 (see FIG. 9), such as the thixotropic fluid 140*a* (see FIG. 9).

Alternatively, as discussed above, instead of using the variable displacement piston pump 104*a* (see FIG. 9), the at least one hydraulic rotary actuator assembly 100 (see FIG.

9) may use another type of hydraulic rotary actuator 102 (see FIG. 9) comprising a pump 104 (see FIG. 9). For example, as shown in FIG. 9, and discussed above, the pump 104 may comprise one of, the variable displacement piston pump (104a), an axial pump 104b, a scroll pump 104c a gerotor pump 104d, a gear pump 104e, a vane pump 104f, a bladeless turbine pump 104g, or another type of pump 104.

As shown in FIG. 9, the hydraulic system 10 further comprises the fluid supply system 170 installed in the interior 27 (see FIG. 1) of the aircraft 12a, such as in the fuselage 22, and is coupled to each hydraulic rotary actuator assembly 100, via the variable restrictor assembly 184 and via the auxiliary pump 222 if the auxiliary pump 222 is included or used. As shown in FIG. 9, the fluid supply system 170 comprises the fluid reservoir 172 containing the fluid 140, such as the thixotropic fluid 140a, one or more fluid lines 174, fluid supply valves 176, and one or more fluid supply controls 178.

The fluid reservoir 172 (see FIG. 9) may comprise a container or tank in which a sufficient supply of the fluid 140 (see FIG. 9), such as the thixotropic fluid 140a (see FIG. 9), is stored. The fluid 140 (see FIG. 9), such as the thixotropic fluid 140a (see FIG. 9), flows, or is configured to flow, from the fluid reservoir 172 (see FIG. 9) into the hydraulic rotary actuator assembly 100 and the hydraulic rotary actuator 102 (see FIG. 9), via the variable restrictor assembly 184 (see FIG. 9), where it is forced through the hydraulic rotary actuator assembly 100 and the hydraulic rotary actuator 102, and is then discharged out of the hydraulic rotary actuator assembly 100 and the hydraulic rotary actuator 102, and returned to the fluid reservoir 172, via the variable restrictor assembly 184 (see FIG. 9) and the one or more heat exchangers 220 (see FIG. 9). The fluid reservoir 172 may replenish any fluid 140, such as thixotropic fluid 140a, lost through leakage, and may serve as an overflow basin for excess fluid 140, such as thixotropic fluid 140a, forced out of the hydraulic rotary actuator assembly 100 by the increase of fluid volume caused by temperature changes, by variable displacement of the pistons 122, or by another cause. The fluid reservoir 172 (see FIG. 9) may be either pressurized or nonpressurized, may include baffles and/or fins to keep the fluid 140, such as the thixotropic fluid 140a, contained within the fluid reservoir 172 from having random movement, such as swirling and surging, and may include filters or mesh screen strainers to prevent foreign material from entering the fluid supply system 170.

The fluid 140 (see FIG. 9), such as the thixotropic fluid 140a (see FIG. 9), may be transported to and from the hydraulic rotary actuator assembly 100 (see FIG. 9) and the hydraulic rotary actuator 102 (see FIG. 9), via the variable restrictor assembly 184 (see FIG. 9), with the one or more fluid lines 174 (see FIG. 9) coupled to one or more flow ports 136 (see FIGS. 5, 6A, 6D) of the hydraulic rotary actuator assembly 100 (see FIG. 9). The fluid lines 174 (see FIG. 9) may comprise a fluid supply line 174a (see FIGS. 5, 6A), such as an inlet or intake line, that transports the fluid 140 (see FIG. 9), such as the thixotropic fluid 140a (see FIG. 9), from the fluid reservoir 172, via the variable restrictor assembly 184 (see FIG. 9), to the inlet or intake side of the hydraulic rotary actuator assembly 100 (see FIG. 9), for example, the inlet flow port 136a (see FIGS. 5, 6A). The fluid lines 174 (see FIG. 9) may further comprise a fluid return line 174b (see FIGS. 5, 6A), such as an outlet or return line, that transports the fluid 140, such as the thixotropic fluid 140a (see FIG. 9), from the outlet or discharge side of the hydraulic rotary actuator assembly 100 (see FIG. 9), for example, the outlet flow port 136b (see FIGS. 5, 6A), back to the fluid reservoir 172 via the variable restrictor assembly 184 (see FIG. 9) and the one or more heat exchangers 220 (see FIG. 9). The fluid lines 174 (see FIG. 9) may comprise tubing, hoses, or other transport devices that may be made of one or more materials including nylon, polytetrafluoroethylene (PTFE), polyvinyl chloride (PVC), polyurethane, polyolefin, polypropylene, fluoropolymer, rubber, silicone, or another suitable material. Preferably, the fluid lines 174 (see FIG. 9) are made of a material that can tolerate high temperatures, e.g., 250 degrees Fahrenheit to 1500 degrees Fahrenheit, or more.

The fluid 140 (see FIGS. 5, 9) of the hydraulic system 10 (see FIGS. 5, 7, 9) may comprise one of, a mineral oil-based hydraulic fluid, a water-based hydraulic fluid, a fire-resistant hydrogenated polyalphaolefin-based fluid, phosphate ester-based hydraulic fluid, a thixotropic fluid 140a, or another suitable fluid 140.

As shown in FIG. 9, the fluid 140, such as the thixotropic fluid 140a, comprises a substance 142 mixed with or into a polar solvent 143. The substance 142 (see FIG. 9) may comprise one of, cornstarch, fumed silica, iron oxide gel, xanthan gum, or another suitable substance 142. The polar solvent 143 (see FIG. 9) may comprise one of, water, propylene carbonate, diphenyl ether, triethylene glycol dimethyl ether (triglyme), 1,3-dimethyl-3,4,5,6-tetrahydro-2 (1H)-pyrimidinone (DMPU), or another suitable polar solvent 143. The fluid 140 (see FIGS. 5, 9), such as the thixotropic fluid 140a (see FIGS. 5, 9) may comprise one of, a suspension of cornstarch in the polar solvent 143, a suspension of fumed silica in the polar solvent 143, a suspension of iron oxide gel in the polar solvent 143, a solution of xanthan gum in the polar solvent 143, a gelatin which contains water, or another suitable fluid 140, such as the thixotropic fluid 140a. As shown in FIG. 9, the fluid 140, such as the thixotropic fluid 140a, chosen has a viscosity 166, preferably a high viscosity so that it is thick or viscous, has a heat capacity 167, preferably a high heat capacity, and has a boiling point 168.

The fluid 140 (see FIG. 9), such as the thixotropic fluid 140a (see FIG. 9), provides a viscous braking 246 (see FIG. 9) and contains the heat 262 (see FIG. 9) that is allowed to be rejected through a phase change 248 (see FIG. 9) of the fluid 140 (see FIG. 9), such as the thixotropic fluid 140a (see FIG. 9) from a fluid state 250 (see FIG. 9) to a steam 252 (see FIG. 9), when the fluid 140, such as the thixotropic fluid 140a, reaches its boiling point 168 (see FIG. 9). One or more vents 138 (see FIGS. 5, 6A) of the hydraulic rotary actuator 102 (see FIG. 9) may facilitate removal of the steam 252 (see FIG. 9) formed from the phase change 248 (see FIG. 9) of the fluid 140 (see FIG. 9), such as the thixotropic fluid 140a (see FIG. 9), when the fluid 140, such as the thixotropic fluid 140a, is heated to its boiling point 168 (see FIG. 9).

As further shown in FIG. 9, the hydraulic system 10 comprises a control system 180 installed in the interior 27 of the vehicle 12, such as the aircraft 12a, for example, in the cockpit 21 and such as in the fuselage 22, depending on the model and type of vehicle 12, such as the aircraft 12a, the hydraulic system 10 is installed or incorporated within. Additionally, the control system 180 (see FIG. 9) may have certain portions or components coupled to the landing gear assemblies 14 (see FIG. 9), depending on the model and type of vehicle 12, such as the aircraft 12a, the hydraulic system 10 is installed or incorporated within. The control system 180 (see FIG. 9) is preferably coupled to each hydraulic rotary actuator assembly 100, via one or more connection elements 210. As shown in FIG. 9, the one or more connection elements 210 may comprise one or more of, wired connections 210a, wireless connections 210b, mechanical linkages 210c, hydraulic linkages 210d, or another suitable connection element 210.

The control system 180 (see FIG. 9) controls the operation of each of the at least one hydraulic rotary actuator assembly 100 (see FIG. 9). As shown in FIG. 9, the control system 180 may comprise one or more of, wheel speed controls 194, fluid temperature controls 196, wheel temperature controls 198, valve controls 200, brake controls 202, parking brake controls 204, wheel power controls 206, anti-skid controls 208, or other suitable controls. The control system 180 (see FIG. 9) may further comprise the variable restrictor assembly 184 (see FIG. 9) and the variable restrictor controller 186 (see FIG. 9) and the controls and indicators assembly 182 (see FIG. 7).

In one version of the vehicle 12 (see FIGS. 1, 9), such as the aircraft 12a (see FIGS. 1, 9), the wheel speed controls 194 (see FIG. 9), the fluid temperature controls 196 (see FIG. 9), the wheel temperature controls 198 (see FIG. 9), and the valve controls 200 (see FIG. 9) may be installed in or near the cockpit 21 (see FIGS. 1, 9) of the vehicle 12 (see FIGS. 1, 9), such as the aircraft 12a (see FIGS. 1, 9), and one or more of the brake controls 202 (see FIG. 9), the parking brake controls 204 (see FIG. 9), the wheel power controls 206 (see FIG. 9), and the anti-skid controls 208 (see FIG. 9) may be installed either within the fuselage 22 (see FIG. 1, 9) near the landing gear assemblies 14 (see FIG. 1, 9), or coupled to or within the landing gear assemblies 14 (see FIGS. 1, 9).

As further shown in FIG. 9, the vehicle 12, such as the aircraft 12a, may comprise the auxiliary power unit (APU) 226 installed in the interior 27 of the vehicle 12, such as the aircraft 12a, for example, near the tail of the aircraft 12a. The APU 226 (see FIG. 9) may be coupled to the auxiliary pump 222 (see FIG. 9), via one or more auxiliary power unit (APU) lines 228 (see FIG. 9). As discussed above, the APU 226 (see FIGS. 1, 9) is a device on the vehicle 12 (see FIGS. 1, 9), such as the aircraft 12a (see FIGS. 1, 9), that provides energy or power for functions other than propulsion of the vehicle 12, such as the aircraft 12a, which is performed by the engines 26 (see FIG. 1). The hydraulic system 10 (see FIG. 9) has the ability to taxi the vehicle 12 (see FIG. 9), such as the aircraft 12a (see FIG. 9), when it is on the ground surface 28 (see FIG. 1), using fluid power 224a (see FIG. 8) from the fluid power pump 222a (see FIG. 8) or using electric power 224b (see FIG. 8) from the electric pump 222b (see FIG. 8), to pump the fluid 140 (see FIG. 9), such as the thixotropic fluid 140a (see FIG. 9), from the fluid reservoir 172 (see FIG. 9) of the fluid supply system 170 (see FIG. 9) to and through the hydraulic rotary actuator assembly (see FIG. 9), via the variable restrictor assembly 184 (see FIG. 9).

Figure 10:
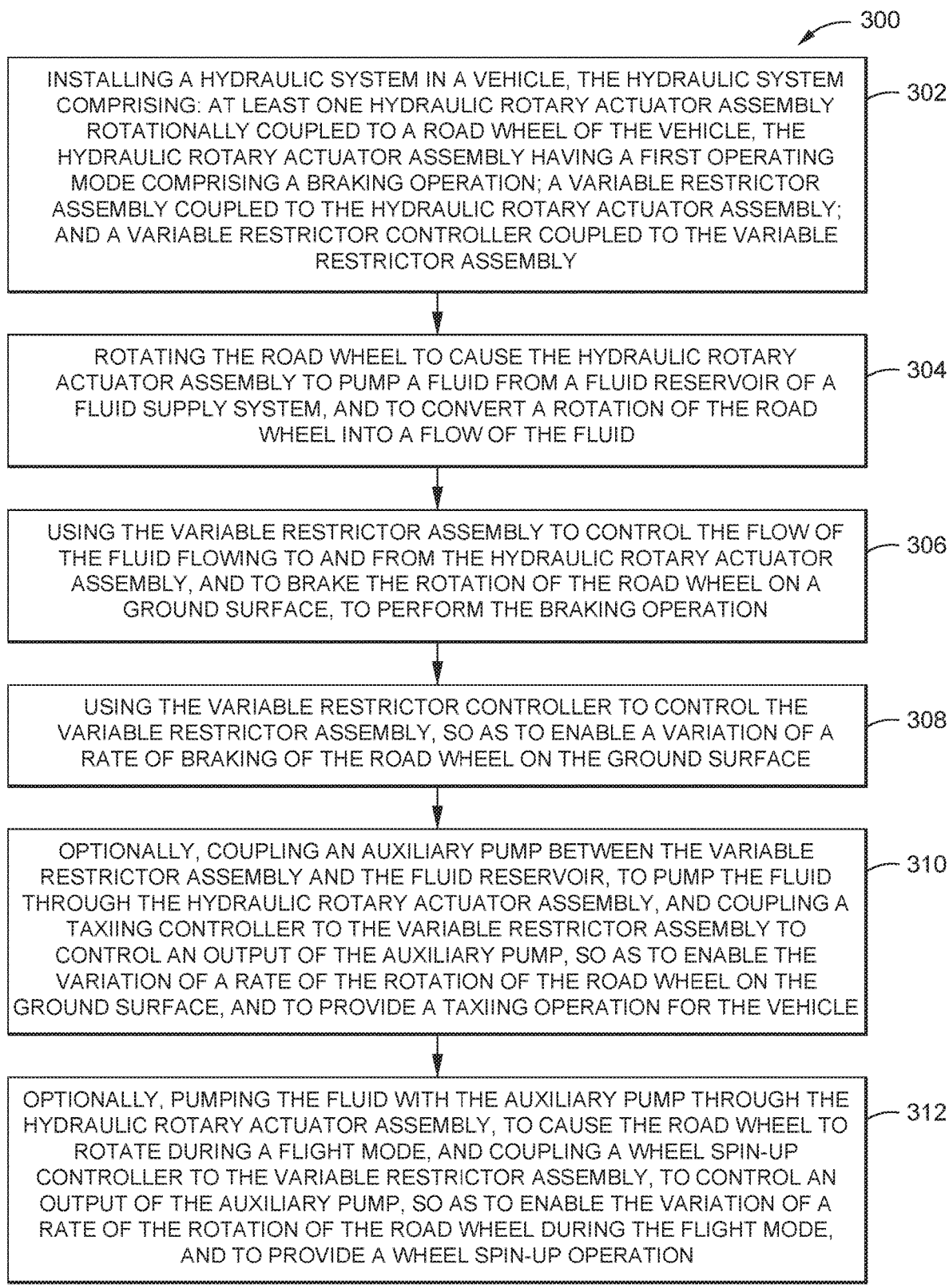
FIG. 10 is an illustration of a flow diagram of a version of a method of the disclosure.

Now referring to FIG. 10, FIG. 10 is an illustration of a flow diagram of a version of a method 300 of the disclosure. In another version of the disclosure, as shown in FIG. 10, there is provided the method 300 of using a hydraulic system 10 (see FIGS. 5, 6A, 9) for a vehicle 12 (see FIGS. 1, 9), for example, an aircraft 12a (see FIGS. 1, 9).

As shown in FIG. 10, the method 300 comprises step 302 of installing the hydraulic system 10 (see FIGS. 1, 5, 6A, 9) in the vehicle 12 (see FIGS. 1, 9), such as the aircraft 12a (see FIGS. 1, 9). The hydraulic system 10 (see FIGS. 1, 5, 6A, 9), as discussed in detail above, comprises at least one hydraulic rotary actuator assembly 100 (see FIGS. 1, 5, 6A, 9), such as a hydraulic pump-motor assembly 100a (see FIGS. 5, 6A, 9), rotationally coupled to a road wheel 94 (see FIGS. 5, 7, 9) of the vehicle 12 (see FIGS. 1, 9). The road wheel 94 (see FIG. 9) may comprise an aircraft wheel 94a (see FIG. 9). The at least one hydraulic rotary actuator assembly 100 (see FIGS. 1, 5, 6A, 7, 9) may be mounted between a strut 96 (see FIGS. 5, 6A, 9) and the road wheel 94 (see FIGS. 5, 6A, 9), such as the aircraft wheel 94a (see FIG. 9), of a landing gear assembly 14 (see FIGS. 1, 9) of the vehicle 12, such as the aircraft 12a. The at least one hydraulic rotary actuator assembly 100 (see FIGS. 1, 5, 6A, 7, 9) has a first operating mode 146 (see FIG. 7) comprising a braking operation 146a (see FIG. 7).

The hydraulic system 10 (see FIGS. 1, 5, 6A, 7, 9), as discussed above, further comprises a variable restrictor assembly 184 (see FIGS. 1, 5, 6A, 7, 9) coupled to the at least one hydraulic rotary actuator assembly 100 (see FIGS. 1, 5, 6A, 7, 9). The hydraulic system 10 (see FIGS. 1, 5, 6A, 7, 9), as discussed above, further comprises a variable restrictor controller 186 (see FIGS. 5, 6A, 7, 9) coupled to the variable restrictor assembly 184 (see FIGS. 1, 5, 6A, 7, 9).

In one version, the at least one hydraulic rotary actuator assembly 100 (see FIGS. 1, 5, 6A, 7, 9) comprises a housing 108 (see FIGS. 5, 6A), a hydraulic rotary actuator 102 (see FIGS. 5, 6A, 9), such as a hydraulic pump-motor 102a (see FIGS. 5, 6A, 9), disposed within the housing 108, and flow ports 136 (see FIGS. 5, 6A), such as an inlet flow port 136a (see FIGS. 5, 6A) and an outlet flow port 136b (see FIGS. 5, 6A), coupled to the hydraulic rotary actuator 102, via one or more openings 137 (see FIGS. 5, 6A) in the housing 108.

The step 302 (see FIG. 10) of installing the hydraulic system 10 (see FIGS. 1, 5, 6A, 9) comprises installing 302 the hydraulic system 10 comprising the hydraulic rotary actuator 102 (see FIGS. 5, 6A, 9), such as the hydraulic pump-motor 102a (see FIGS. 5, 6A, 9), comprising a pump 104 (see FIGS. 5, 6A, 9). The pump 104 comprises one of, a variable displacement piston pump 104a (see FIGS. 5, 6A, 9), an axial pump 104b (see FIG. 9), a scroll pump 104c (see FIG. 9), a gerotor pump 104d (see FIG. 9), a gear pump 104e (see FIG. 9), a vane pump 104f (see FIG. 9), a bladeless turbine pump 104g (see FIG. 9), or another suitable pump 104. The types of pumps 104 that may be used are discussed in detail above.

The at least one hydraulic rotary actuator assembly 100 (see FIGS. 1, 5, 6A, 7, 9) further has one or more vents 138 (see FIGS. 5, 6A) coupled to the hydraulic rotary actuator 102 (see FIGS. 5, 6A, 9), via one or more openings 139b (see FIGS. 5, 6A), such as a vent opening, in the housing 108 (see FIGS. 5, 6A). The one or more vents 138 (see FIGS. 5, 6A) facilitate removal of steam 252 (see FIG. 9) formed from the phase change 248 (see FIG. 9) of the fluid 140 (see FIG. 9), such as the thixotropic fluid 140a (see FIGS. 5, 6A, 9) from a fluid state 250 (see FIG. 9) to steam 252 (see FIG. 9), when the fluid 140, such as the thixotropic fluid 140a, is heated to a boiling point 168 (see FIG. 9) of the fluid 140, such as the thixotropic fluid 140a.

The hydraulic system 10 (see FIGS. 5, 6A, 9), as discussed in detail above, further comprises a fluid supply system 170 (see FIGS. 1, 5, 6A, 9) installed in the interior 27 (see FIG. 1) of the vehicle 12 (see FIGS. 1, 9), such as the aircraft 12a (see FIGS. 1, 9), and coupled to the at least one hydraulic rotary actuator assembly 100 (see FIGS. 1, 5, 6A, 9). The fluid supply system 170 (see FIGS. 1, 5, 6A, 9) comprises the fluid reservoir 172 (see FIGS. 5, 6A, 9) containing the fluid 140, such as the thixotropic fluid 140a (see FIGS. 5, 6A, 9). The fluid 140, such as the thixotropic fluid 140a (see FIGS. 5, 6A, 9), is preferably transported to and from the hydraulic rotary actuator 102 (see FIGS. 5, 6A, 9), via fluid lines 174 (see FIGS. 5, 6A, 9), coupled to the flow ports 136 (see FIGS. 5, 6A, 9), such as fluid supply line 174a (see FIGS. 5, 6A) coupled to the inlet flow port 136a (see FIGS. 5, 6A), and such as fluid return line 174b (see FIGS. 5, 6A) coupled to the outlet flow port 136b (see FIGS. 5, 9).

The hydraulic system 10 (see FIGS. 5, 6A, 9), as discussed in detail above, further comprises the control system 180 (see FIGS. 1, 5, 6A, 9) installed in one or more areas of the interior 27 (see FIG. 1) of the vehicle 12 (see FIG. 1), such as the aircraft 12a (see FIG. 1), and coupled to the at least one hydraulic rotary actuator assembly 100 (see FIGS. 1, 5, 6A, 9), via one or more connection elements 210 (see FIGS. 1, 5, 6A, 9), and via the variable restrictor assembly 184 (see FIGS. 5, 6A, 7, 9). As shown in FIG. 9, the one or more connection elements 210 may comprise one or more of, wired connections 210a, wireless connections 210b, mechanical linkages 210c, hydraulic linkages 210d, or another suitable connection element 210.

The step 302 (see FIG. 10) of installing the hydraulic system 10 (see FIGS. 1, 5, 6A, 9) comprises installing 302 the hydraulic system 10 further comprising the control system 180 (see FIGS. 1, 5, 6A, 9). The control system 180 (see FIGS. 1, 5, 6A, 7, 9) comprises the variable restrictor controller (186), and the first operating mode controller 212 (see FIG. 7), such as the braking controller 212a (see FIG. 7), may comprise the second operating mode controller 214 (see FIG. 7), such as the taxiing controller 214a (see FIG. 7), may comprise the third operating mode controller 216 (see FIG. 7), such as the wheel spin-up controller 216a (see FIG. 7), and comprises the fluid cooling controller 218 (see FIG. 7). The control system 180 (see FIGS. 1, 5, 6A, 7, 9) further comprises one or more of, wheel speed controls 194 (see FIG. 9), fluid temperature controls 196 (see FIG. 9), wheel temperature controls 198 (see FIG. 9), flow valve controls 200 (see FIG. 9), brake controls 202 (see FIG. 9), parking brake controls 204 (see FIG. 9), wheel power controls 206 (see FIG. 9), anti-skid controls 208 (see FIG. 8), or other suitable controls.

As shown in FIG. 10, the method 300 further comprises step 304 of rotating the road wheel 94 (see FIGS. 5, 6A, 7, 9) to cause the at least one hydraulic rotary actuator assembly 100 (see FIGS. 1, 5, 6A, 7, 9) to pump the fluid 140 (see FIGS. 5, 6A, 9), such as thixotropic fluid 140a (see FIGS. 5, 6A, 9), from the fluid reservoir 172 (see FIGS. 5, 6A, 9) of the fluid supply system 170 (see FIGS. 5, 6A, 7, 9), and to convert a rotation 240 (see FIG. 9) of the road wheel 94 into a flow 238 (see FIG. 8) of the fluid 140, such as thixotropic fluid 140a (see FIGS. 5, 6A, 9). The fluid 140, such as the thixotropic fluid 140a (see FIGS. 5, 6A, 9) from the fluid reservoir 172 (see FIGS. 5, 6A, 9) into the rotating hydraulic rotary actuator 102 (see FIGS. 5, 6A, 9).

The step 304 (see FIG. 10) of rotating the road wheel 94 (see FIGS. 5, 7) to pump the fluid 140 (see FIGS. 5, 6A, 7, 9) comprises rotating the road wheel 94 to pump the fluid 140 comprising one of, a mineral oil-based hydraulic fluid, a water-based hydraulic fluid, a fire-resistant hydrogenated polyalphaolefin-based fluid, phosphate ester-based hydraulic fluid, a thixotropic fluid 140a (see FIGS. 5, 6A, 9), or another suitable fluid 140.

The fluid 140, such as the thixotropic fluid 140a (see FIGS. 5, 6A, 9), may comprise one of, a suspension of cornstarch in a polar solvent 143 (see FIG. 9), a suspension of fumed silica in the polar solvent 143, a suspension of iron oxide gel in the polar solvent 143, a solution of xanthan gum in the polar solvent 143, a gelatin, or another suitable fluid 140, such as thixotropic fluid 140a.

As discussed above, the fluid 140, such as thixotropic fluid 140a (see FIGS. 5, 9) preferably comprises a substance 142 (see FIG. 9) mixed with or into the polar solvent 143 (see FIG. 9). The substance 142 may comprise one of, cornstarch, fumed silica, iron oxide gel, xanthan gum, or another suitable substance 142. The polar solvent 143 (see FIG. 9) may comprise one of, water, propylene carbonate, diphenyl ether, triethylene glycol dimethyl ether (triglyme), 1,3-dimethyl-3,4,5,6-tetrahydro-2(1H)-pyrimidinone (DMPU), or another suitable polar solvent 143. The fluid 140, such as the thixotropic fluid 140a, (see FIGS. 5, 9) has a viscosity 166 (see FIG. 9), preferably a high viscosity so that it is thick or viscous. The fluid 140, such as the thixotropic fluid 140a (see FIGS. 5, 9), has a heat capacity 167 (see FIG. 9), preferably a high heat capacity, and further has a boiling point 168 (see FIG. 9).

As shown in FIG. 10, the method 300 further comprises step 306 of using the variable restrictor assembly 184 (see FIGS. 5, 6A, 7, 9) to control the flow 238 (see FIG. 8) of the fluid 140 (see FIGS. 5, 6A, 7, 9), such as the thixotropic fluid 140a (see FIGS. 5, 6A, 9), flowing to and from, or issuing from, the at least one hydraulic rotary actuator assembly 100 (see FIGS. 1, 5, 6A, 7, 9), to brake the rotation 240 (see FIG. 9) of the road wheel 94 (see FIG. 9), such as the aircraft wheel 94a (see FIG. 9), on a ground surface 28 (see FIGS. 1, 5), to perform the first operating mode 146 (see FIG. 7), such as the braking operation 146a (see FIG. 7).

As shown in FIG. 10, the method 300 further comprises step 308 of using the variable restrictor controller 186 (see FIG. 7) to control the variable restrictor assembly 184 (see FIG. 7), so as to enable a variation 242 (see FIG. 9) of a rate 244a (see FIG. 9) of braking of the road wheel 94 (see FIGS. 5, 7) on the ground surface 28 (see FIGS. 1, 5). When the hydraulic rotary actuator 102 (see FIGS. 6B, 9) of the hydraulic rotary actuator assembly 100 (see FIGS. 1, 5, 6A, 7, 9) performs the first operating mode 146 (see FIG. 7), such as the braking operation 146a (see FIGS. 6B, 7) for the vehicle 12, such as the aircraft 12a, on the ground surface 28, the hydraulic rotary actuator 102 and the hydraulic rotary actuator assembly 100 function or act as a pump 104 (see FIG. 9).

As shown in FIG. 10, the method 300 may further comprise optional step 310 of coupling an auxiliary pump 222 (see FIGS. 1, 7, 8, 9) between the variable restrictor assembly 184 (see FIGS. 7, 8, 9) and the fluid reservoir 172 (see FIG. 9) of the fluid supply system 170 (see FIGS. 1, 7, 8, 9), to pump the fluid 140 (see FIGS. 7, 8, 9), such as the thixotropic fluid 140a (see FIG. 9), through the at least one hydraulic rotary actuator assembly 100 (see FIGS. 1, 7, 8, 9), via the variable restrictor assembly 184 (see FIGS. 1, 7, 8, 9), to cause the road wheel 94 (see FIGS. 7, 8, 9), such as the aircraft wheel 94a (see FIG. 9), to rotate on the ground surface 28 (see FIGS. 1, 5), and coupling a second operating mode controller 214 (see FIG. 7), such as a taxiing controller 214a (see FIG. 7), to the variable restrictor assembly 184 to control an output 225 (see FIG. 9) of the auxiliary pump 222 (see FIG. 9), so as to enable the variation 242 (see FIG. 9) of a rate 244b (see FIG. 9) of the rotation 240 (see FIG. 9) of the road wheel 94 on the ground surface 28, and to provide second operating mode 152 (see FIG. 7), such as a taxiing operation 152a (see FIG. 7), for the vehicle 12. When the hydraulic rotary actuator 102 (see FIGS. 6A, 9) of the hydraulic rotary actuator assembly 100 (see FIGS. 1, 5, 6A, 7, 9) performs the second operating mode 152 (see FIGS. 6C, 7), such as the taxiing operation 152a (see FIGS. 6C, 7), for the vehicle 12 (see FIGS. 1, 9), such as the aircraft 12a (see FIGS. 1, 9), on the ground surface 28, the hydraulic rotary actuator 102 and the hydraulic rotary actuator assembly 100 function or act as a motor 106 (see FIG. 9), to rotate one or more of the road wheels 94 (see FIGS. 5, 6A, 9) of the vehicle 12, such as the aircraft 12a.

In one version, the installing 302 (see FIG. 10) of the hydraulic system 10 (see FIGS. 1, 9) in the vehicle 12 (see FIG. 1, 9) comprises installing the hydraulic system 10 in the vehicle 12 comprising an aircraft 12a (see FIGS. 1, 9). When the vehicle 12 comprises an aircraft 12a, the method 300, as shown in FIG. 10, may further comprise optional step 312 of pumping the fluid 140 (see FIGS. 7, 8, 9), such as thixotropic fluid 140a (see FIG. 9), with the auxiliary pump 222 (see FIGS. 1, 9) through the at least one hydraulic rotary actuator assembly 100 (see FIGS. 1, 7, 8, 9), via the variable restrictor assembly 184 (see FIGS. 1, 7, 8, 9), to cause the road wheel 94 (see FIGS. 7, 8, 9), such as the aircraft wheel 94a (see FIG. 9), to rotate during a flight mode 159 (see FIG. 7) of the aircraft 12a, prior to the aircraft 12a landing on the ground surface 28 (see FIG. 1), and coupling a third operating mode controller 216 (see FIG. 7), such as a wheel spin-up controller 216a (see FIG. 7), to the variable restrictor assembly 184, to control an output 225 (see FIG. 9) of the auxiliary pump 222 (see FIG. 9), so as to enable the variation 242 (see FIG. 9) of a rate 244b (see FIG. 9) of the rotation 240 (see FIG. 9) of the road wheel 94, such as the aircraft wheel 94a, during the flight mode 159, and to provide a third operating mode 158 (see FIG. 7), such as a wheel spin-up operation 158a (see FIG. 7), for the aircraft 12a. When the hydraulic rotary actuator 102 (see FIGS. 6A, 9) of the hydraulic rotary actuator assembly 100 (see FIGS. 1, 5, 6A, 7, 9) performs the third operating mode 158 (see FIG. 7), such as the wheel spin-up operation 158a (see FIG. 7), for the vehicle 12 (see FIGS. 1, 9), such as the aircraft 12a (see FIGS. 1, 9), during the flight mode 159 (see FIG. 7), the hydraulic rotary actuator 102 and the hydraulic rotary actuator assembly 100 function or act as a motor 106 (see FIG. 9), to spin up or rotate very fast the one or more of the road wheels 94 (see FIGS. 5, 6A, 9) of the vehicle 12, such as the aircraft 12a.

Disclosed embodiments of the hydraulic system 10 (see FIGS. 1, 5, 6A, 7, 9) and the method 300 (see FIG. 10) provide a hydraulic system that pumps a fluid 140 (see FIGS. 5, 6A, 9), such as a thixotropic fluid 140a (see FIGS. 5, 6A, 9), through a hydraulic rotary actuator assembly 100 (see FIGS. 1, 5, 6A, 7, 9), such as a hydraulic pump-motor assembly 100a (see FIGS. 5, 6A, 9), where, in the first operating mode 146 (see FIG. 7), such as the braking operation 146a (see FIG. 7), the flow 238 (see FIG. 8) of the fluid 140 (see FIG. 8) issuing from the hydraulic rotary actuator assembly 100 is controlled by a variable restrictor assembly 184 (see FIGS. 1, 7, 9) that is controlled by a variable restrictor controller 186 (see FIGS. 7, 9), to brake the rotation 240 (see FIG. 9) of the road wheel 94 (see FIG. 9) and enable variation 242 (see FIG. 9) of the rate 244a (see FIG. 9) of the braking operation 146a (see FIG. 7) of the road wheel 94 (see FIG. 9). In addition, the hydraulic rotary actuator assembly 100 (see FIGS. 1, 5, 6A, 7, 9), such as the hydraulic pump-motor assembly 100a (see FIGS. 5, 6A, 9), has the second operating mode 152 (see FIG. 7), such as the taxiing operation 152a (see FIG. 7), where the fluid 140 (see FIG. 9), such as the thixotropic fluid 140a (see FIG. 9), is pumped through the hydraulic rotary actuator assembly 100 by an auxiliary pump 222 (see FIG. 8) controlled by a second operating mode controller 214 (see FIG. 7), such as a taxiing controller 214a (see FIG. 7), to cause the road wheel 94 (see FIG. 9) to rotate and to enable variation 242 (see FIG. 9) of the rate 244b (see FIG. 9) of the road wheel 94. Further, the hydraulic rotary actuator assembly 100 (see FIGS. 1, 5, 6A, 7, 9), such as the hydraulic pump-motor assembly 100a (see FIGS. 5, 6A, 9), has the third operating mode 158 (see FIG. 7), such as the wheel spin-up operation 158a (see FIG. 7), where the fluid 140 (see FIG. 9), such as the thixotropic fluid 140a (see FIG. 9), is pumped through the hydraulic rotary actuator assembly 100 by the auxiliary pump 222 (see FIG. 8) controlled by a third operating mode controller 216 (see FIG. 7), such as a wheel spin-up controller 216a (see FIG. 7), to cause the road wheel 94 (see FIG. 9) to rotate and spin up in the flight mode 159 (see FIG. 7), and prior to landing of the vehicle 12 (see FIG. 1), such as the aircraft 12a (see FIG. 1), on the ground surface 28 (see FIG. 1), such as the airport runway 28a (see FIG. 1).

The hydraulic system 10 (see FIGS. 1, 5, 6A, 7, 9) replaces known rotors 80 (see FIG. 4B), known stationary brake pads 82 (see FIG. 4B), and known brake calipers 78 (see FIG. 4A) with a specially controlled hydraulic rotary actuator 102 (see FIGS. 5, 6A, 9), such as a hydraulic pump-motor 102a (see FIG. 9), that functions or acts as both a pump 104 (see FIG. 9) and a motor 106 (see FIG. 9). The hydraulic rotary actuator 102 (see FIGS. 5, 6A, 9) mounted between the landing gear assembly 14 (see FIGS. 1, 5, 6A, 9) and the road wheel 94 (see FIGS. 5, 6A, 9) may be rotated by the spinning or rotating of the road wheel 94, to produce a flow 238 (see FIG. 8) of the fluid 140 (see FIG. 9), such as the thixotropic fluid 140a (see FIG. 9), that may be restricted. Control or restriction of the flow 238 (see FIG. 8) of the fluid 140 to and from the hydraulic rotary actuator 102 by the variable restrictor assembly 184 may be used for braking force of the vehicle 12 (see FIGS. 1, 9), such as the aircraft 12a (see FIGS. 1, 9). The hydraulic system 10 (see FIGS. 1, 5, 6A, 7, 9) converts kinetic energy 260 (see FIG. 9) into heat 262 (see FIG. 9) through fluid resistance 239 (see FIG. 8) in the hydraulic rotary actuator 102 (see FIG. 9) of the hydraulic rotary actuator assembly 100 (see FIG. 9). The entire hydraulic rotary actuator assembly 100 (see FIGS. 5, 6A, 9) comprises and functions as a hydraulic pump-motor assembly 100a incorporating a fluid 140 (see FIG. 9), such as a thixotropic fluid 140a (see FIG. 9), having a heat capacity 167 (see FIG. 9) that is high. The dynamic hydraulic system of the disclosure uses the fluid 140, such as the thixotropic fluid 140a (see FIG. 9), or phase changing fluid, as the rotation resistance medium in a controlled hydraulic system, such as a hydraulic braking system.

As discussed, disclosed embodiments of the hydraulic system 10 (see FIGS. 1, 5, 6A, 7, 9) and the method 300 (see FIG. 10) provide an aircraft hydraulic system that pumps or directs the flow 238 (see FIG. 8) of the fluid 140, such as the thixotropic fluid 140a (see FIG. 9), to the hydraulic rotary actuator assembly 100 (see FIGS. 1, 5, 6A, 9) of a stationary or grounded vehicle 12 (see FIGS. 1, 9), such as an aircraft 12a (see FIGS. 1, 9), and provides power 224 (see FIG. 8), such as taxi power, from the auxiliary pump 222 (see FIG. 8) to perform the taxiing operation 152a (see FIG. 7) to rotate the road wheels 94 (see FIG. 9) and taxi the vehicle 12, such as the aircraft 12a, on the ground surface 28 (see FIG. 1), such as an airport runway 28a (see FIG. 1). Further, hydraulic system 10 (see FIGS. 1, 5, 6A, 7, 9) and the method 300 (see FIG. 10) pump or direct the flow 238 (see FIG. 8) of the fluid 140 to the hydraulic rotary actuator assembly 100, and provides power 224 (see FIG. 8) from the auxiliary pump 222 (see FIG. 8) to perform the wheel spin-up operation 158a (see FIG. 7) to rotate or spin up the road wheels 94 (see FIG. 9), of the vehicle 12 (see FIG. 1), such as the aircraft 12a (see FIG. 1), in or during the flight mode 159 (see FIG. 7), prior to landing the aircraft 12a (see FIG. 1) on the ground surface 28 (see FIG. 1). The heat 262 (see FIG. 9) produced from restricting flow 238 (see FIG. 8) of the fluid 140 (see FIG. 9), such as the thixotropic fluid 140a (see FIG. 9), within the hydraulic rotary actuator 102 (see FIGS. 5, 6A, 9) may be contained and transported within the fluid 140, such as the thixotropic fluid 140a, then rejected through the phase change 248 (see FIG. 9) of the fluid 140, such as the thixotropic fluid 140a, from a fluid state 250 (see FIG. 9) to a steam 252 (see FIG. 9), when the fluid 140, such as the thixotropic fluid 140a, reaches its boiling point 168 (see FIG. 9). One or more vents 138 (see FIGS. 5, 6A) of the hydraulic rotary actuator assembly 100 (see FIGS. 1, 5, 6A, 9) may be used to vent the steam 252 (see FIG. 9), e.g., heat, out of the hydraulic rotary actuator assembly 100. The fluid 140, such as the thixotropic fluid 140a (see FIG. 9), safely provides viscous braking 246 (see FIG. 9) and contains the heat 262 (see FIG. 9) that is allowed to be rejected through the phase change 248 (see FIG. 9) of the fluid 140, such as the thixotropic fluid 140a, from the fluid state 250 (see FIG. 9) to the steam 252 (see FIG. 9) or steam state, when the fluid 140, such as the thixotropic fluid 140a, reaches its boiling point 168 (see FIG. 9). The ability to reject heat 262 (see FIG. 9) through the phase change 248 (see FIG. 9) of the fluid 140, such as the thixotropic fluid 140a (see FIG. 9), may also eliminate any possible limitations on time and weight for fast turnaround flights and may eliminate landing gear down flight for cooling brakes after a long taxi before flight.

Further, the fluid resistance 239 (see FIG. 8) and dynamic hydraulic resistance to slow the road wheels 94 (see FIGS. 5, 6A, 9) may allow for an efficient and simpler method of heat rejection 256 (see FIG. 9) through the phase change 248 (see FIG. 9) of the fluid 140, such as the thixotropic fluid 140a (see FIG. 9), and may allow for environmentally friendly and safe braking and taxiing. The added benefit of applying the taxiing operation 152a (see FIG. 7) from power 224 (see FIG. 8) to the auxiliary pump 222 (see FIG. 9) to pump the fluid 140 through the hydraulic rotary actuator 102 of the hydraulic rotary actuator assembly 100 to rotate the road wheels 94 (see FIGS. 5, 6A, 9) allows for an improved operation efficiency 258 (see FIG. 9), reduced wear 254 (see FIG. 9) of the tires 92 (see FIGS. 5, 6A, 9) and components of the hydraulic system 10 (see FIGS. 5, 6A, 9), reduced number of replacement parts, and decreased costs for replacement parts, such as landing gear assembly parts and tires. Moreover, the performance of the fluid 140 (see FIG. 9), such as the thixotropic fluid 140a (see FIG. 9), over a broad range of temperatures allows it to uniquely solve braking challenges of vehicles 12 (see FIG. 1), such as aircraft 12a (see FIG. 1), for example, commercial aircraft and cargo aircraft, and the fluids 140, such as the thixotropic fluids 140a (see FIG. 9), react to produce higher viscosity at high speed deformations, enabling an efficient and safe absorption of braking energy.

In addition, disclosed embodiments of the hydraulic system 10 (see FIGS. 1, 5, 6A, 7, 9) and the method 300 (see FIG. 10) provide an aircraft hydraulic system that has the ability to use the auxiliary power unit (APU) 226 (see FIGS. 1, 9) from the vehicle 12 (see FIG. 1), such as the aircraft 12a (see FIGS. 1, 9), instead of the main aircraft engines 26 (see FIG. 1), such as large turbofan engines, of the vehicle 12, such as the aircraft 12a, to perform the taxiing operation 152a (see FIG. 6C) for the vehicle 12, such as the aircraft 12a, when the vehicle 12, such as the aircraft 12a, is on the ground surface 28 (see FIG. 1), such as the airport runway 28a (see FIG. 1). For the taxiing operation 152a (see FIG. 7) and the wheel spin-up operation 158a (see FIG. 7), the fluid 140 (see FIG. 9) may be pumped through the hydraulic rotary actuator assembly 100 (see FIGS. 7, 9), by the auxiliary pump 222 (see FIG. 8), which may be optional, and the auxiliary pump 222 may comprise an electric pump 224b (see FIG. 8), or may comprise fluid power 224a (see FIG. 8) from a fluid power pump 222a (see FIG. 8) that is coupled to the APU 226 (see FIGS. 1, 9) that provides a smaller and fuel efficient power source. The ability to taxi or spin up the road wheels 94 of the vehicle 12, such as the aircraft 12a (see FIG. 1), using hydraulic power or fluid power from the APU 226 (see FIG. 7) saves a lot of fuel that may be used or burned through the main aircraft engines 26 (see FIG. 1) during taxiing. Disclosed embodiments of the hydraulic system 10 (see FIGS. 1, 5, 6A, 7, 9) and the method 300 (see FIG. 10) provide for a vehicle 12, such as an aircraft 12a (see FIGS. 1, 9) that may taxi on its own APU power to avoid having to run the main aircraft engines 26 (see FIG. 1) while taxiing, and that may eliminate the need for extensive ground equipment to cool the vehicle 12, such as the aircraft 12a, once the vehicle 12, such as the aircraft 12a, lands, brakes, and taxis on the runway. Thus, the hydraulic system 10 of the disclosure uses less fuel during the taxiing operation 152a (see FIG. 6C), which may result in reduced fuel costs and reduced operating costs from fuel burned.

Thus, disclosed embodiments of the hydraulic system 10 (see FIGS. 1, 5, 6A, 7, 9) and the method 300 (see FIG. 10) provide reduced wear and tear on the landing gear assemblies 14 (see FIGS. 1, 5, 6A) and other structures of the vehicle 12, such as the aircraft 12a, provide reduced wear to tires 92 (see FIGS. 5, 6A, 9) and road wheels 94 (see FIGS. 5, 6A, 9) due to reduced heat stress, provide reduced wear on the engines 26 (see FIG. 1) due to decreased running of the engines 26 on the ground during taxiing, and provide reduced costs for ground support equipment to cool the landing gear assembly parts, tires, wheels, and braking components due to increased heat rejection 256 (see FIG. 9) by the fluid 140, such as the thixotropic fluid 140a (see FIG. 9). Moreover, disclosed embodiments of the hydraulic system 10 (see FIGS. 1, 5, 6A, 7, 9) and the method 300 (see FIG. 10) provide reduced maintenance, repair, and replacement costs for maintaining, repairing, and replacing landing gear assembly parts, tires, wheels, and braking components, and provide for the elimination of brake dust from brake pad wear.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:
1. A hydraulic system for a vehicle, the hydraulic system comprising:
    a hydraulic rotary actuator assembly rotationally coupled to a road wheel of the vehicle, the hydraulic rotary actuator assembly having a first operating mode comprising a braking operation, wherein a rotation of the road wheel causes the hydraulic rotary actuator assembly to pump a fluid from a fluid supply system;
    a variable restrictor assembly coupled to the hydraulic rotary actuator assembly in the vehicle, the variable restrictor assembly controlling a flow of the fluid flowing from the hydraulic rotary actuator assembly, to brake the rotation of the road wheel on a ground surface; and a variable restrictor controller coupled to the variable restrictor assembly, the variable restrictor controller controlling the variable restrictor assembly, so as to enable a variation of a rate of braking of the road wheel on the ground surface, wherein the hydraulic rotary actuator assembly comprises an inlet flow port that receives the fluid into the hydraulic rotary actuator assembly from a fluid reservoir of the fluid supply system, via the variable restrictor assembly, and further comprises an outlet flow port that discharges the fluid from the hydraulic rotary actuator assembly to the fluid reservoir of the fluid supply system, via the variable restrictor assembly.

2. The hydraulic system of claim 1 further comprising:

the hydraulic rotary actuator assembly having a second operating mode comprising a taxiing operation, wherein the fluid is pumped through the hydraulic rotary actuator assembly, and causes the road wheel to rotate on the ground surface;

an auxiliary pump coupled between the variable restrictor assembly and the fluid supply system in the vehicle, the auxiliary pump pumping the fluid through the hydraulic rotary actuator assembly, via the variable restrictor assembly; and a taxiing controller coupled to the variable restrictor assembly, the taxiing controller controlling an output of the auxiliary pump, so as to enable the variation of a rate of the rotation of the road wheel on the ground surface.

3. The hydraulic system of claim 2 further comprising:

the hydraulic rotary actuator assembly having a third operating mode comprising a wheel spin-up operation, wherein the fluid is pumped by the auxiliary pump through the hydraulic rotary actuator assembly, via the variable restrictor assembly, and causes the road wheel to rotate; and a wheel spin-up controller coupled to the variable restrictor assembly, the wheel spin-up controller controlling the output of the auxiliary pump, so as to enable the variation of the rate of the rotation of the road wheel.

4. The hydraulic system of claim 1, wherein the hydraulic rotary actuator assembly comprises a hydraulic rotary actuator comprising a pump, the pump comprising one of, a variable displacement piston pump, an axial pump, a scroll pump, a gerotor pump, a gear pump, a vane pump, and a bladeless turbine pump.

5. The hydraulic system of claim 4, wherein the pump comprises the variable displacement piston pump having a plurality of pistons arranged parallel to each other in a cylinder block, the plurality of pistons each coupled between a swash plate and a valve plate, and each rotating around a shaft, the valve plate enabling contact of the fluid to the plurality of pistons.

6. The hydraulic system of claim 1, wherein the inlet flow port is coupled to a fluid supply line from the fluid reservoir of the fluid supply system, and the outlet flow port is coupled to a fluid return line to the fluid reservoir of the fluid supply system.

7. The hydraulic system of claim 1, wherein the fluid comprises one of, a mineral oil-based hydraulic fluid, a water-based hydraulic fluid, a fire-resistant hydrogenated polyalphaolefin-based fluid, phosphate ester-based hydraulic fluid, and a thixotropic fluid.

8. The hydraulic system of claim 7, wherein the thixotropic fluid comprises one of, a suspension of cornstarch in a polar solvent, a suspension of fumed silica in the polar solvent, a suspension of iron oxide gel in the polar solvent, a solution of xanthan gum in the polar solvent, and a gelatin.

9. The hydraulic system of claim 8, wherein the hydraulic rotary actuator assembly further comprises one or more vents to facilitate removal of steam formed from a phase change of the thixotropic fluid, when the thixotropic fluid is heated to a boiling point of the fluid.

10. The hydraulic system of claim 1, wherein the variable restrictor assembly comprises at least one or more flow control valves, including one of, one or more selector valves, one or more check valves, and one or more priority valves, and at least one or more pressure control valves, including one of, one or more pressure regulating valves, and one or more relief valves.

11. The hydraulic system of claim 1 further comprising a control system, the control system comprising the variable restrictor controller and further comprising one or more of, wheel speed controls, fluid temperature controls, wheel temperature controls, valve controls, brake controls, parking brake controls, wheel power controls, and anti-skid controls.

12. An aircraft comprising:

a fuselage;

at least one wing attached to the fuselage;

one or more landing gear assemblies attached to the fuselage, the one or more landing gear assemblies each comprising a strut, an axle, and at least one aircraft wheel; and a hydraulic system comprising:

at least one hydraulic rotary actuator assembly rotationally coupled to the aircraft wheel, the at least one hydraulic rotary actuator assembly having a first operating mode comprising a braking operation, wherein a rotation of the aircraft wheel causes the at least one hydraulic rotary actuator assembly to pump a thixotropic fluid from a fluid reservoir of a fluid supply system;

a variable restrictor assembly coupled to the at least one hydraulic rotary actuator assembly, the variable restrictor assembly controlling a flow of the thixotropic fluid issuing from the at least one hydraulic rotary actuator assembly, to brake the rotation of the aircraft wheel on a ground surface; and a variable restrictor controller coupled to the variable restrictor assembly, the variable restrictor controller controlling the variable restrictor assembly, so as to enable a variation of a rate of braking of the aircraft wheel on the ground surface, wherein the at least one hydraulic rotary actuator assembly comprises an inlet flow port that receives the thixotropic fluid into the at least one hydraulic rotary actuator assembly from the fluid reservoir of the fluid supply system, via the variable restrictor assembly, and further comprises an outlet flow port that discharges the thixotropic fluid from the at least one hydraulic rotary actuator assembly to the fluid reservoir of the fluid supply system, via the variable restrictor assembly.

13. The aircraft of claim 12, wherein the hydraulic system further comprises:

the at least one hydraulic rotary actuator assembly having a second operating mode comprising a taxiing operation, wherein the thixotropic fluid is pumped through the at least one hydraulic rotary actuator assembly, and causes the aircraft wheel to rotate on the ground surface;

an auxiliary pump coupled between the variable restrictor assembly and the fluid supply system in the aircraft, the auxiliary pump pumping the thixotropic fluid through the hydraulic rotary actuator assembly, via the variable restrictor assembly; and a taxiing controller coupled to the variable restrictor assembly, the taxiing controller controlling an output of the auxiliary pump, so as to enable the variation of a rate of the rotation of the aircraft wheel on the ground surface.

14. The aircraft of claim 13, wherein the hydraulic system further comprises:

the at least one hydraulic rotary actuator assembly having a third operating mode comprising a wheel spin-up operation, wherein the thixotropic fluid is pumped by the auxiliary pump through the at least one hydraulic rotary actuator assembly, via the variable restrictor assembly, and causes the aircraft wheel to rotate during a flight mode of the aircraft, prior to the aircraft landing on the ground surface; and a wheel spin-up controller coupled to the variable restrictor assembly, the wheel spin-up controller controlling the output of the auxiliary pump, so as to enable the variation of the rate of the rotation of the aircraft wheel during the flight mode.

15. The aircraft of claim 12, wherein the at least one hydraulic rotary actuator assembly comprises a hydraulic rotary actuator comprising a pump, the pump comprising one of, a variable displacement piston pump, an axial pump, a scroll pump, a gerotor pump, a gear pump, a vane pump, and a bladeless turbine pump.

16. A method of using a hydraulic system for a vehicle, the method comprising the steps of:

installing the hydraulic system in the vehicle, the hydraulic system comprising:

at least one hydraulic rotary actuator assembly rotationally coupled to a road wheel of the vehicle, the at least one hydraulic rotary actuator assembly having a first operating mode comprising a braking operation;

a variable restrictor assembly coupled to the at least one hydraulic rotary actuator assembly; and a variable restrictor controller coupled to the variable restrictor assembly;

rotating the road wheel to cause the at least one hydraulic rotary actuator assembly to pump a fluid from a fluid reservoir of a fluid supply system, and to convert a rotation of the road wheel into a flow of the fluid;

using the variable restrictor assembly to control the flow of the fluid flowing to and from the at least one hydraulic rotary actuator assembly, to brake the rotation of the road wheel on a ground surface, and to perform the braking operation; and using the variable restrictor controller to control the variable restrictor assembly, so as to enable a variation of a rate of braking of the road wheel on the ground surface, wherein the hydraulic rotary actuator assembly comprises an inlet flow port that receives the fluid into the at least one hydraulic rotary actuator assembly from the fluid reservoir of the fluid supply system, via the variable restrictor assembly, and further comprises an outlet flow port that discharges the fluid from the at least one hydraulic rotary actuator assembly to the fluid reservoir of the fluid supply system, via the variable restrictor assembly.

17. The method of claim 16 further comprising coupling an auxiliary pump between the variable restrictor assembly and the fluid reservoir, to pump the fluid through the at least one hydraulic rotary actuator assembly, via the variable restrictor assembly, to cause the road wheel to rotate on the ground surface, and coupling a taxiing controller to the variable restrictor assembly to control an output of the auxiliary pump, so as to enable the variation of a rate of the rotation of the road wheel on the ground surface, and to provide a taxiing operation for the vehicle.

18. The method of claim 16 wherein the installing the hydraulic system in the vehicle comprises installing the hydraulic system in the vehicle comprising an aircraft.

19. The method of claim 18, further comprising pumping the fluid with an auxiliary pump through the at least one hydraulic rotary actuator assembly, via the variable restrictor assembly, to cause the road wheel to rotate during a flight mode of the aircraft, prior to the aircraft landing on the ground surface, and coupling a wheel spin-up controller to the variable restrictor assembly, to control an output of the auxiliary pump, so as to enable the variation of a rate of the rotation of the road wheel during the flight mode, and to provide a wheel spin-up operation for the aircraft.

20. The method of claim 16, wherein the installing the hydraulic system comprises installing the hydraulic system comprising the at least one hydraulic rotary actuator assembly having a hydraulic rotary actuator comprising a pump, the pump comprising one of, a variable displacement piston pump, an axial pump, a scroll pump, a gerotor pump, a gear pump, a vane pump, and a bladeless turbine pump.

21. The method of claim 16, wherein the rotating the road wheel to pump the fluid comprises rotating the road wheel to pump the fluid comprising one of, a mineral oil-based hydraulic fluid, a water-based hydraulic fluid, a fire-resistant hydrogenated polyalphaolefin-based fluid, phosphate ester-based hydraulic fluid, and a thixotropic fluid.

22. The method of claim 16 wherein the installing the hydraulic system comprises installing the hydraulic system further comprising a control system comprising the variable restrictor controller, and further comprising one or more of, wheel speed controls, fluid temperature controls, wheel temperature controls, valve controls, brake controls, parking brake controls, wheel power controls, and anti-skid controls.

* * * * *